US011254341B2

(12) United States Patent
Carlson et al.

(10) Patent No.: US 11,254,341 B2
(45) Date of Patent: *Feb. 22, 2022

(54) TACTICAL TRANSPORT CART FOR MANUAL NAVIGATION OVER BOTH TOPOGRAPHIC AND HYDROGRAPHIC TERRAINS

(71) Applicant: Hendrick Motorsports Performance Group, LLC, Charlotte, NC (US)

(72) Inventors: Marshall Carlson, Charlotte, NC (US); Jordan Lind Walker, Landis, NC (US); Richard Alvin Parker, Harrisburg, NC (US); Rhegan Lee Flanagan, Cornelius, NC (US)

(73) Assignee: Hendrick Motorsports Performance Group, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,447

(22) Filed: Apr. 14, 2020

(65) Prior Publication Data

US 2020/0239055 A1 Jul. 30, 2020

Related U.S. Application Data

(63) Continuation-in-part of application No. 15/616,992, filed on Jun. 8, 2017, now Pat. No. 10,654,503.

(51) Int. Cl.
*B62B 5/00* (2006.01)
*B62B 1/12* (2006.01)
(Continued)

(52) U.S. Cl.
CPC .............. *B62B 5/0046* (2013.01); *B62B 1/12* (2013.01); *B62B 5/0076* (2013.01); *B60L 3/02* (2013.01); *B60L 50/66* (2019.02); *B60L 2200/30* (2013.01)

(58) Field of Classification Search
CPC ........... B62D 55/04; B62B 1/008; B62B 1/04; B62B 1/10; B62B 1/12; B62B 1/16;
(Continued)

(56) References Cited

U.S. PATENT DOCUMENTS 2,556,207 A * 6/1951 Mueller .................... B62B 1/20
280/654
2,567,423 A 9/1951 Cleghorn
(Continued)

FOREIGN PATENT DOCUMENTS

CN 108357536 A 8/2018
EP 1031661 A2 8/2000

OTHER PUBLICATIONS

Extended European Search Report, European Application No. 21167596, dated Sep. 8, 2021, 9 pages.

*Primary Examiner* — Kevin Hurley
*Assistant Examiner* — Maurice L Williams
(74) *Attorney, Agent, or Firm* — Nelson Mullins Riley & Scarborough LLP

(57) ABSTRACT

A tactical transport cart manually navigable over both topographic and hydrographic terrains has a frame, a payload support on the frame, a hard point of attachment or connection on the frame or the payload support, a pair of wheels or other terrain-engaging transport propulsion members attached to the frame, a handle structure attached to the frame, at least one motor connected in driving relation to the transport propulsion members, a battery for providing motive power to the motor, and a control device connected between the battery and the motor for controlling supply of motive power to the motor. The frame, transport propulsion members and handle structure are cooperatively dimensioned and configured for movement of the cart over ground surfaces of topographic terrains and for partially and fully (Continued)

submerged movement over water-covered surfaces of hydrographic terrains.

15 Claims, 48 Drawing Sheets

(51) Int. Cl.
  *B60L 3/02* (2006.01)
  *B60L 50/60* (2019.01)
(58) Field of Classification Search
  CPC .... B62B 1/18; B62B 1/20; B62B 3/02; B62B 5/00; B62B 5/0026; B62B 5/0033; B62B 5/0036; B62B 5/004; B62B 5/0043; B62B 5/0046; B62B 5/0053; B62B 5/0061; B62B 5/0076; B62B 5/06; B62B 5/061; B62B 5/064; B62B 5/065; B62B 5/067; B62B 2203/10; B62B 2205/04; B62B 2301/256; B60L 2200/30; B60L 3/02; B60L 50/66; B60L 2220/44; B60L 2200/36
  See application file for complete search history.

(56) References Cited

U.S. PATENT DOCUMENTS

| | | | |
|---|---|---|---|
| 2,656,894 A | 10/1953 | Giovannoni | |
| 2,869,661 A * | 1/1959 | Fernandez | B62B 3/009 180/19.1 |
| 2,918,299 A * | 12/1959 | Lambert | B62B 5/0026 280/47.26 |
| 2,999,555 A | 9/1961 | Stroud et al. | |
| 3,055,449 A | 9/1962 | Murphy | |
| 3,135,346 A | 6/1964 | Bertozzi, Sr. | |
| 3,155,185 A | 11/1964 | Allen et al. | |
| 3,236,537 A * | 2/1966 | Eckman | A61G 1/0225 280/47.18 |
| 3,388,919 A * | 6/1968 | Waag | B62B 1/208 280/654 |
| 3,679,227 A | 7/1972 | Rock | |
| 3,690,692 A * | 9/1972 | Berkeley | B62B 1/208 280/654 |
| 3,692,135 A | 9/1972 | Holzmann | |
| 3,807,585 A | 4/1974 | Holzmann | |
| 3,820,807 A * | 6/1974 | Curran | B62B 5/061 280/47.3 |
| 3,860,254 A * | 1/1975 | Wegener | B62B 1/208 280/652 |
| 3,913,762 A * | 10/1975 | Alexander | B62B 5/04 414/490 |
| 4,055,354 A * | 10/1977 | Sharpe | B62B 5/061 280/47.31 |
| 4,063,744 A * | 12/1977 | Fraser | B62B 1/208 280/42 |
| 4,589,508 A * | 5/1986 | Hoover | B62B 1/24 180/13 |
| 4,646,860 A | 3/1987 | Owens et al. | |
| 5,149,118 A | 9/1992 | Oxford | |
| 5,690,046 A | 11/1997 | Grzech, Jr. | |
| 6,129,166 A | 10/2000 | Sueshige et al. | |
| 6,139,029 A * | 10/2000 | Shaw | B62B 1/206 280/47.371 |
| 6,170,839 B1 * | 1/2001 | Kizewski | B25H 3/00 280/47.19 |
| 6,325,395 B1 | 12/2001 | Frymoyer | |
| 6,474,007 B1 * | 11/2002 | Sueshige | B62B 1/20 180/19.3 |
| 6,712,652 B2 | 3/2004 | Roycroft | |
| 6,793,236 B1 | 9/2004 | Mitchell | |
| 6,821,166 B2 | 11/2004 | Roycroft et al. | |
| 6,824,150 B2 | 11/2004 | Simione | |
| 6,855,017 B2 | 2/2005 | Roycroft | |
| 7,131,666 B1 | 11/2006 | Jenney | |
| 7,172,207 B2 | 2/2007 | Henry | |
| 7,329,161 B2 | 2/2008 | Roering | |
| 7,417,437 B1 * | 8/2008 | Torres | B62B 1/10 280/19 |
| 7,438,611 B2 | 10/2008 | Gibbs | |
| 7,445,530 B2 | 11/2008 | Munshauer et al. | |
| 7,770,483 B2 | 8/2010 | Gibbs | |
| 7,793,744 B1 | 9/2010 | Hardie | |
| 8,033,348 B1 * | 10/2011 | Parkhe | B62B 9/085 180/19.1 |
| 8,419,046 B2 * | 4/2013 | Limontini | A61G 1/0293 280/640 |
| 8,505,960 B1 * | 8/2013 | Shindelar | B62B 3/025 280/651 |
| 8,613,455 B2 | 12/2013 | Berrett et al. | |
| 8,668,535 B1 | 3/2014 | Scroggs | |
| 8,783,698 B1 | 7/2014 | Elizondo et al. | |
| 8,936,268 B2 * | 1/2015 | Craven | B62B 1/208 280/654 |
| 9,365,087 B2 | 6/2016 | Aoki et al. | |
| 9,381,932 B1 * | 7/2016 | Giamanco | A45C 13/28 |
| 9,415,789 B2 | 8/2016 | Sommers | |
| D770,966 S | 11/2016 | Teixeira | |
| 9,517,670 B2 | 12/2016 | Gibbs et al. | |
| 9,956,976 B1 * | 5/2018 | Akre | B62B 3/02 |
| 10,654,503 B1 * | 5/2020 | Carlson | B62B 5/0036 |
| 2002/0017411 A1 * | 2/2002 | Weiss | B62B 5/0026 180/168 |
| 2003/0038457 A1 * | 2/2003 | Eskridge | B62B 3/02 280/648 |
| 2003/0071427 A1 * | 4/2003 | Simione | B62B 3/008 280/47.34 |
| 2003/0080538 A1 | 5/2003 | Watts et al. | |
| 2004/0065242 A1 | 4/2004 | Hough et al. | |
| 2004/0084864 A1 | 5/2004 | Casey et al. | |
| 2005/0012308 A1 * | 1/2005 | Swanner | B62B 1/125 280/652 |
| 2005/0104310 A1 * | 5/2005 | Lulay | B62B 5/06 280/47.31 |
| 2005/0155799 A1 * | 7/2005 | Chambers | B62B 5/0026 180/16 |
| 2006/0207831 A1 | 9/2006 | Moore et al. | |
| 2007/0075508 A1 * | 4/2007 | Miller | B62D 63/064 280/47.26 |
| 2007/0089917 A1 * | 4/2007 | Hartley | B60L 50/66 180/65.1 |
| 2007/0176426 A1 * | 8/2007 | Hirose | B62B 5/06 290/1 A |
| 2008/0048417 A1 | 2/2008 | Schroeder | |
| 2008/0197608 A1 | 8/2008 | Dixon | |
| 2008/0296866 A1 * | 12/2008 | Martin | B62B 5/06 280/304.5 |
| 2010/0110634 A1 * | 5/2010 | Woodbury, II | B62B 5/0026 361/698 |
| 2010/0270764 A1 * | 10/2010 | Odle | B62C 1/04 280/47.19 |
| 2012/0146386 A1 * | 6/2012 | Rowlands | B60L 58/18 298/2 |
| 2013/0267132 A1 | 10/2013 | Jeffery et al. | |
| 2014/0265254 A1 * | 9/2014 | Sekine | B66F 9/065 280/638 |
| 2014/0311824 A1 * | 10/2014 | Yoder | A01M 31/006 182/20 |
| 2015/0014950 A1 * | 1/2015 | Huskey | B62B 5/061 280/63 |
| 2015/0197260 A1 * | 7/2015 | Dilone, Jr. | B62B 1/125 280/30 |
| 2015/0284018 A1 * | 10/2015 | Krosney | B62B 3/005 422/292 |
| 2015/0291078 A1 * | 10/2015 | Carrillo, Jr. | B60P 3/426 296/100.02 |
| 2015/0336220 A1 * | 11/2015 | Christopher | B23K 9/133 219/137.2 |
| 2016/0039445 A1 * | 2/2016 | Sommers | B62B 5/0046 180/19.1 |

(56) References Cited

U.S. PATENT DOCUMENTS

| | | | |
|---|---|---|---|
| 2016/0121943 A1* | 5/2016 | Lamb | B62B 5/0033 |
| | | | 180/19.3 |
| 2016/0200335 A1 | 7/2016 | Piscitello et al. | |
| 2016/0229437 A1* | 8/2016 | Jackman | B62B 1/12 |
| 2016/0375737 A1 | 12/2016 | Klouzal | |
| 2017/0158264 A1* | 6/2017 | Blackhurst | B62D 12/00 |
| 2017/0291325 A1* | 10/2017 | Frammartino | B28D 7/02 |
| 2017/0297596 A1* | 10/2017 | Ertel | B62B 1/208 |
| 2017/0325445 A1* | 11/2017 | Mitchell | A01M 31/006 |
| 2018/0288996 A1* | 10/2018 | Shonka | B62B 5/067 |

* cited by examiner

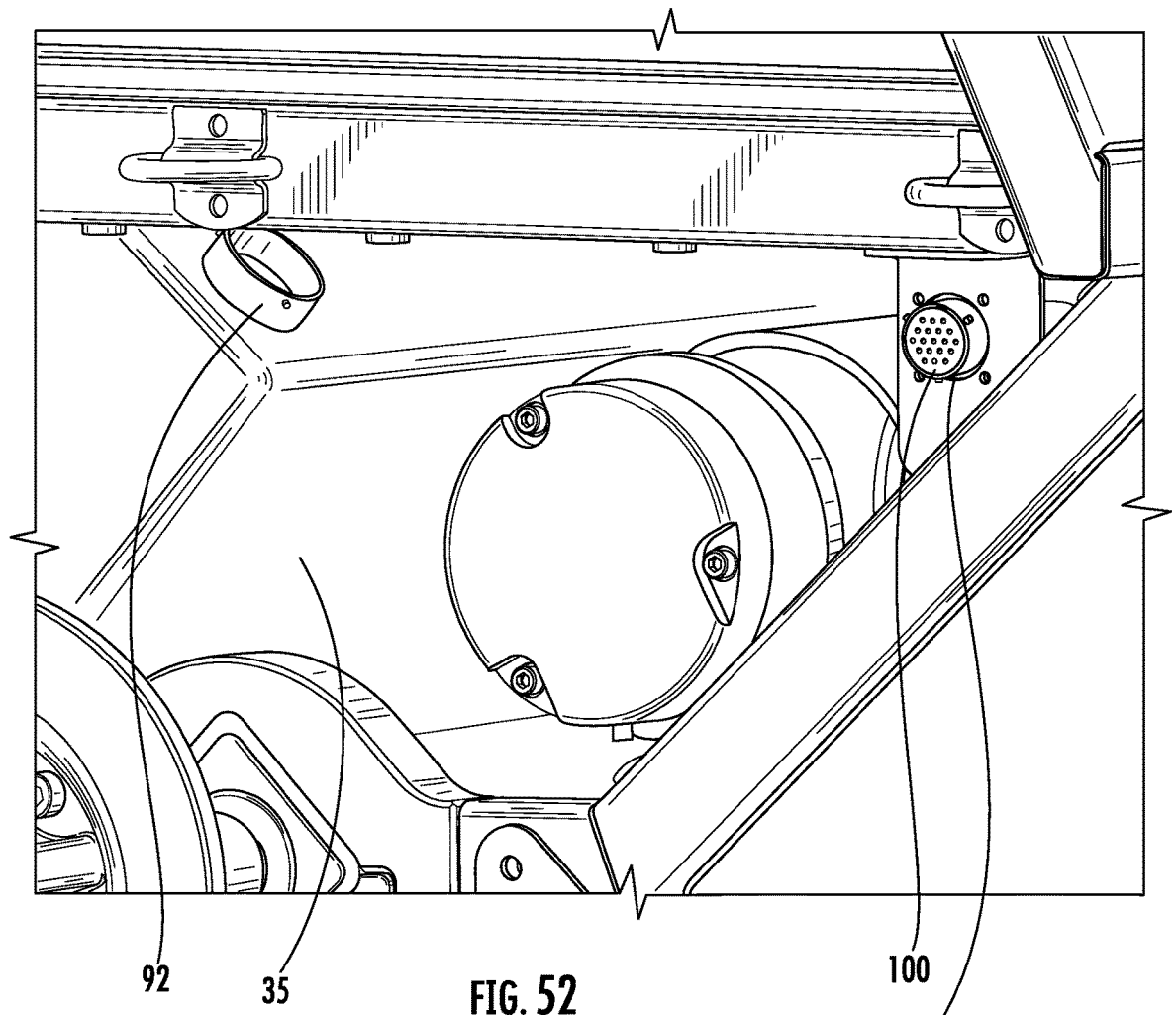
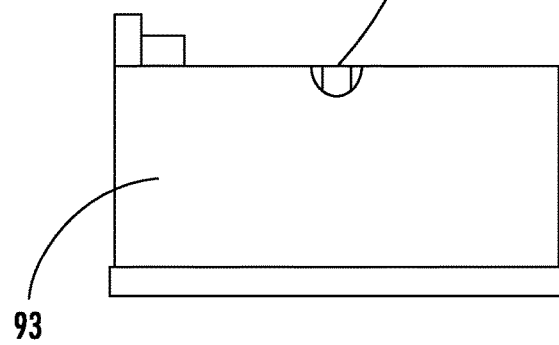
FIG. 52

TACTICAL TRANSPORT CART FOR MANUAL NAVIGATION OVER BOTH TOPOGRAPHIC AND HYDROGRAPHIC TERRAINS

CROSS-REFERENCE TO RELATED APPLICATION

This is a continuation-in-part application claiming priority from U.S. patent application Ser. No. 15/616,992, filed on Jun. 8, 2017, in the United States Patent and Trademark Office. The disclosure of which is incorporated herein by reference in its entirety.

FIELD OF THE INVENTION

The present invention relates generally to transport devices for moving various articles, including personnel, such as devices commonly referred to as carts, and more particularly, to carts adapted to tactical uses by military, law enforcement, fire, rescue and emergency response organizations for transporting items over diverse terrains, both over land surfaces and water-covered surfaces.

BACKGROUND OF THE INVENTION

Utility carts of many diverse structures with varied features, capabilities and end-use applications are known. The most basic carts are in the nature of unpowered wheelbarrows, wagons or trailers of a sufficiently small size and weight to be manually pushed or pulled over paved or generally flat or level unpaved surfaces. Some such carts contemplate a structure having active positive buoyancy to float on the surface of bodies of water to allow pushing or pulling motivation through water. Other carts are motorized to supplement manual movement and guidance, but no such carts are known to be operable within or through bodies of water or other water-covered terrain.

The conditions under which military, law enforcement, fire, rescue, and other emergency personnel operate are especially diverse and demanding. They may be called upon to navigate over remote and undeveloped terrains that may be hilly, rocky, and otherwise hazardous, as well as over water-covered areas ranging from creeks, streams, swamplands, ponds, and rivers that are equally or more difficult and hazardous. Such personnel also typically must transport various types of supplies and equipment into and out of such areas, and in some cases to move wounded or injured persons who are incapable of walking or moving under their own power. None of the known carts are suitable to operate under such differing conditions, for the varied tactical uses and purposes, and over the differing possible terrains as persons in these professions must deal with.

Accordingly, a need exists for a tactical cart adapted for manual navigation over both land and water-covered terrains to transport diverse articles.

SUMMARY OF THE INVENTION

Briefly summarized, the present invention provides a tactical transport cart configured to be manually navigable by a single human operator over both ground surfaces of topographic terrains and water-covered surfaces of hydrographic terrains. As used herein, "hydrographic terrains" is meant to fully encompass and include essentially all possible surfaces that are underwater or water-covered through which humans can walk, wade or swim, either above or below the water surface, including natural water-covered surfaces ranging from creek beds, stream beds, river beds, pond and lake beds, ocean floors, flooded areas, to swamps and muddy regions, and water-covered man-made surfaces such as culverts, storm sewers, drains, gutters, ditches, aqueducts, sluiceways, causeways, and spillways. "Topographic terrains" is meant to fully encompass and include essentially all other possible ground surfaces over which humans can ambulate by walking or crawling, including without limitation natural land surfaces ranging from fields, meadows, forests, woods, hills, mountains, rocks, unpaved trails and other above ground surfaces, to caves, caverns, tunnels and other subterranean surfaces, and man-made surfaces ranging from paved roads, paths, and other outdoor man-made surfaces, to structural surfaces such as hallways, breezeways and staircases.

According to the present invention, the transport cart basically comprises a frame, a payload-supporting area on the frame, a pair of terrain-engaging transport propulsion members attached to the frame in laterally spaced relation for supporting the frame at an elevation above surrounding terrain, and a handle structure attached to the frame and extending therefrom in orthogonal relation to the transport propulsion members. At least one motor is connected in driving relation to the transport propulsion members, and a battery is provided to supply motive power to the motor. A control device is operatively connected between the battery and the motor for controlling supply of motive power to the motor. The control device includes a switch device operable from the handle structure for selective actuation and deactuation of the motor. The handle structure is configured for manual grasping by a single human operator for steering movement of the frame over surrounding terrain while enabling simultaneous selective access to and operation of the control device. The frame, transport propulsion members and handle structure are cooperatively dimensioned and configured for movement of the cart over ground surfaces of topographic terrains and for partially and fully submerged movement over underwater and other water-covered surfaces of hydrographic terrains. The motor, the battery, the control device and connections therebetween are sealed to prevent water intrusion during partially or fully submerged operation.

Various embodiments and alternative features are contemplated for the tactical cart of this invention. As used herein, "terrain-engaging transport propulsion members" is meant to fully encompass and include essentially all possible means of supporting and moving the frame and other cart components as a unit across topographic and hydrographic terrains. For example, in contemplated embodiments, a pair of wheels may be rotatably attached, preferably in co-axial relation to each other, to opposite sides of the frame to serve as the transport propulsion members, and in other contemplated embodiments, a pair of track mechanisms may be attached to opposite sides of the frame as the transport propulsion members. The propulsion members may be of the type that are run-flat, bead locked, solid disc, tweel, terrain specific, among others. One or more additional wheels or track mechanisms could also be provided.

In wheeled embodiments, the wheels may include enlarged tires inflated at a relatively low pressure to present a wide footprint in contact with a surface, to optimize contact with terrain surfaces, such as tires commonly known as "all-terrain" and "high flotation" tires. Such tires do not actually impart buoyancy to the extent of a capability of the tires and cart for flotation at the surface of a body of water, but rather provide a profile and sufficient incremental buoyancy that enhances the surface area of contact by the tires to resist miring down in muddy, wet, loose or soft soils.

Differing motor arrangements are also contemplated. For example, in some embodiments, a motor may be mounted to the frame with at least one drive shaft extending outwardly for mounting of the wheels, track mechanisms, or other transport propulsion members. Alternatively, in other embodiments, individual motors may be assembled with the transport propulsion members, such as a so-called hub motor incorporated into a hub portion of each wheel, or a motor incorporated into each track mechanism.

Various configurations of the frame of the present cart are possible. For example, in contemplated embodiments, the frame includes frame members extending in a longitudinal direction and a cart body extending downwardly from the frame members for defining a lower enclosure. In such embodiments, the transport propulsion members may be attached to a lower side of the cart body and a platform may be affixed to the frame at an upper side of the cart body for defining the payload supporting area. The battery may be contained within a sealed battery housing and the motor may be contained within a sealed motor housing, each housed within the enclosure of the cart body. A general use storage compartment may also be provided within the enclosure.

Differing configurations of the handle structure are possible. In contemplated embodiments, the handle structure may comprise a pair of laterally spaced-apart handles attached to rearward ends of the frame members, and may further include means for mounting the handles selectively in multiple positions relative to the frame members. A second pair of laterally spaced-apart handles may be attached to forward ends of the frame members for optional assisted navigation of the cart by a second human operator. The switch device may include a throttle control on the handle structure for modulating operation of the motor.

Differing configurations of payload supports are also possible. For example, open and enclosed cargo boxes of differing sizes and configurations suited to carrying differing items of equipment, supplies, and the like could be mounted to the frame in addition to or instead of a platform. A litter for carrying injured or wounded personnel could be fitted to the frame. Any number of other purpose-built payload supports are also contemplated.

In one particular disclosed embodiment, the tactical transport cart comprises a frame having laterally spaced-apart longitudinally-extending frame members, a cart body extending downwardly from the frame members defining a lower enclosure, and a platform affixed to the frame at an upper side of the cart body defining a payload supporting area thereabove. A motor is contained within the enclosure within a motor housing sealed against water intrusion and having at least one drive shaft with opposite shaft ends extending sealably outwardly through the motor housing and outwardly therefrom to opposite sides of the frame at a lower side of the cart body. A pair of wheels is affixed to the opposite ends of the at least one drive shaft in laterally spaced coaxial relation for supporting the frame substantially entirely above the axis of the wheels, the wheels including all-terrain high-flotation tires. A battery is contained within the enclosure of the cart body within a battery housing sealed against water intrusion. A motor controller is housed within the enclosure of the cart body in sealed operative connection between the battery and the motor for controlling supply of motive power to the motor. A handle structure comprising a pair of laterally spaced-apart handles is attached to rearward ends of the frame members in perpendicular relation to the axis of the wheels. A switch device is mounted on one of the handles and operatively connected sealably to the motor controller for selective remote actuation of the motor, the switch device including a throttle control for modulating operation of the motor. The handle structure is configured for manual grasping of the handles by a single human operator for steering movement of the frame while enabling simultaneous access to and operation of the control device via the switch. The frame, wheels and handle structure are cooperatively dimensioned and configured for rolling movement of the cart over ground surfaces of topographic terrains and for partially and fully submerged rolling movement over underwater and other water-covered surfaces of hydrographic terrains.

BRIEF DESCRIPTION OF THE DRAWINGS

FIG. 52 is a view of locations for a port on tactical transport cart according to the present invention;

DETAILED DESCRIPTION OF THE INVENTION

Figure 1:
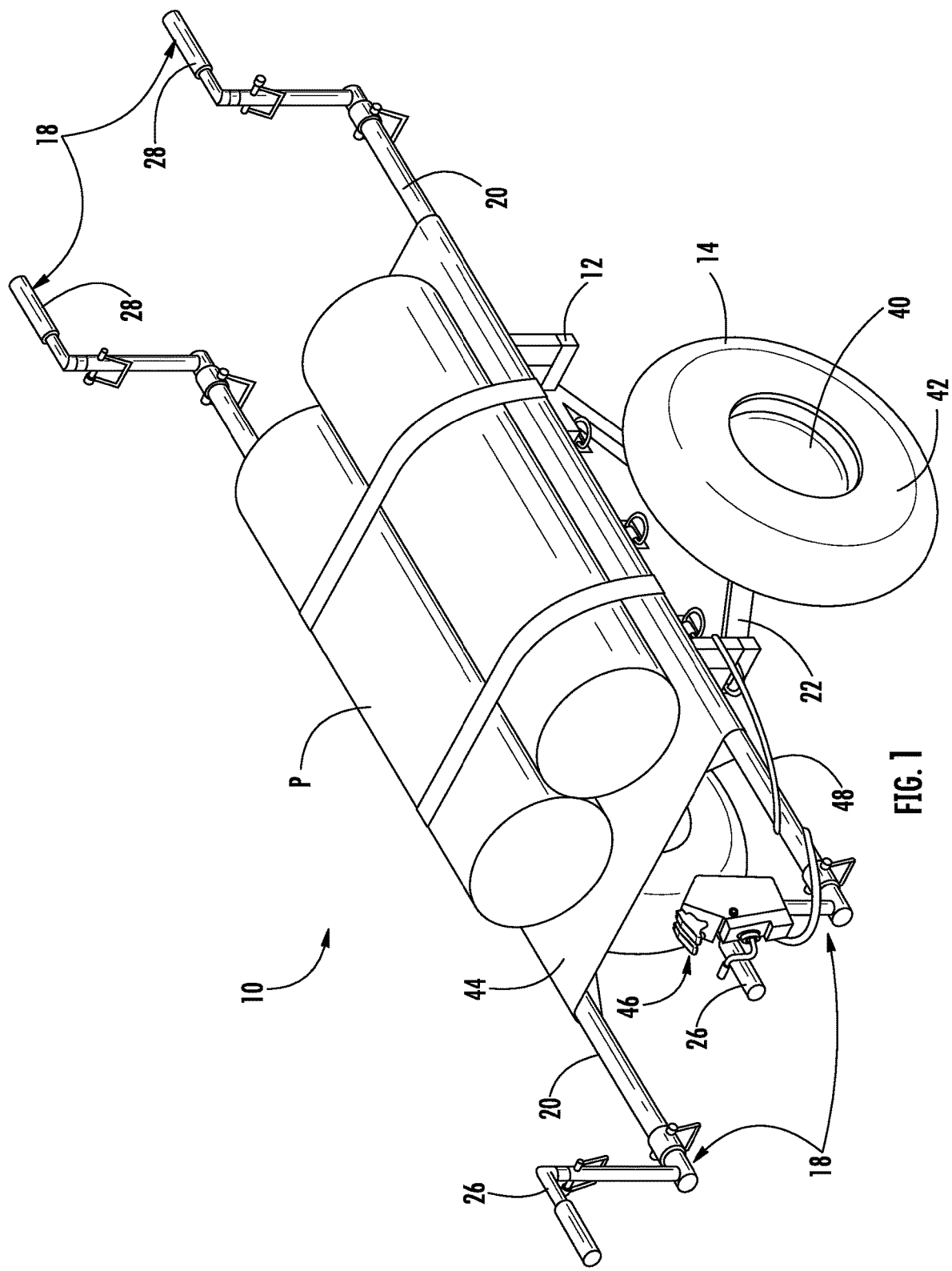
FIG. 1 is a perspective view of one contemplated embodiment of tactical transport cart according to the present invention.
Figure 2:
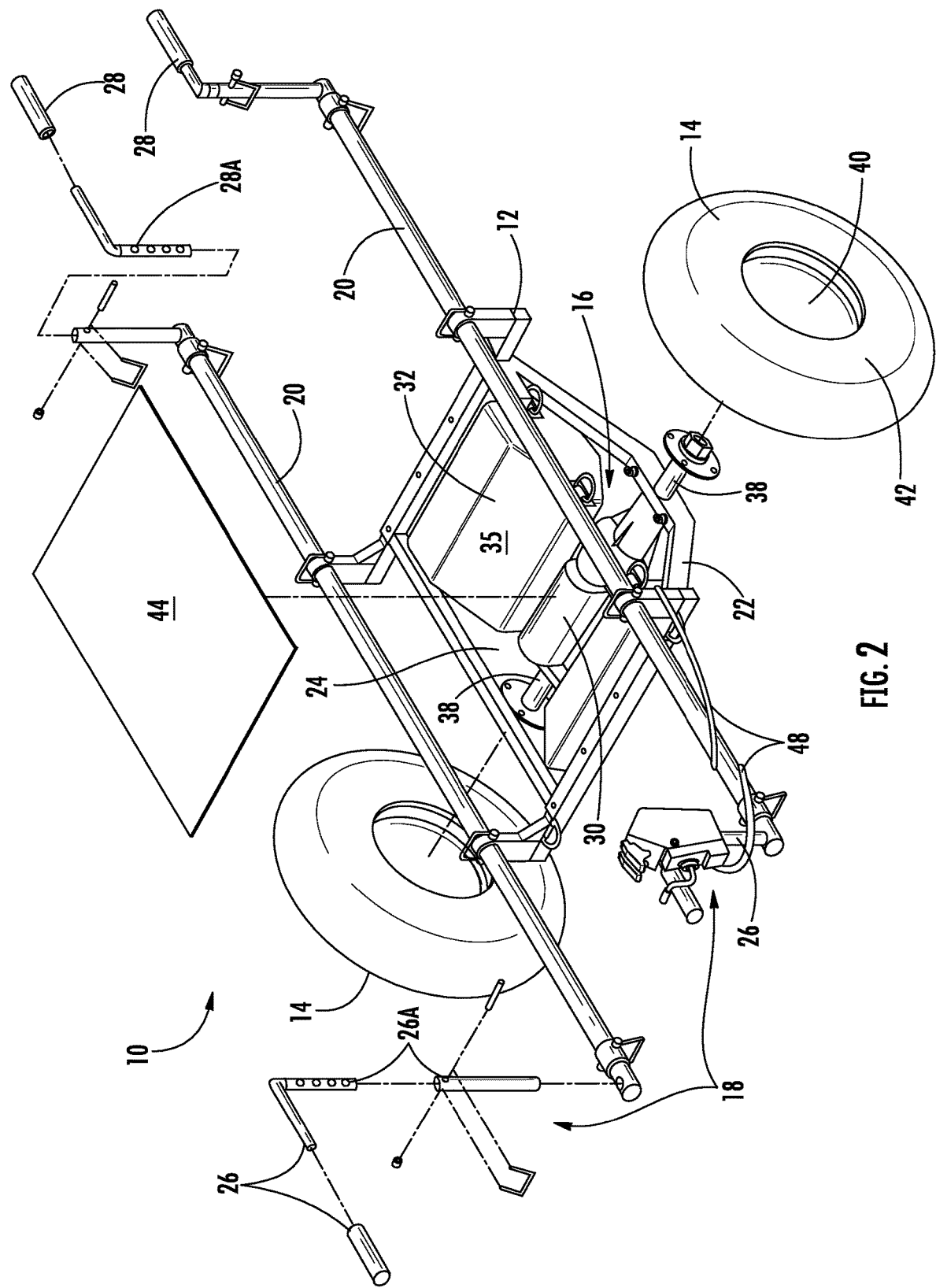
FIG. 2 is a partially exploded perspective view of the tactical transport cart of FIG. 1.
Figure 3:
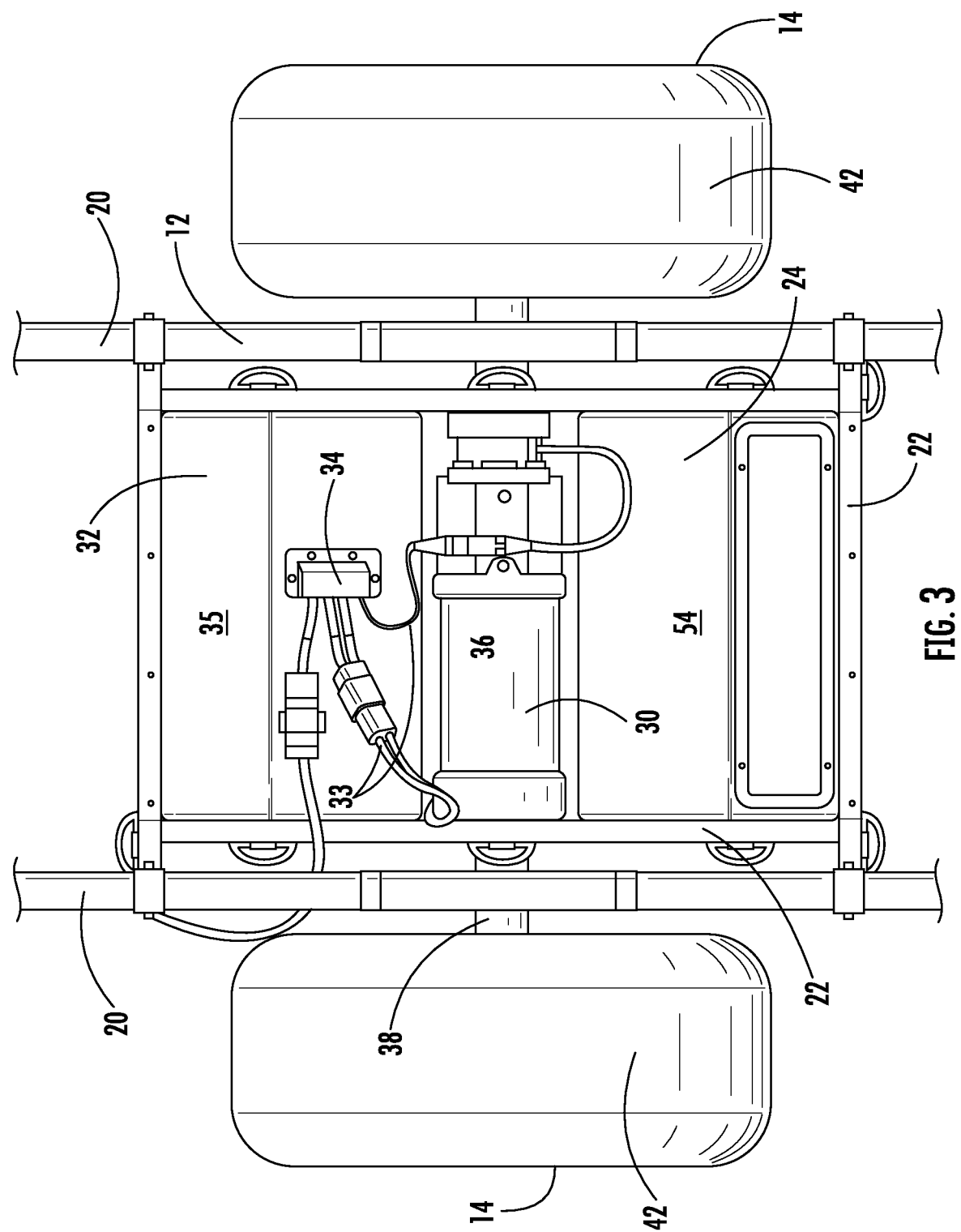
FIG. 3 is a top plan view of the tactical transport cart of FIG. 1, with the payload platform removed.

Referring now to the accompanying drawings and initially to FIGS. 1-3, one possible embodiment of a tactical transport cart according to the present invention is indicated generally at 10, and basically comprises a frame 12 supported on a pair of wheels 14, with a powertrain, indicated overall at 16, for driving the wheels 14, and a handle structure, generally indicated at 18, attached to the frame 12 for manual steering and guidance of the cart 10.

The frame 12 is an open, lightweight structure formed by a pair of laterally spaced-apart longitudinally-extending frame members 20 between which a triangular cart body 22 is centrally affixed and extends downwardly therefrom defining a lower enclosure 24 within the cart body 22. The powertrain 16 is housed within the enclosure 24 of the cart body 22 and basically comprises a motor 30, battery 32, and motor controller 34. The motor 30 is in the form of a motor and transaxle assembly contained within a common housing 36 and mounted within the lowermost region of the enclosure 24, with a pair of drive shafts 38 extending co-axially outwardly from opposite ends of the housing 36 and outwardly therefrom to opposite lateral sides of the cart body 22. The battery 32 and the motor controller 34 are contained in a common housing 35 mounted within the enclosure 24 of the cart body 22 adjacent the motor 30, with the motor controller 34 being operatively connected by cables 33 between the battery 32 and the motor 30 for controlling supply of motive power to the motor 30. In addition, one or more sealed storage compartments may be provided within the cart enclosure, such as representatively indicated at 54, to carry various smaller supplies, spare parts, tools, and the like.

Each wheel 14 comprises a central hub 40 about which is mounted an all-terrain high-flotation tire 42. The wheels 14 are affixed in coaxial relationship by mounting their respective hubs 40 to the laterally outward ends of the drive shafts 38 of the motor/transaxle assembly, thereby supporting the frame 12 substantially entirely above the axis of the wheels 14. The handle structure 18 comprises a first pair of laterally spaced-apart handles 26 attached to respective rearward ends of the frame members 20 and a second pair of laterally spaced-apart handles 5 attached to respective forward ends of the frame members 20, in perpendicular or orthogonal relationship to the axis of the wheels 14. A platform 44 is affixed to the frame members 20 adjacent the upper side of the cart body 22 for defining a payload supporting area thereabove on which may be transported any of various types of payloads, as representatively depicted by payload P.

Figure 4:
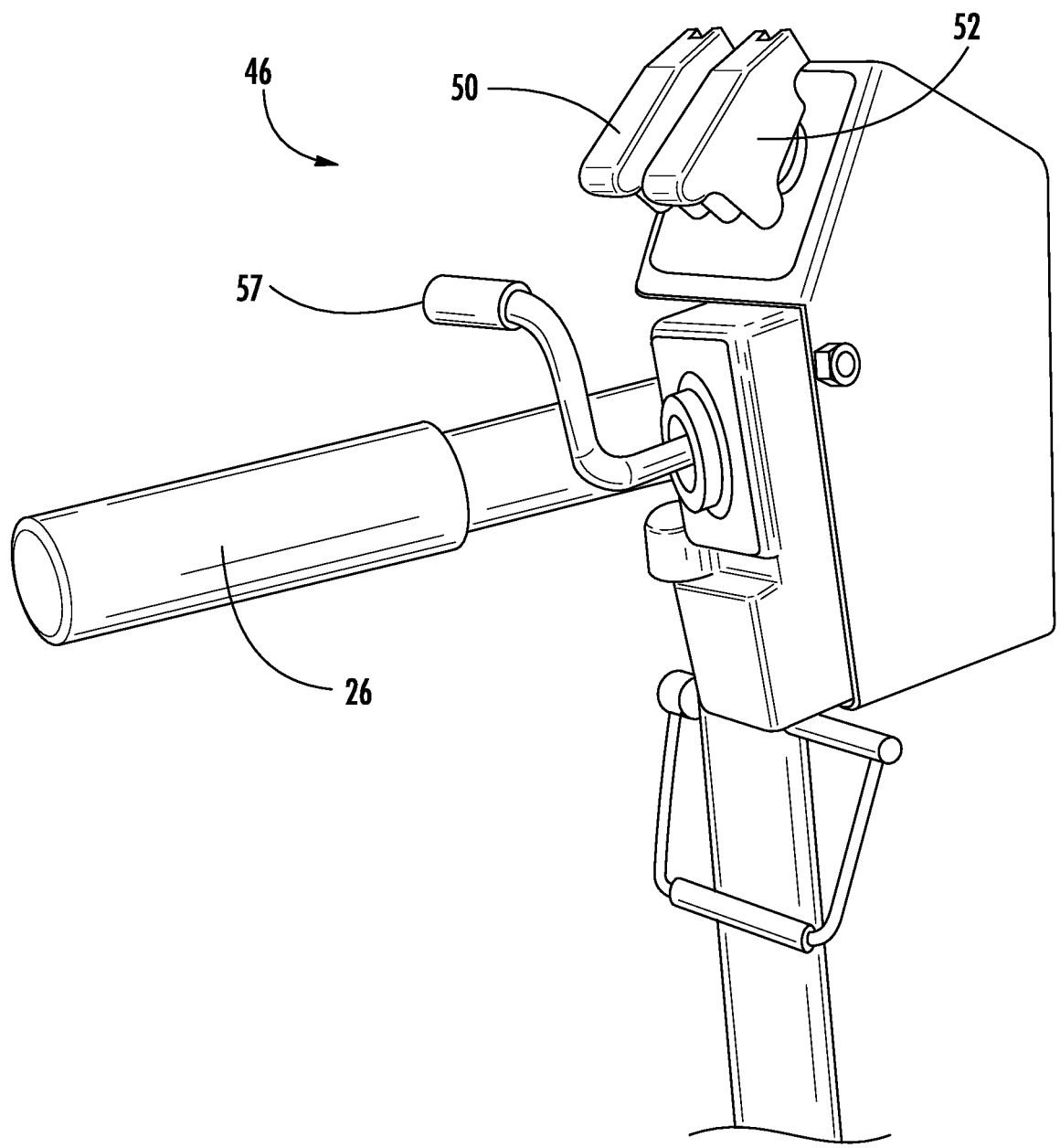
FIG. 4 is an elevational view of the control switches mounted on the handle structure of the tactical transport cart of FIG. 1.

A switch device, indicated overall at 46, is mounted on one of the rear handles 26 and is operatively connected by a cable 48 to the motor controller 34 for selective remote actuation and deactuation of the motor 30. As depicted in FIG. 4, the switch device 46 includes an on-off switch 50, a speed switch 52 selectable between high power and low power modes, and a throttle control lever 57 for modulating the delivery of battery power to the motor 30. The motor/transaxle housing 36, the battery/controller housing 35, the switch device 46 and the connections therebetween are each sealed against water intrusion.

The rearward handles 26 of the handle structure 18 are configured for manual grasping of the handles by a single human operator for steering movement of the cart 10 while simultaneously operating the motor controller 34 via the switch device 46. Either or both of the forward handles 28 may optionally be grasped by a second human operator to assist in maneuvering and guidance of the cart 10 during navigation, but no controls for powered operation of the cart are provided on or in proximity to the forward handles 28. Both sets of handles 26, 28 may be provided with a series of adjustment holes 26A, 28A, best seen in FIG. 2, to enable fine adjustment of the height of the handles and their extension forwardly and rearwardly from the frame 12, as may be desirable to adapt the handles 26, 28 for different operators.

The operation of the cart 10 may thus be understood. All of the structure of the cart 10, including particularly the frame 12, wheels 14, powertrain 16 and handle structure 18, is designed dimensionally and in configuration to facilitate manual navigation over diverse and varied terrains by a single human operator. More specifically, the cart 10 can be maneuvered manually, either under the drive power on the powertrain or solely under the manual power of the operator, over substantially any terrain over which the human operator can walk, crawl or swim, including in particular both ground surfaces of topographic terrains and underwater and other water-covered hydrographic terrains. In topographic terrains, the cart 10 is capable of powered or unpowered rolling movement under the guidance of an operator over paved and unpaved ambulatory land surfaces including natural surfaces such as fields, meadows, forests, woods, hills, mountains, rocks, unpaved trails, caves, caverns, tunnels, and other above ground and subterranean land surfaces, and man-made surfaces such as roads, paths, hallways, breezeways, step structures, staircases and other outdoor and indoor man-made surfaces. In such environments, the operator manually guides rolling movement of the cart 10 over the ground surface via the handles 26 while walking, running or even crawling behind the cart, with selective activation of the switch device 46 to assist with powered motivation of the cart 10 as needed.

Owing to the lightweight frame structure, the use of all-terrain high-flotation tires, and sealed powertrain components, the cart 10 is equally capable of partially and fully submerged powered or unpowered movement over water-covered hydrographic terrains including creek beds, stream beds, river beds, pond and lake beds, flooded areas, swamps and muddy regions, culverts, storm sewers, drains, gutters, ditches, aqueducts, sluiceways, causeways, spillways and other natural and man-made underwater surfaces. In such environments, the operator manually guides rolling movement of the cart 10 on the underwater surface from behind the cart via the handles 26 while walking over or wading through areas covered with relatively shallow depths of water, or even floating or paddling behind the cart through areas covered with deeper depths of water. Even in areas with water depths above the height of an operator, the cart 10 is capable of rolling navigation over the underwater surface, although the operator may need underwater breathing apparatus depending on the underwater distance to be traveled.

Figure 5:
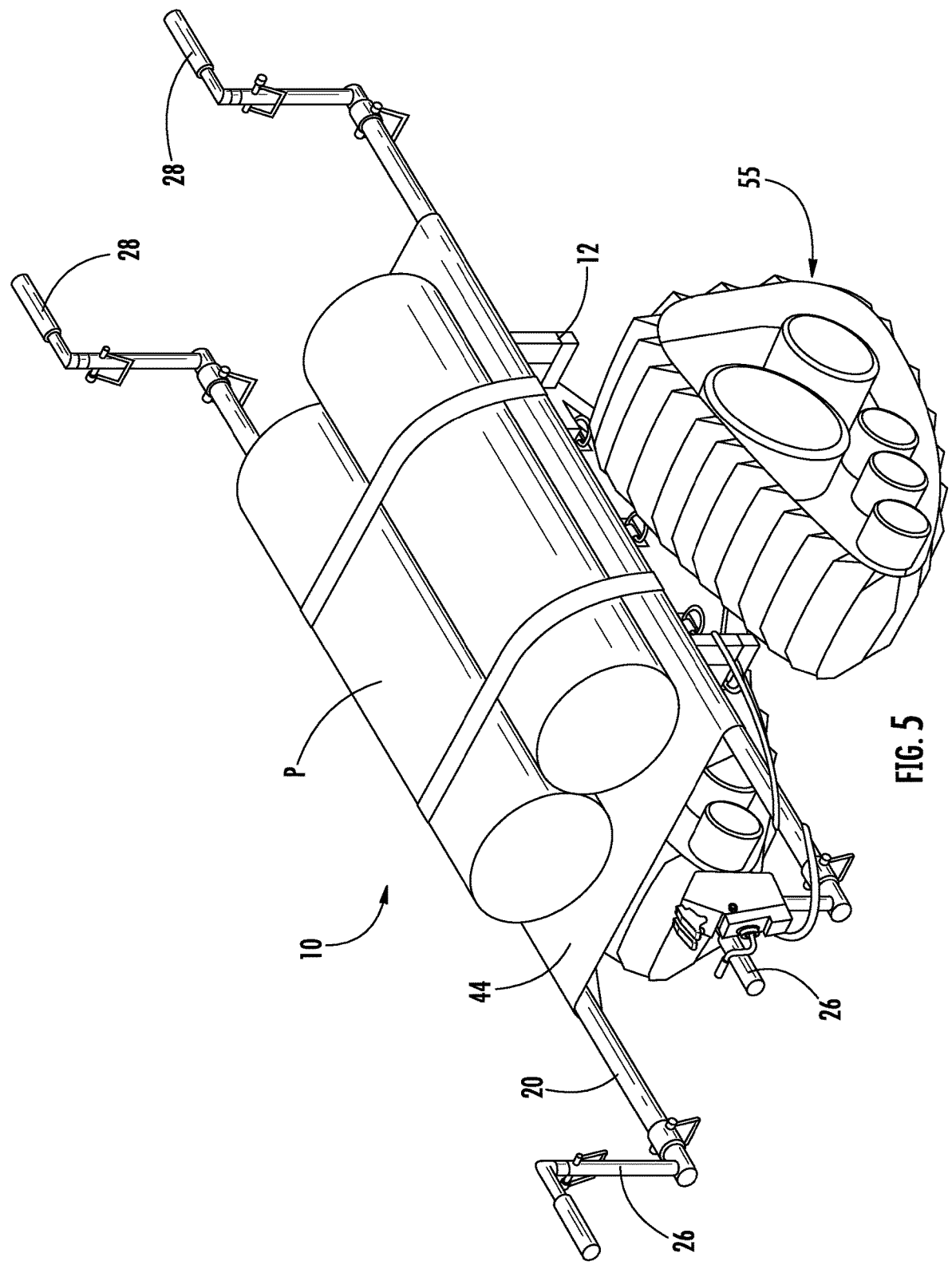
FIG. 5 is a perspective view of another contemplated embodiment of tactical transport cart according to the present invention.

Persons skilled in the art will recognize and understand that various additional and alternative features and embodiments of the cart are possible within the scope of the invention. For example, the cart could be equipped with continuous track mechanisms instead of wheels, such as representatively depicted at 55 in FIG. 5. As is known, track systems can provide enhanced navigation over soft terrains and also sharper steering and turning through driving the track mechanisms at differential speeds and/or in opposite directions, but otherwise track mechanisms are generally interchangeable with wheel/hub assemblies on wheeled vehicles.

Figure 6:
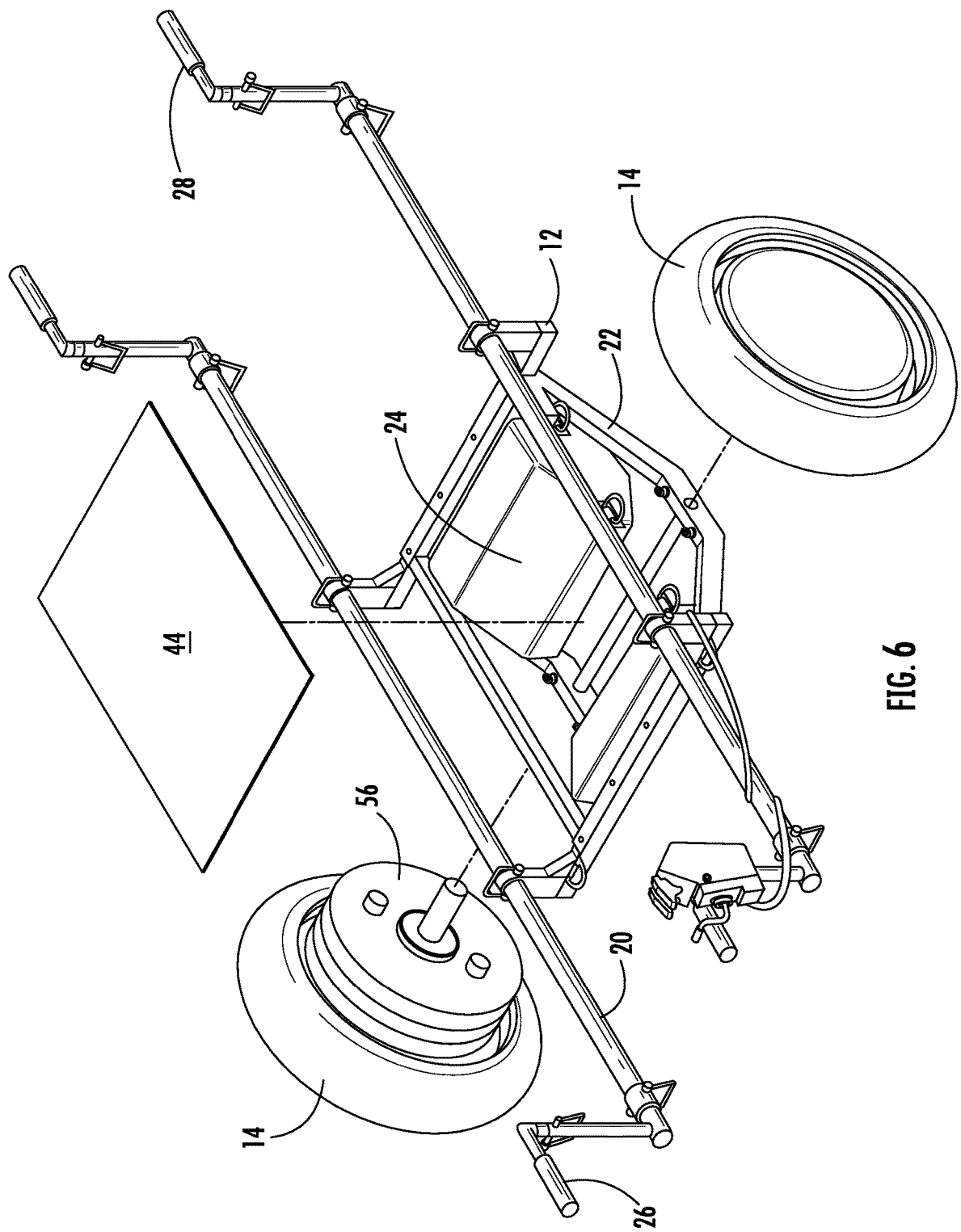
FIG. 6 is a perspective view of another contemplated embodiment of tactical transport cart according to the present invention.

Alternatively, in wheeled embodiments of the cart, each of the wheels could be equipped with an individual hub-mounted motor, such as depicted at 56 in FIG. 6, instead of the motor/transaxle assembly. Hub mounted wheel motors are well known and would offer the advantage of freeing additional space within the enclosure of the cart body to carry smaller items beneath the platform.

As will also be understood, the payload platform in the embodiments of the figures are merely representative. Various configurations of supports for carrying payload may be affixed to the frame instead of, interchangable with or in addition to a platform configuration, including for example but without limitation open and enclosed cargo boxes, a litter for carrying injured or wounded personnel, and any number of other purpose-built payload carriers designed for specific cargo applications.

Likewise, differing forms of handle structures are also contemplated. For example, a U-shaped or other handle structure transversely spanning between the frame members could offer the advantage of allowing an operator to actuate and deactuate the powertrain and guide navigation of the cart via different hand positions or possibly with only one hand.

While the cart of the present invention is not intended to float nor otherwise to be operable on the surface of a body of water, the cart could be equipped with supplemental flotation units to partially offset the weight of the cart and payload so as to allow the wheels, tracks, or other transport propulsion members of the cart to remain engaged with underwater and other water-covered hydrographic terrains but would aid in preventing the transport propulsion members from sinking into soft underwater surfaces, such as under ponds, streams and the like.

The advantages of the cart 10 for tactical uses by military, law enforcement, fire, rescue and emergency personnel will therefore be appreciated and understood. Fundamentally, the cart of the present invention combines into a single unit the capabilities of various other existing known transport devices. Further, the capability of the cart to navigate over virtually any topographic or hydrographic terrain expands the potential applications and uses of the cart enormously. The ability for a single operator to navigate the cart over such terrains further expands the applications for the cart. In a military setting, soldiers can transport weapons, munitions, equipment, food, water, and the like into battle settings in greater quantities, more rapidly and with less effort than any known conventional means. Law enforcement, fire, rescue and emergency personnel are similarly benefited by an ability to transport gear more quickly and easily into remote areas accessible only by foot.

Figure 7:
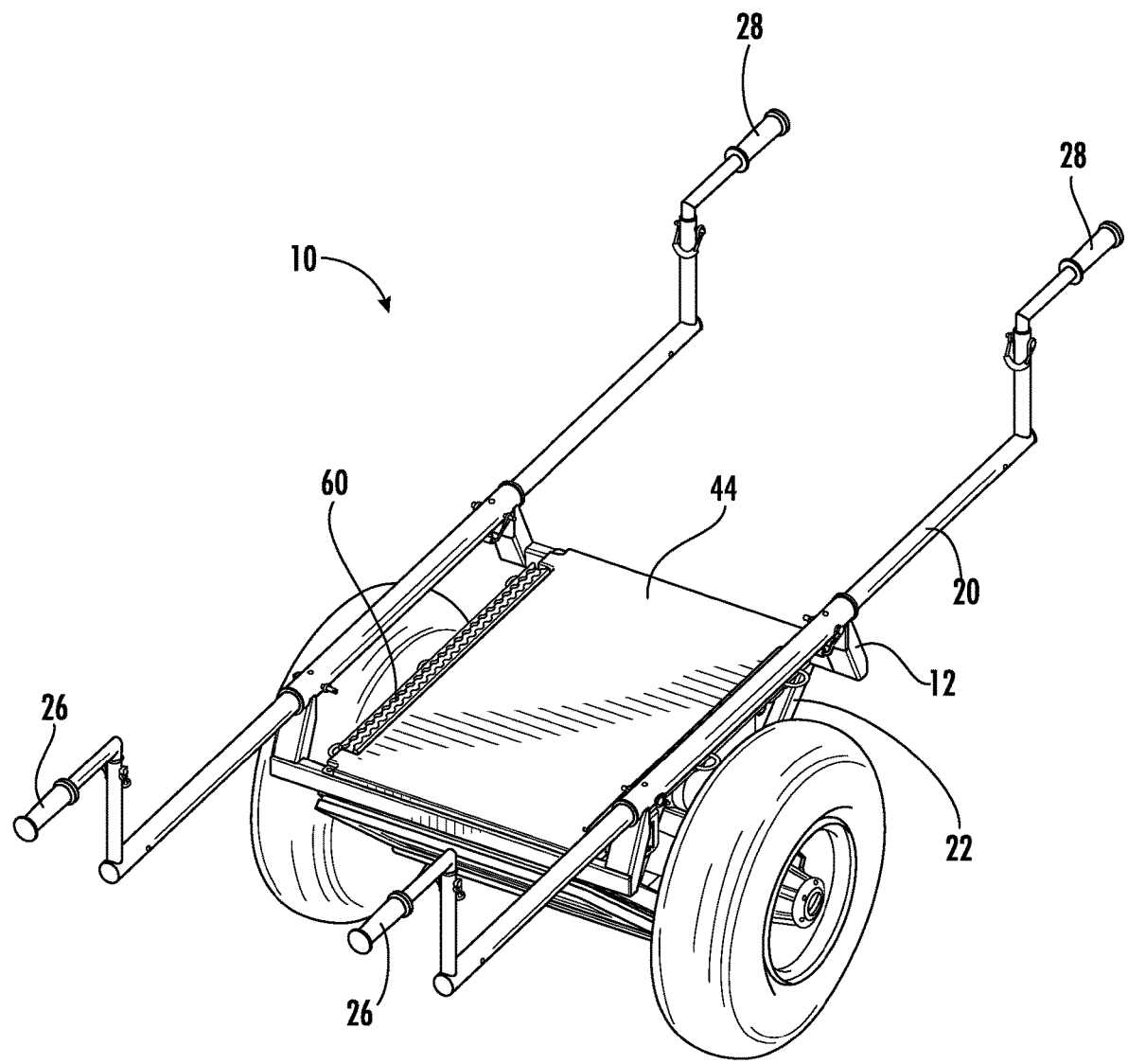
FIG. 7 is a perspective view of another contemplated embodiment of tactical transport cart according to the present invention.

FIG. 7 is a perspective view of another contemplated embodiment of tactical transport cart according to the present invention. In an embodiment of the invention, an attachment is attachable to frame 12, frame members 20, payload platform 44, cart body 22, or a combination thereof. Preferably, payload platform 44 is modifiable to accommodate payload. For example, modification to the platform may include, but is not limited to, the platform being a series of receptacles to receive containers of fuel, the platform being slats arranged in such a way as to allow drones to land and take-off, or combinations thereof. Preferably, the shape of payload platform 44 is rectangular. However, the shape can be of any shape suitable for the use or application of the cart.

Payload platform 44 is configurable and accepting of a variety of attachments for securing diverse loads or load carrying devices. Examples of attachments include, but are not limited to, standard medical transport litters secured or attached such as through a clamp type mechanism or other mechanism, securing weapons platforms for operational use or transport in a tactical environment, supply material including ammunition, water, fuel, food, medical supplies, communication gear, collapsed shelters, watercraft, gas cylinders, generators, power supplies, clothing, or any other material needs of an end user or cart operator. Other attachment points, hooks, clamps, and tie straps on the cart can be used independent of payload platform 44 or a multifunctional attachment point to enable hoisting or anchoring of the cart or other desired movement. The same attachment points can also enable securing of payload P.

The attachment is attachable to the tactical transport cart at one or more attachment points, typically in the vicinity of the payload supporting area. There are also various possible types of attachments within the scope of the present invention. FIG. 7 illustrates the attachment being a hard point for attachment or connection. A non-limiting example of the hard point for attachment or connection is a length of pre-drilled metal track referred to as an L-Track or logistics track 60 attached to cart body 22. Logistics track 60 provides a hard attachment point to which items can attach.

Figure 8:
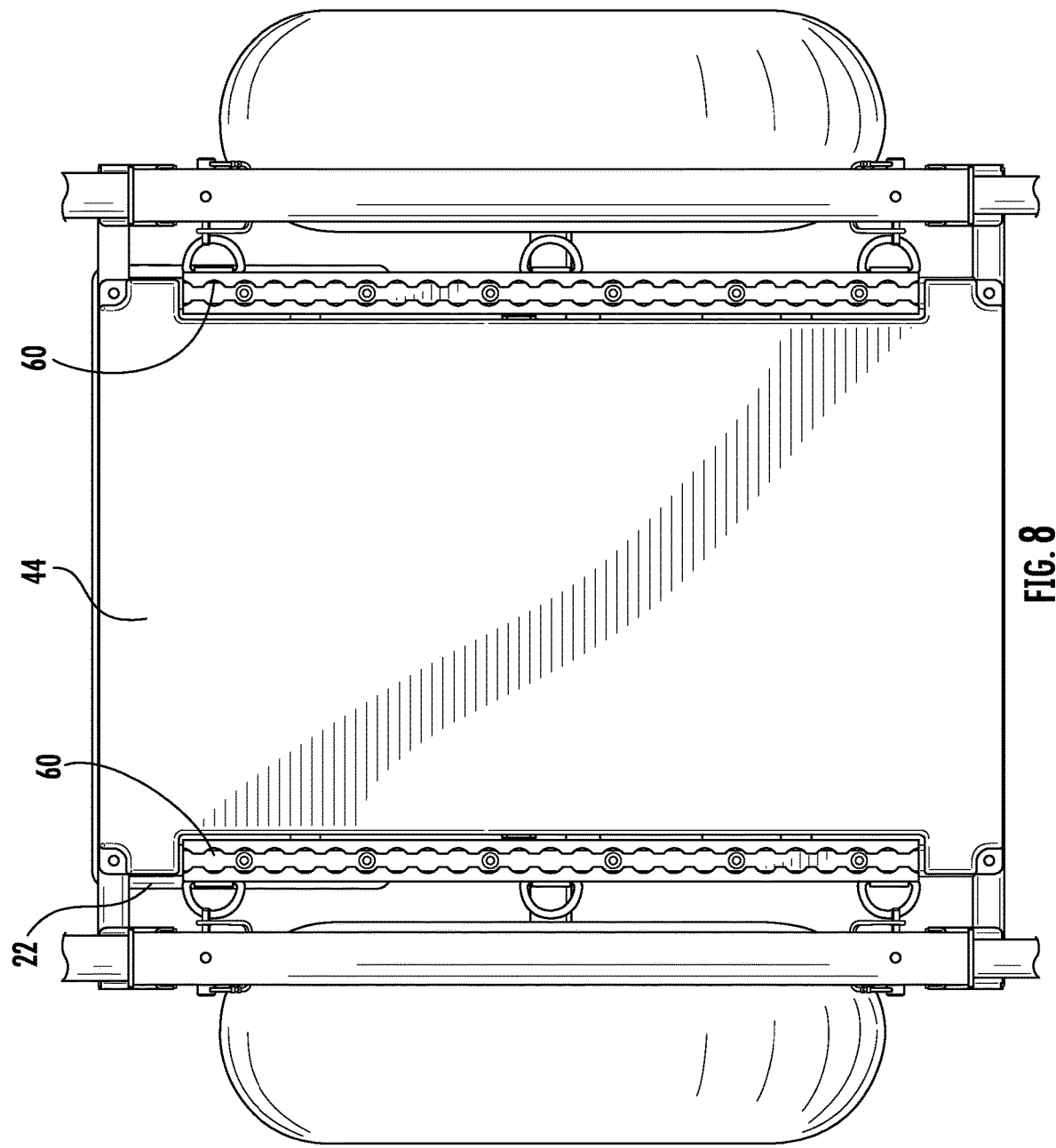
FIG. 8 is a top view of the payload supporting area of tactical transport cart of FIG. 7.

FIG. 8 is a top view of the payload supporting area of tactical transport cart of FIG. 7. Also shown in FIG. 8 is a top view of the payload supporting area having two logistic tracks 60 on opposing sides of cart body 22. Although shown on opposing sides, attachments could be present anywhere on cart 10.

Figure 9:
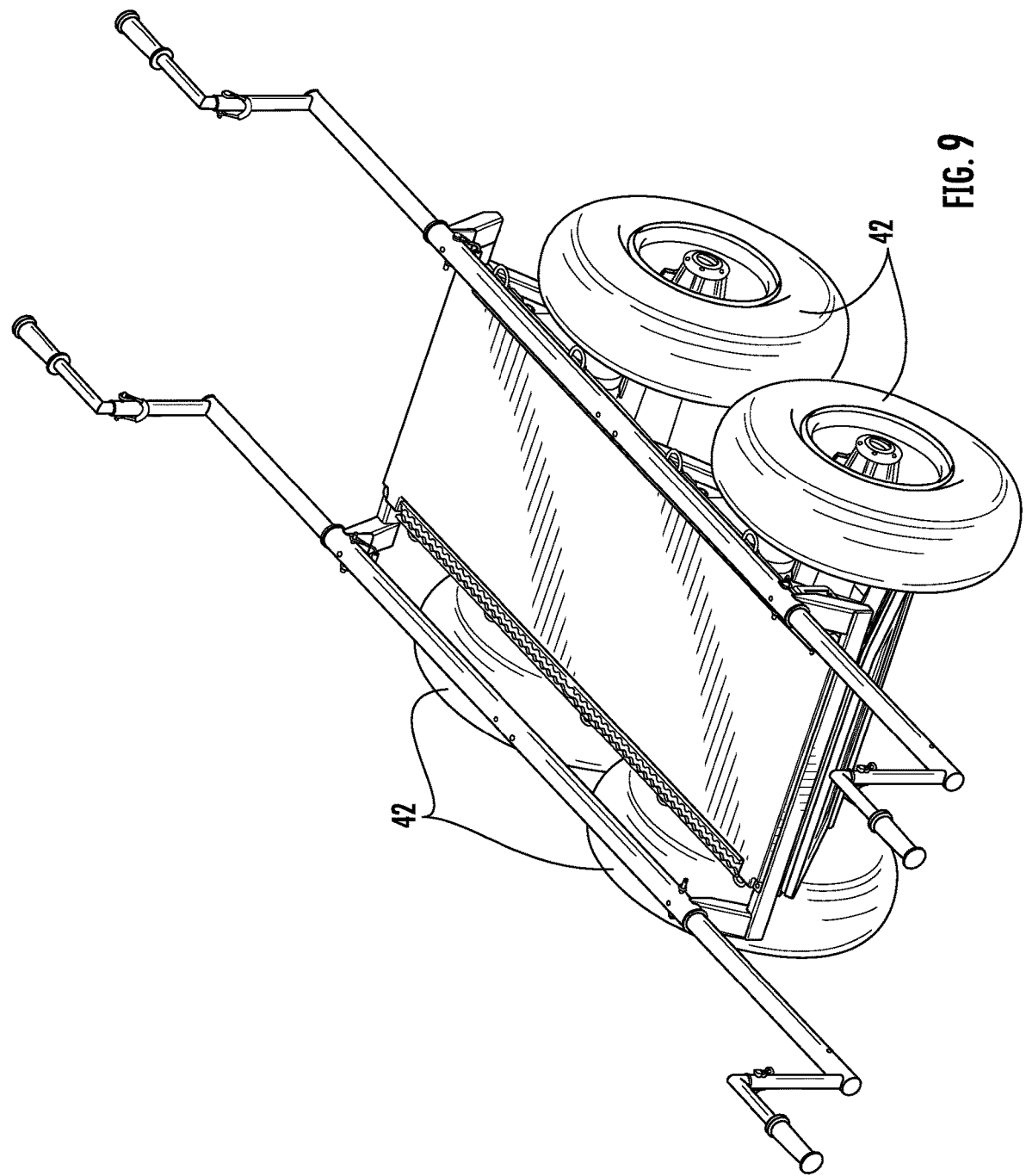
FIG. 9 is a perspective view of another contemplated embodiment of the tactical transport cart according to the present invention.

FIG. 9 is a perspective view of another contemplated embodiment of the tactical transport cart according to the present invention. FIG. 9 illustrates the tactical transport cart having four wheels. The present invention contemplates that the number of wheels may vary.

Figure 10:
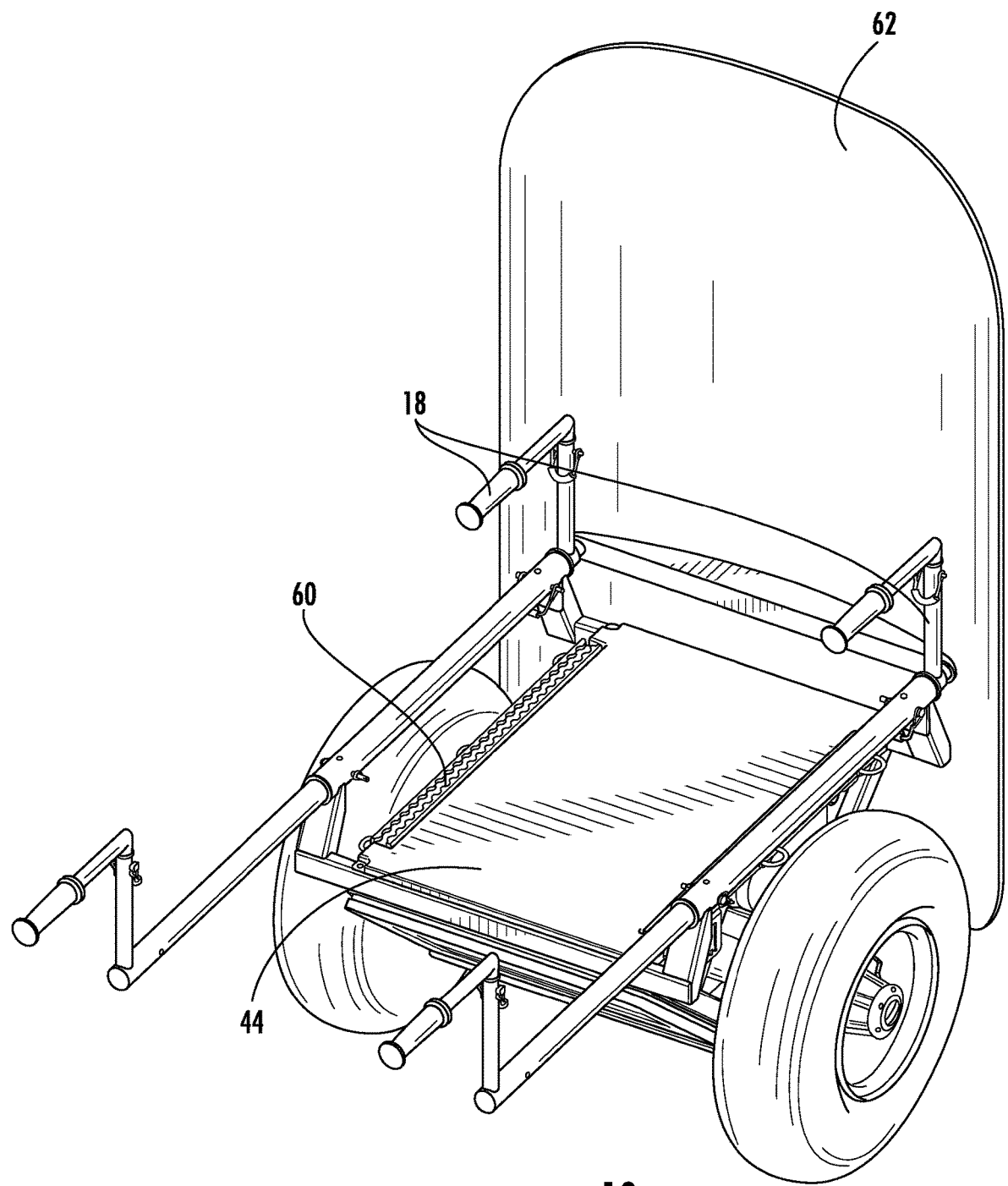
FIG. 10 is a perspective view of a ballistic shield mounted to tactical transport cart in an embodiment of the present invention.
Figure 11:
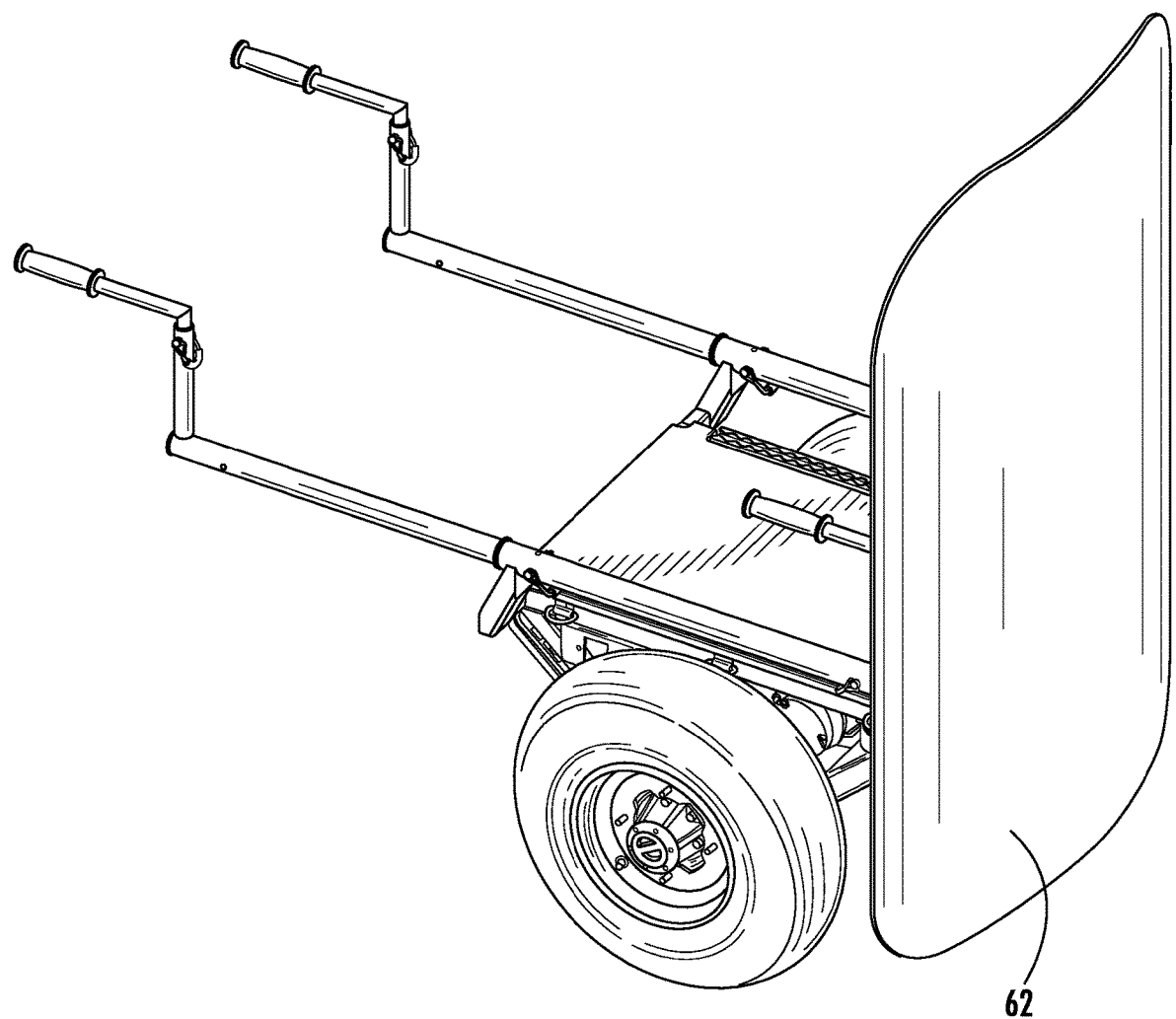
FIG. 11 is another perspective view of a ballistic shield mounted to tactical transport cart in an embodiment of the present invention.
Figure 12:
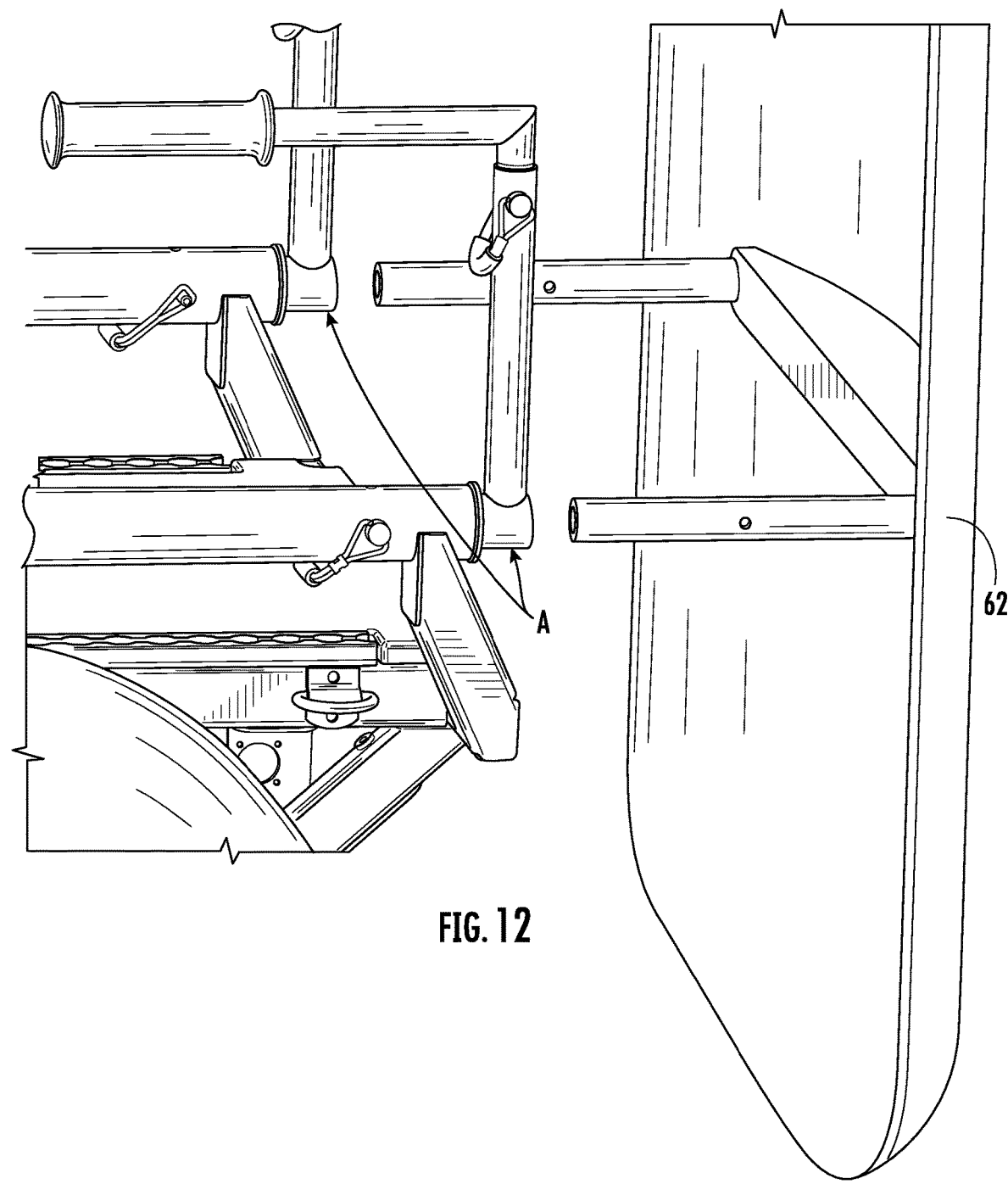
FIG. 12 is a mounting location of the ballistic shield of FIG. 10.

FIG. 10 illustrates a ballistic shield 62 mounted to tactical transport cart according to the present invention. By way of utilizing configurable handle structure 18, payload platform 44, supporting payload area, and other cart features, ballistic shielding or protection devices of varying strengths and types are mountable to the cart. The shielding is useful for protecting operators of the cart, personnel on the cart, vital cart components or cargo, among other items. FIGS. 10 to 12 illustrate mounting and locating options for ballistic and fragmentation protection.

Figure 13:
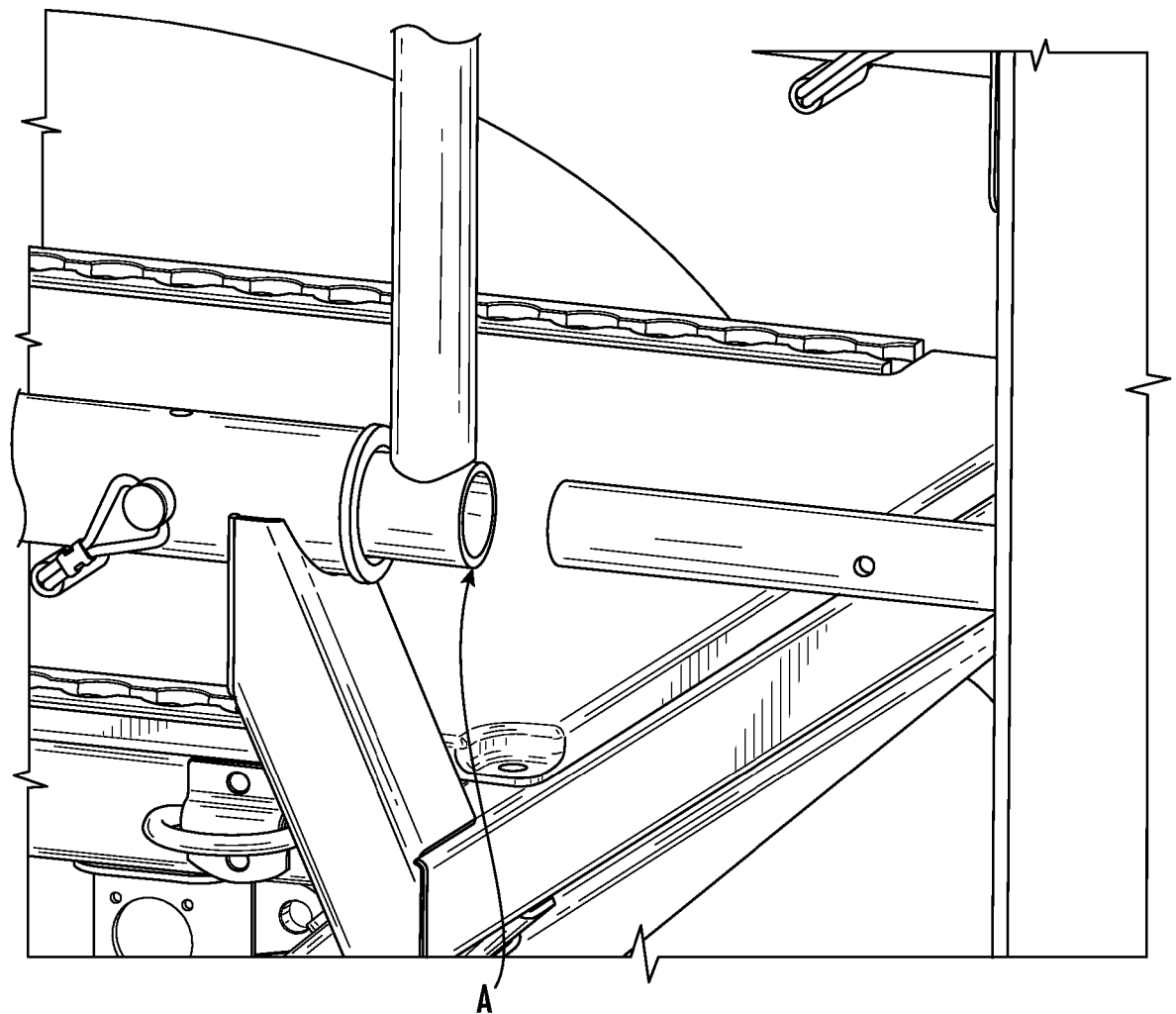
FIG. 13 is another view of the mounting location of the ballistic shield of FIG. 10.

The mounting location A shown in FIG. 12 is not exclusive to mounting of ballistic protection but could be varied to accommodate other attachment or equipment needs. The ballistic shield could be mounted, for example, to the hard point for attachment or connection or to the cart body by sockets, bolts, or a clamp. An alternate view of mounting location A is shown in FIG. 13.

Figure 14:
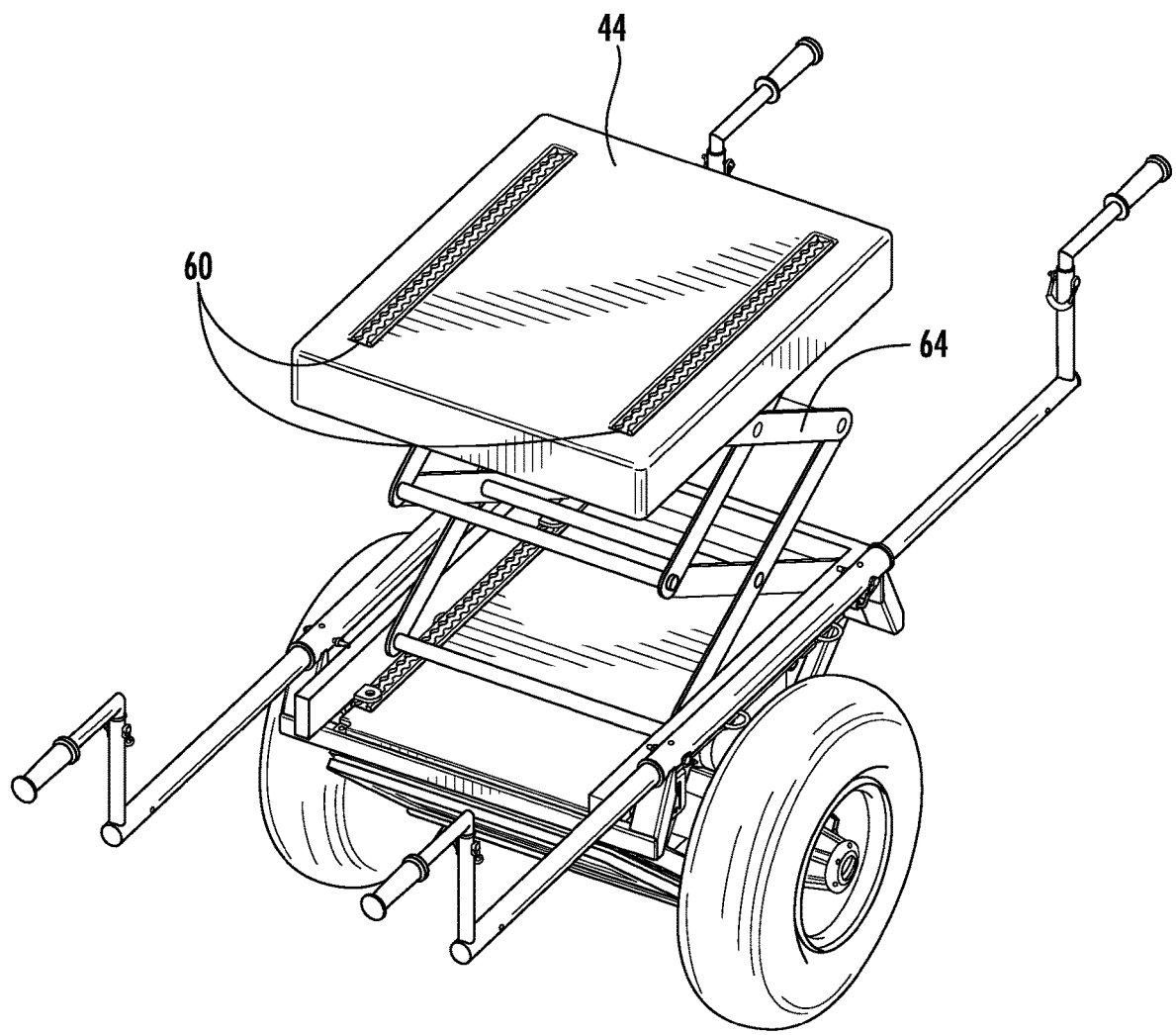
FIG. 14 is a perspective view of an elevatable payload platform of tactical transport cart in accordance with a contemplated embodiment of the present invention.
Figure 15:
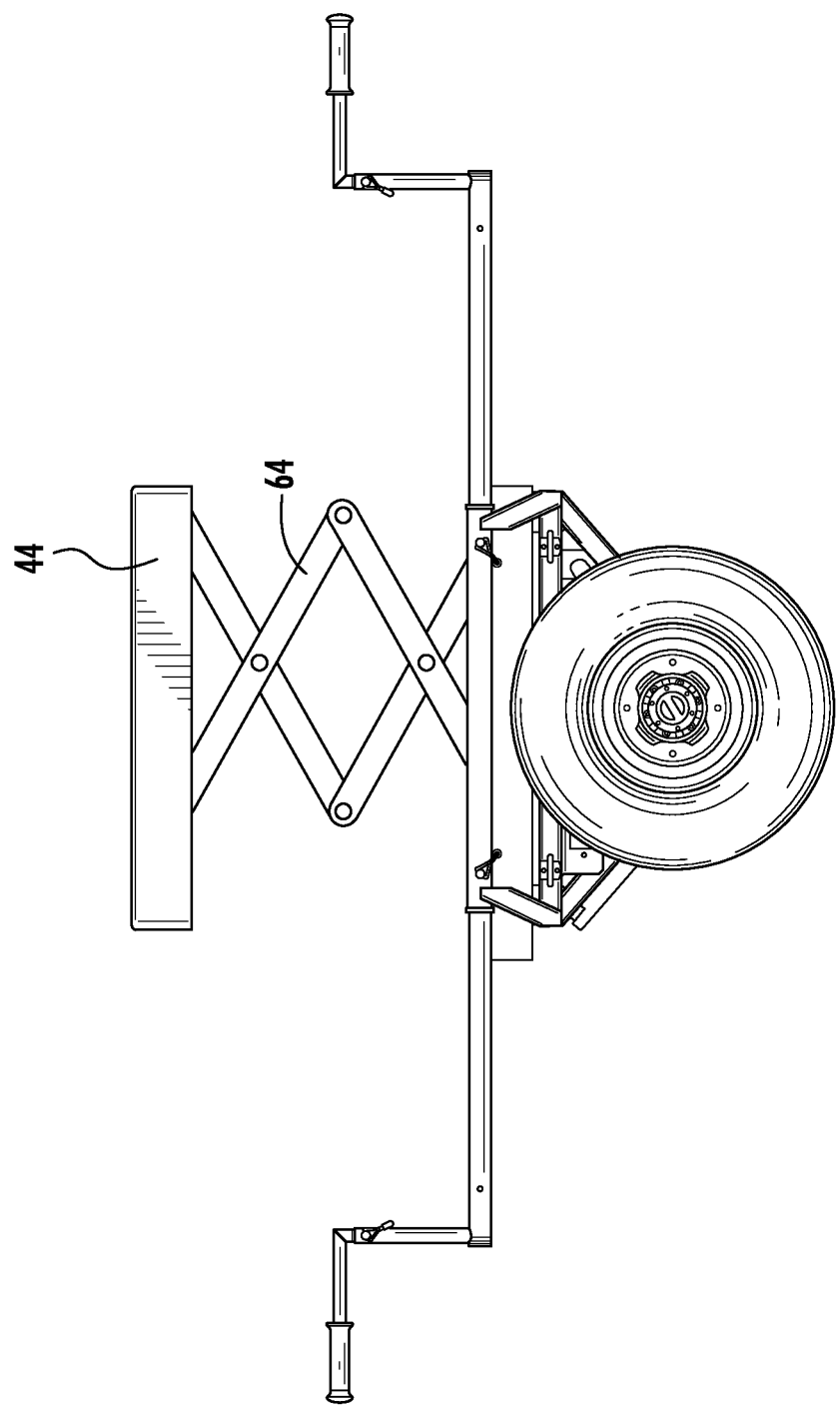
FIG. 15 is a side view of the elevatable payload platform of tactical transport of FIG. 14.

FIG. 14 illustrates an elevatable payload platform of tactical transport cart in accordance with a contemplated embodiment of the present invention. As shown in FIG. 14, payload platform 44 is elevatable to varying heights for a variety of purposes by an elevation mechanism 64. The elevated payload platform is advantageous in that it enhances or complements ergonomic unloading or loading of the cart, is useful for mechanical service jobs, medical applications, or other applications, provides selectable height variation for ballistic protection, and provides height variation as it pertains to augmenting payload distribution. Elevation mechanism 64 of the cart is powered using various electrical routings in the cart. FIG. 14 shows payload platform 44 elevated from its original position. As illustrated, elevation is achieved through elevation mechanism 64 having a scissor lift like mechanism or other device. FIG. 15 is a side view illustrating that payload platform 44 is movable in two directions. Payload platform 44 is mechanically or hydraulically lowered or raised. The payload platform can be used for various uses including, but not limited to, patient medical procedures or for lifting loaded cases for transfer to planes, vehicles, ledges, among other uses.

Figure 16:
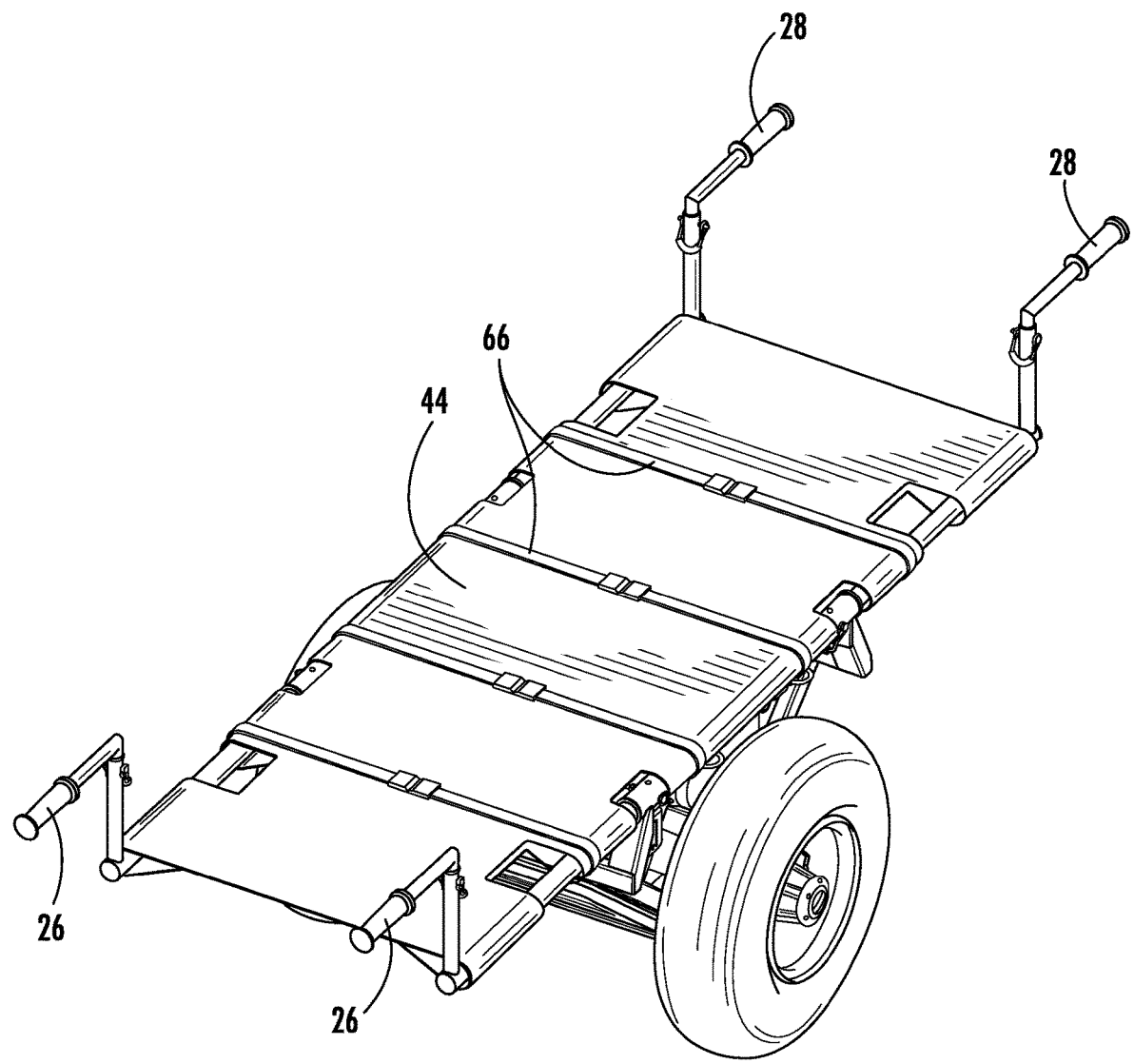
FIG. 16 is a perspective view of another contemplated embodiment of tactical transport cart according to the present invention.

FIG. 16 is a perspective view of another contemplated embodiment of tactical transport cart according to the present invention. FIG. 16 illustrates payload platform 44 in a form of a cloth. Independent of using payload supporting area attachments or attachment points, the cloth can be secured to the cart to enable the carrying of a range of payloads. The cloth is dimensioned in a manner that accommodates most standard medical litters and similar medical transport items such as stokes baskets, spine boards, rescue systems, among others. Independent of medical litters and similar medical transport items, the cloth may be used as a primary form of transport. Straps 66 are optionally attached to the cloth to secure varying payloads directly on top of the cloth. The use of the cart with cloth payload platform is preferably modular in such a manner that the cloth may remain attached whether the handles 26, 28 are fully extended or not without impedance to cart performance or operation.

Figure 17:
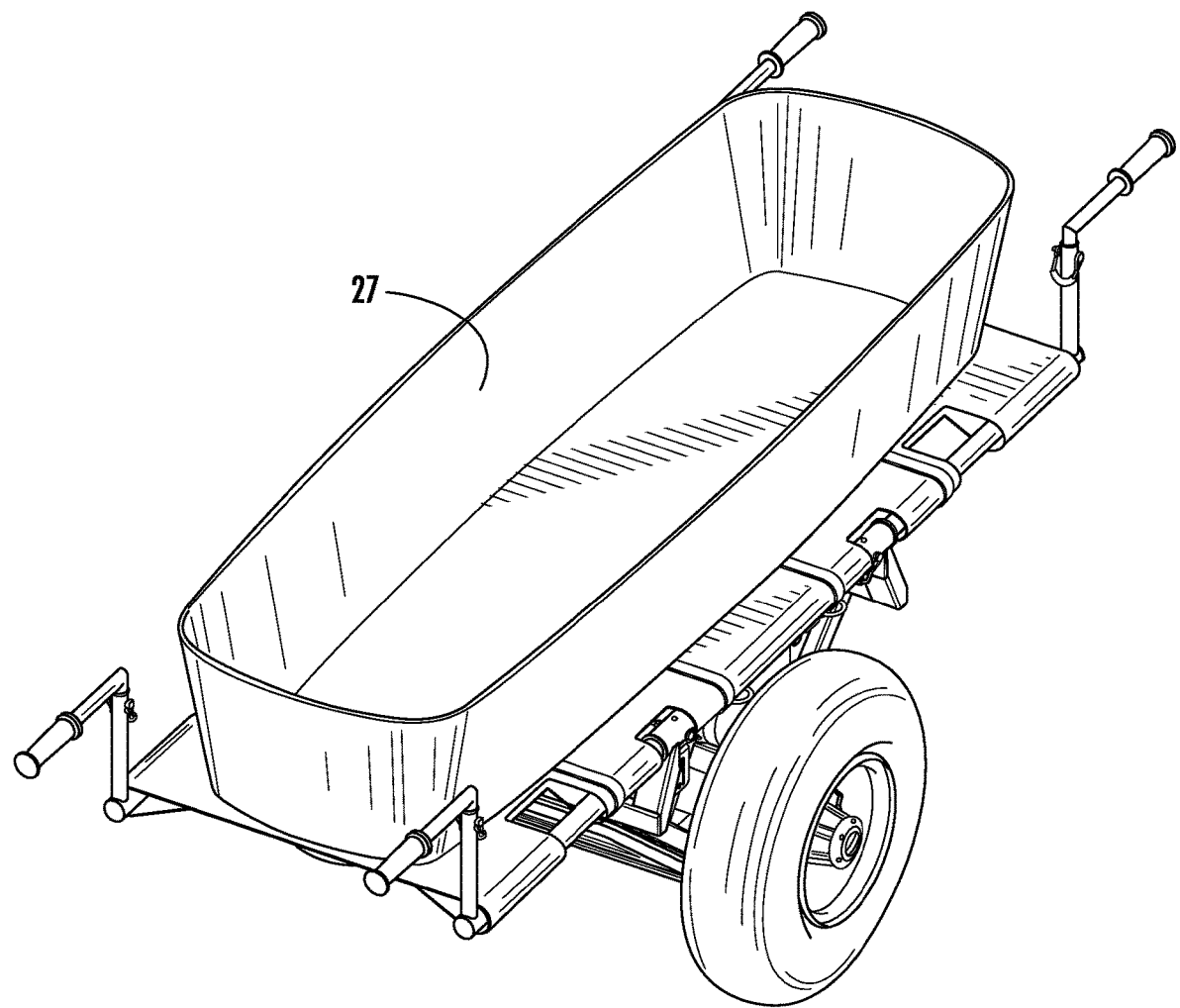
FIG. 17 is a perspective view of a bag attached to the tactical transport cart of FIG. 16.

FIG. 17 is a perspective view of a cargo bag attached to the tactical transport cart of FIG. 16. For example, the cargo bag may be of cloth or may have hard material sides or may have similar rigid structures attached to the cloth overall.

Figure 18:
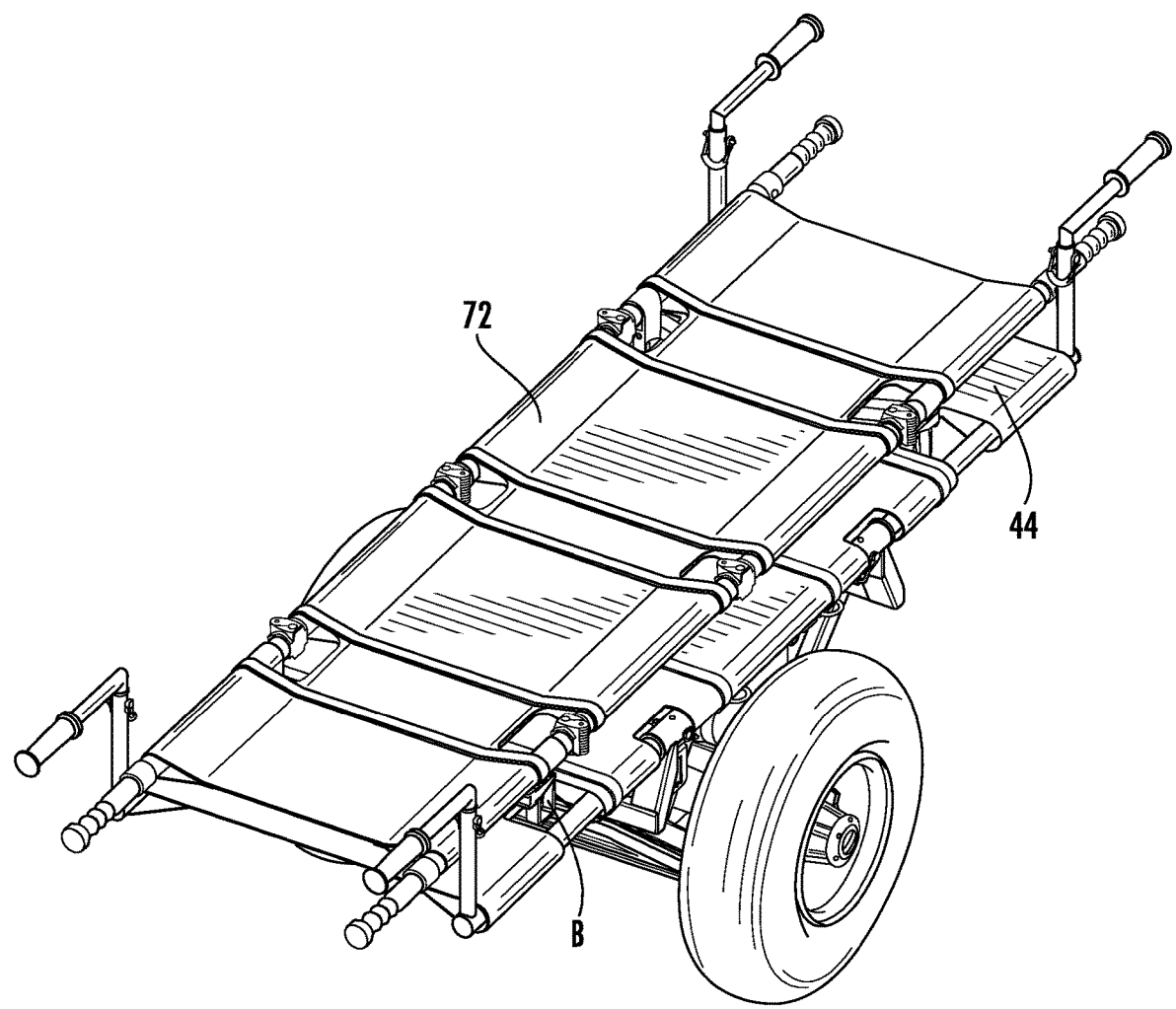
FIG. 18 is a perspective view of a standard medical transport item utilized on the tactical transport cart of FIG. 16.
Figure 19:
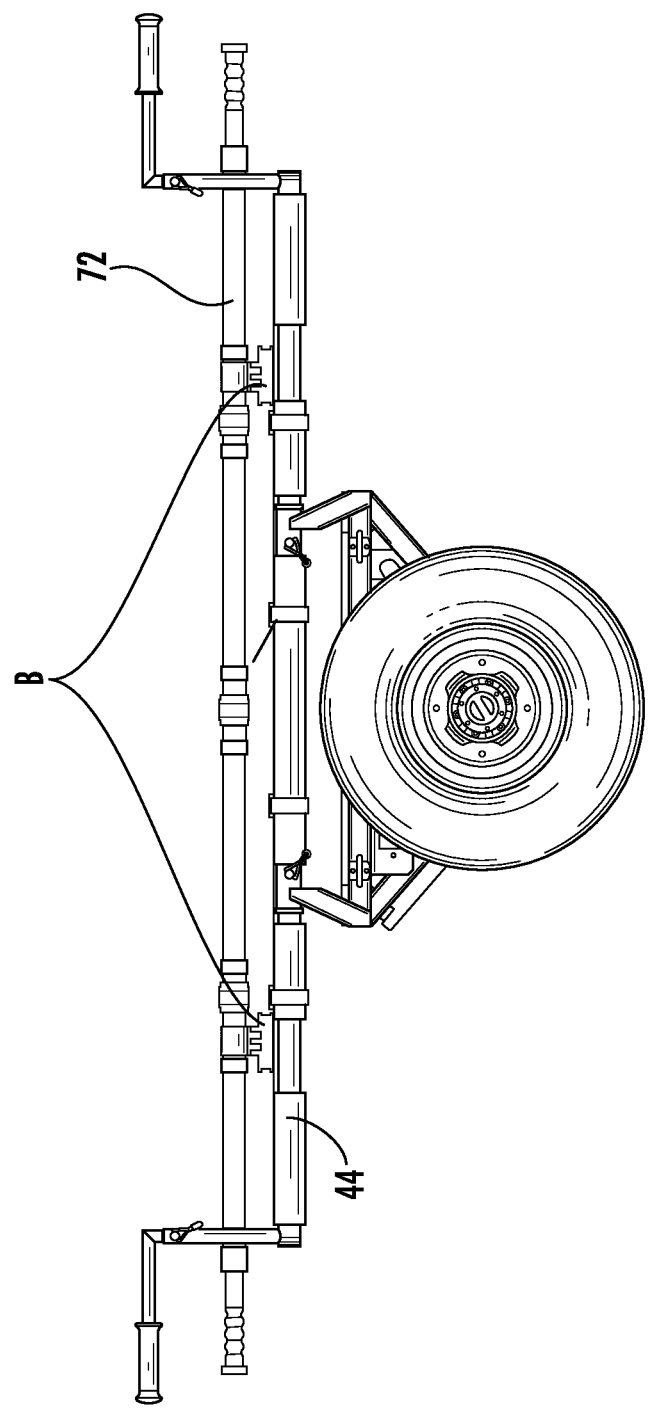
FIG. 19 is a side view of the tactical transport cart of FIG. 18.

FIG. 18 illustrates a standard medical transport item utilized on the payload cloth of the cart, more particularly a litter 72 attached at point of attachment B to the cloth payload platform. FIG. 19 is a side view of the cart of FIG. 16.

Figure 20:
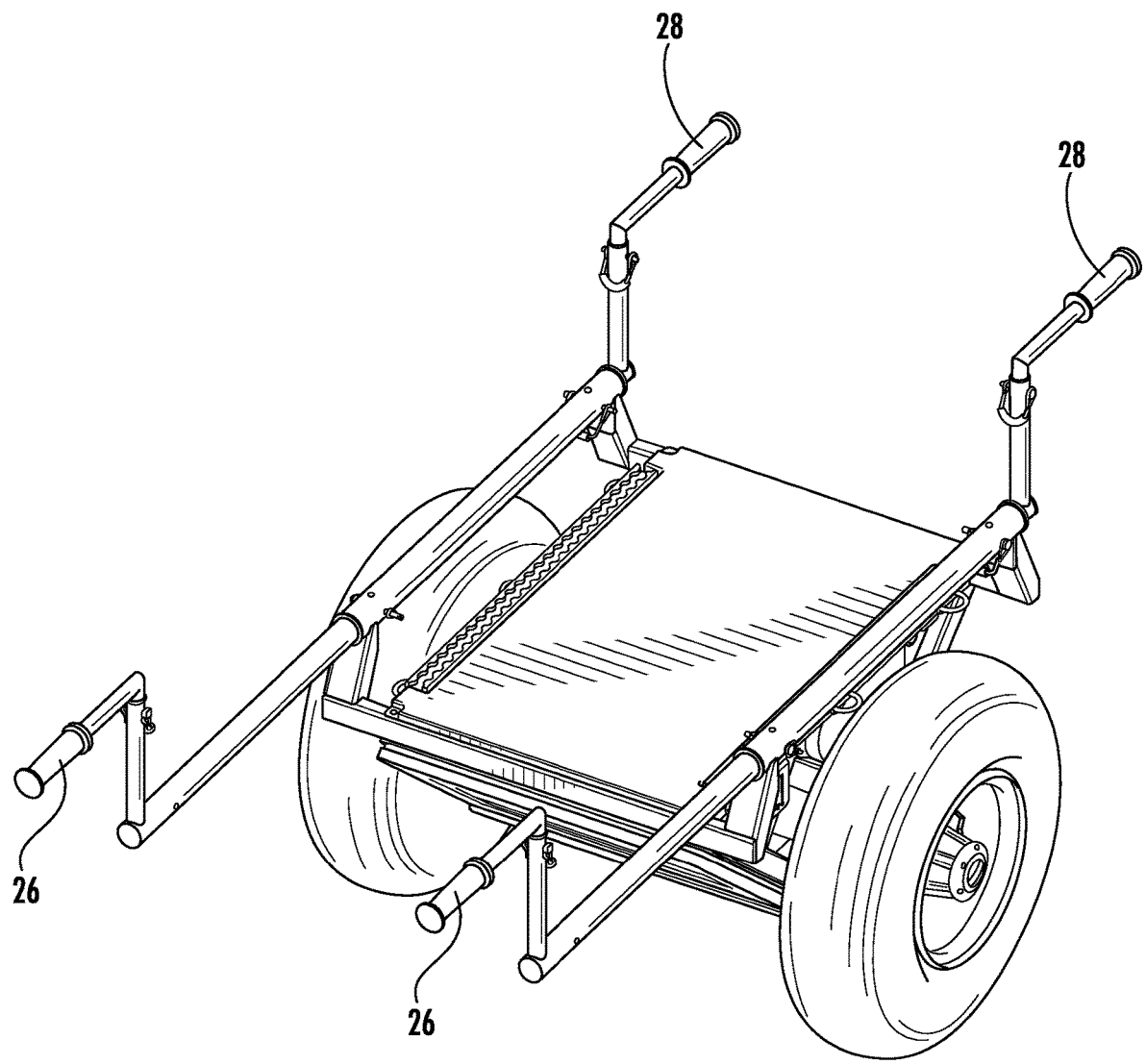
FIG. 20 is a perspective view of the tactical transport cart of FIG. 7 having handles that rotate, telescope, and stow.
Figure 21:
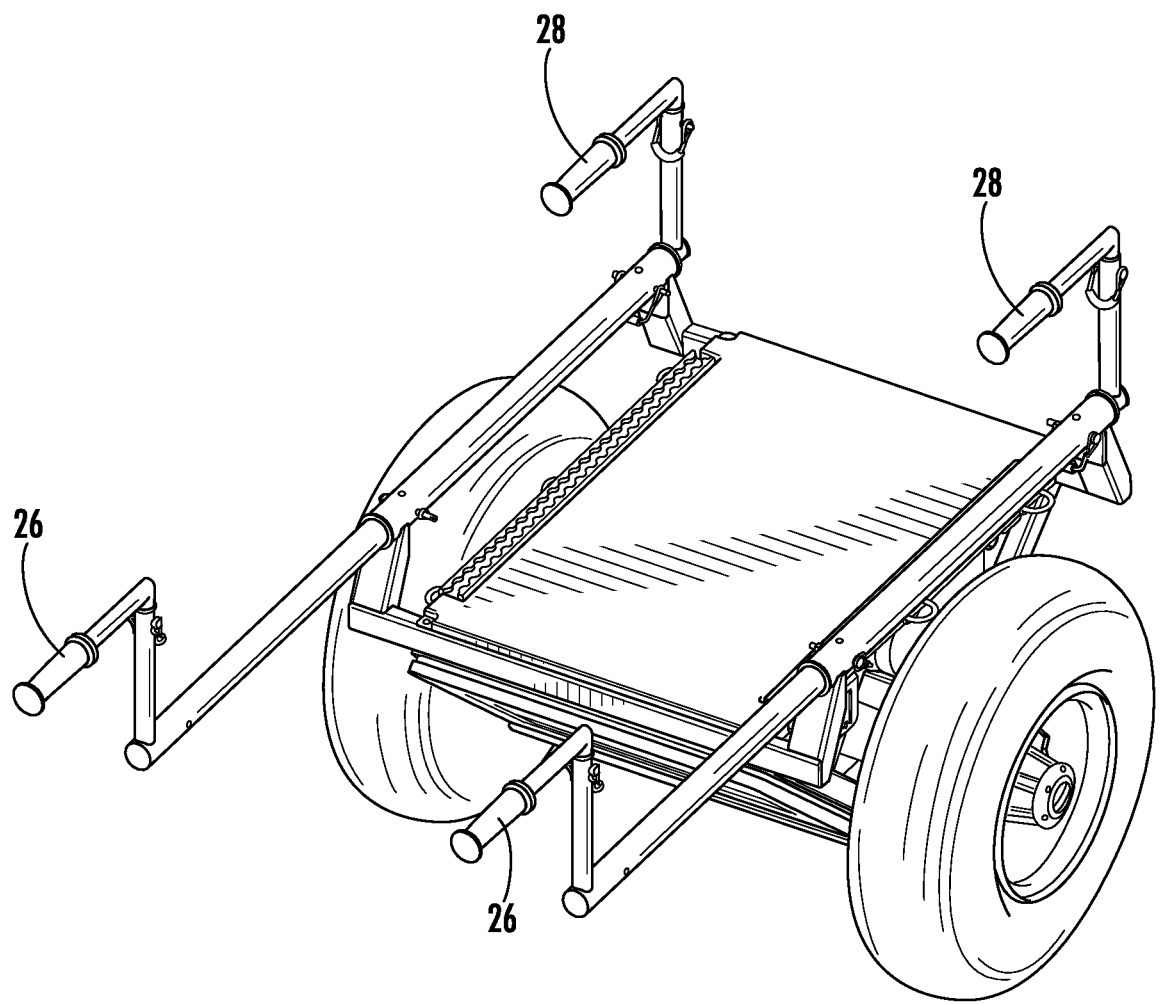
FIG. 21 is another perspective view of the tactical transport cart of FIG. 7 having handles that rotate, telescope, and stow.
Figure 22:
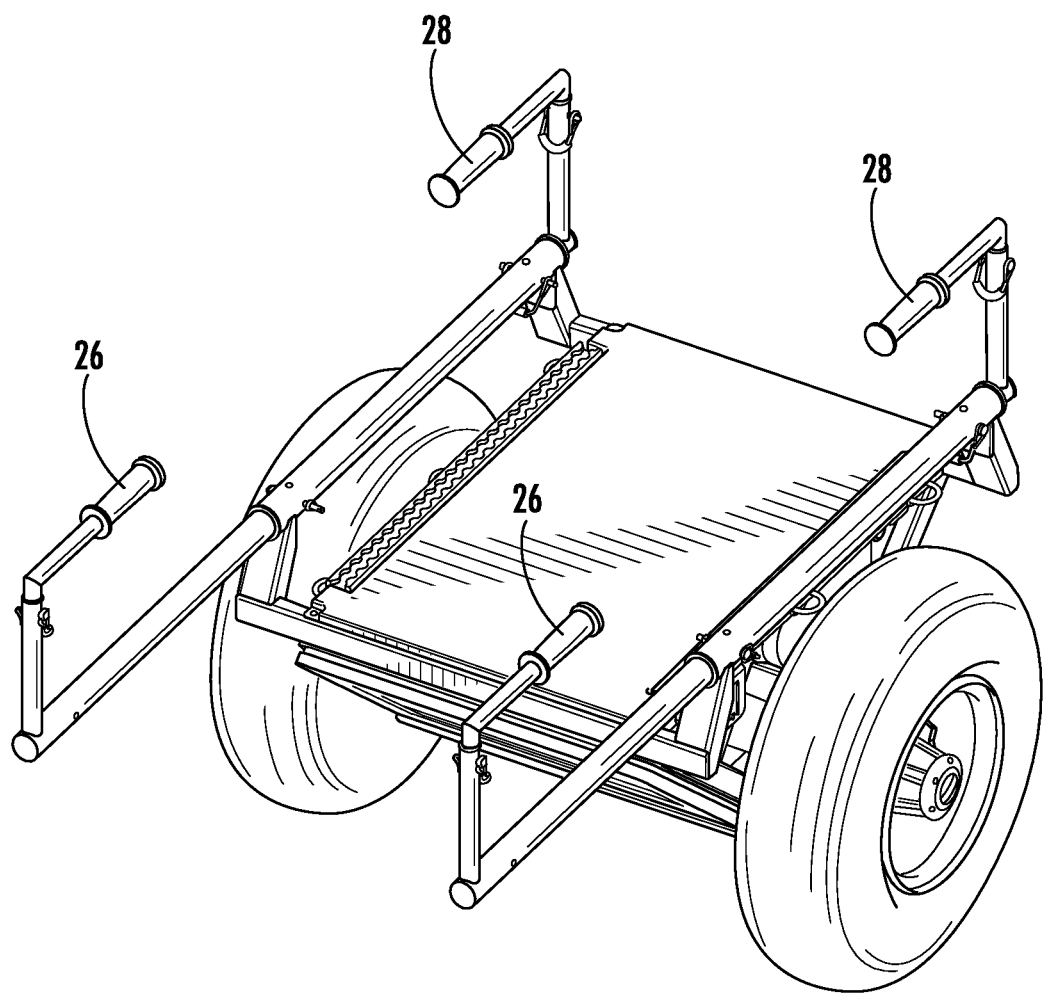
FIG. 22 is another perspective view of the tactical transport cart of FIG. 7 having handles that rotate, telescope, and stow.
Figure 23:
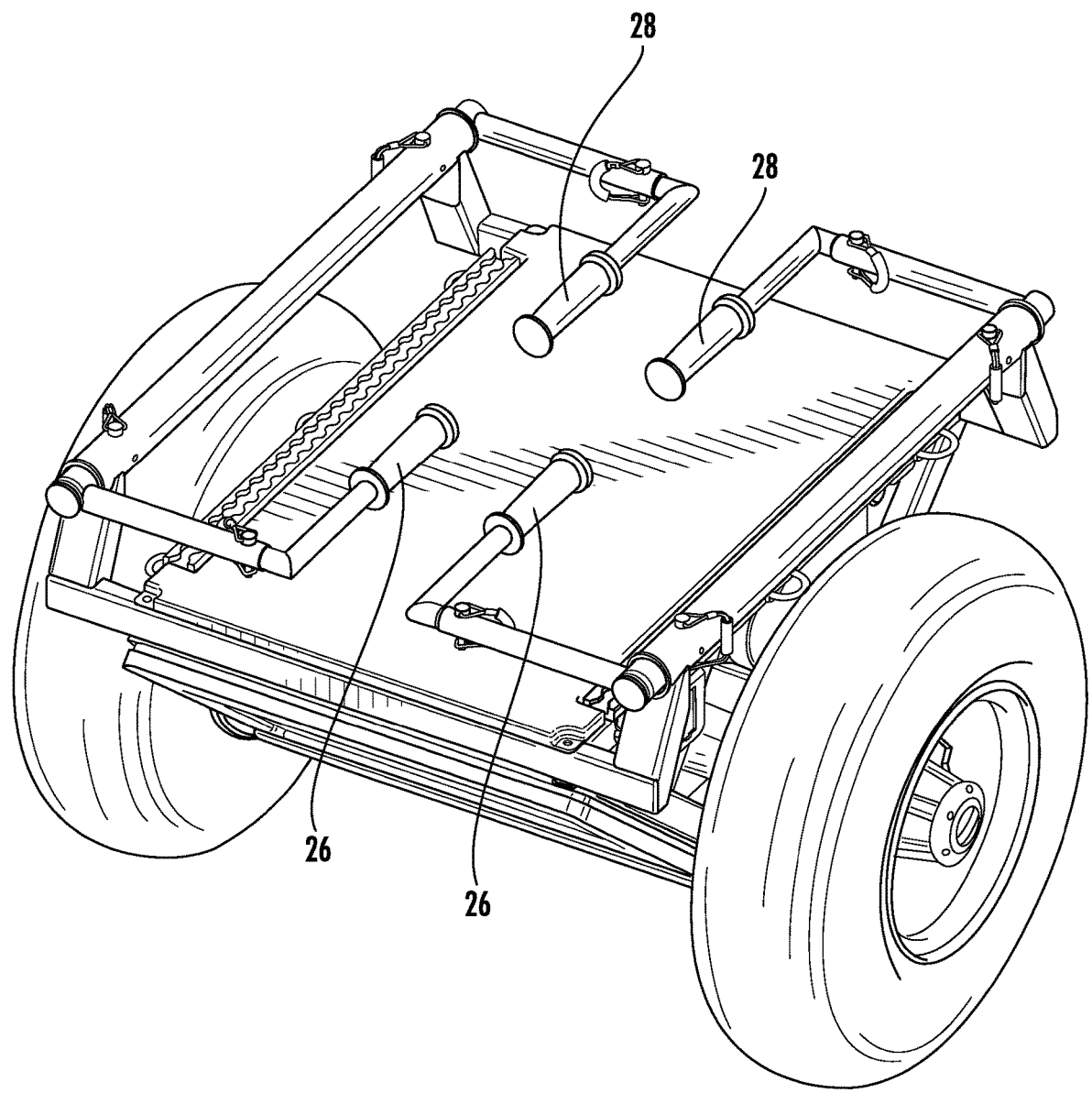
FIG. 23 is a perspective view of the tactical transport cart of FIG. 7 having handles that rotate, telescope, and stow.

FIG. 20 is a perspective view illustrating that tactical transport cart of FIG. 7 has handles that rotate, telescope, and stow. FIGS. 20 to 23 illustrate that handles 26 rotate, telescope, and stow. This feature allows for configuring and operating the cart at varying lengths. This feature of the cart also allows for the cart to be collapsed into a dimension for ease of packaging, transport and operation in confined spaces. As shown in FIG. 20, handles 26 are each in a first position facing outward. Handles 28 are each in a first position facing outward and in an opposite direction from the direction of handles 26. As shown, the handles can be turned in different directions. FIG. 21 illustrates handles 28 rotated inward and facing in the same direction as handles 26. FIG. 22 illustrates handles 26 rotated inward and facing toward handles 28. FIG. 23 illustrates handles 26 and 28 having been telescoped and collapsed to be stowed.

Figure 24:
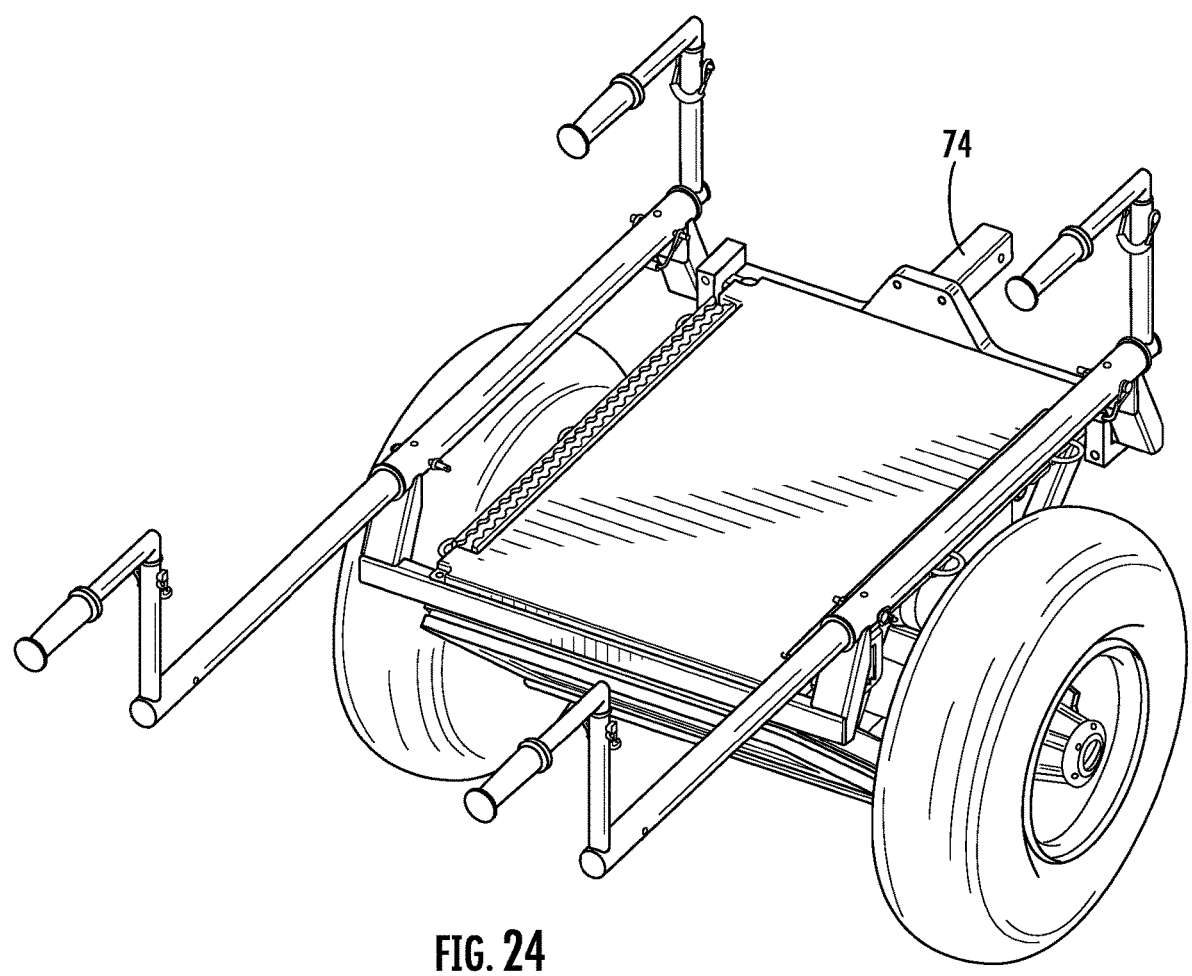
FIG. 24 is a perspective view of another contemplated embodiment of tactical transport cart having a centrally located multifunctional attachment point according to the present invention.

FIG. 24 illustrates the cart having a centrally located multifunctional attachment point 74 that enables the securing of one or more items to assist or augment cart operation in a manner that the cart could be towed behind or in tandem with other transport vehicles or machines. Examples include, but are not limited to, multifunctional attachment point 74 for: manual or motor driven winches to augment transport or recovery; carts linked together for joint operation such as teaming; hitches or pins or similar mechanisms to allow for towing; chains, ropes, cables, or other similar items to allow towing or pulling of the cart or other items; augmentation of propulsion using a powered propeller, and augmentation of loading items secured on the payload platform or by way of the payload platform attachment points.

Figure 25:
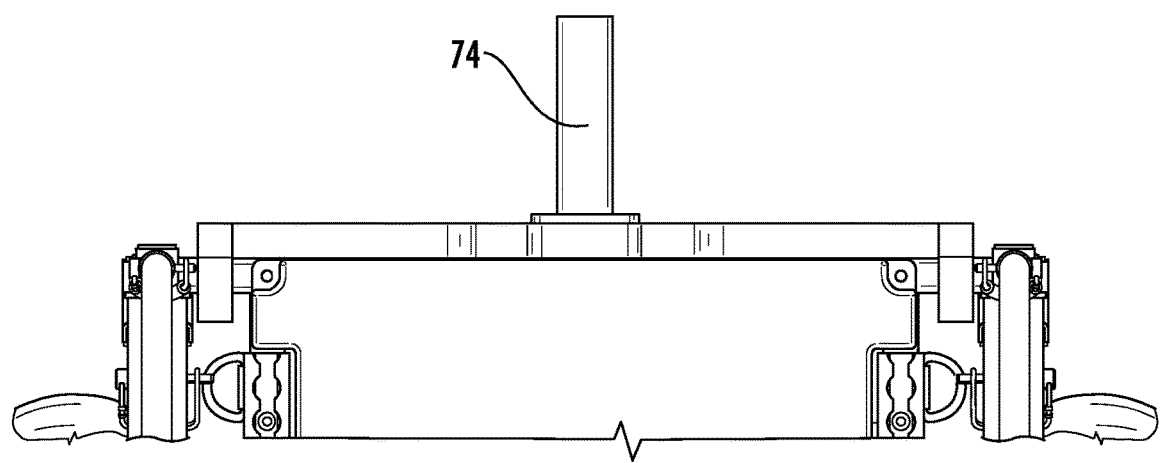
FIG. 25 is a partial top view of tactical transport cart having centrally located multifunctional attachment point of FIG. 24.
Figure 26:
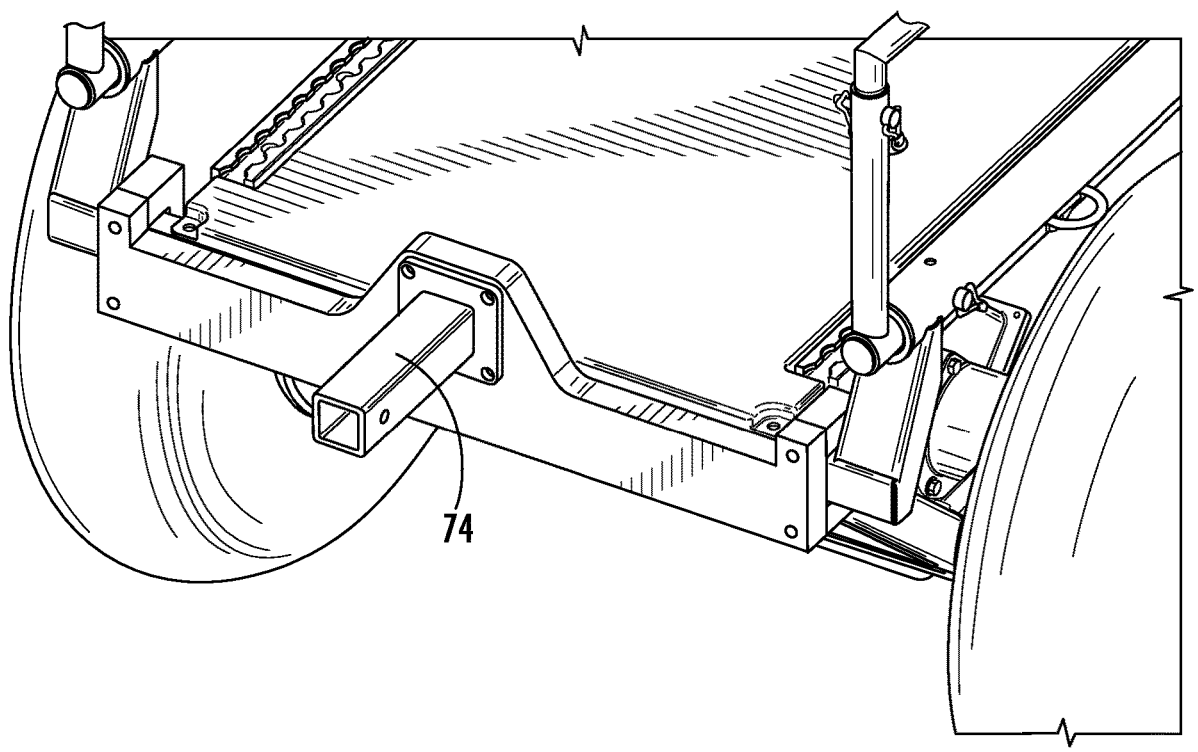
FIG. 26 is a partial rear view of centrally located multifunctional attachment point of FIG. 24.

FIG. 25 is a partial top view of the centrally located multifunctional attachment point 74. FIG. 26 is a partial rear view illustrating centrally located multifunctional attachment point 74 to which various payloads, winches, other towed machines or vehicles are optionally attached. The multifunctional attachment point can serve as a mounting location for weaponry, communications gear, construction implements, ballistic protection, hard payload carriers, among other items.

Figure 27:
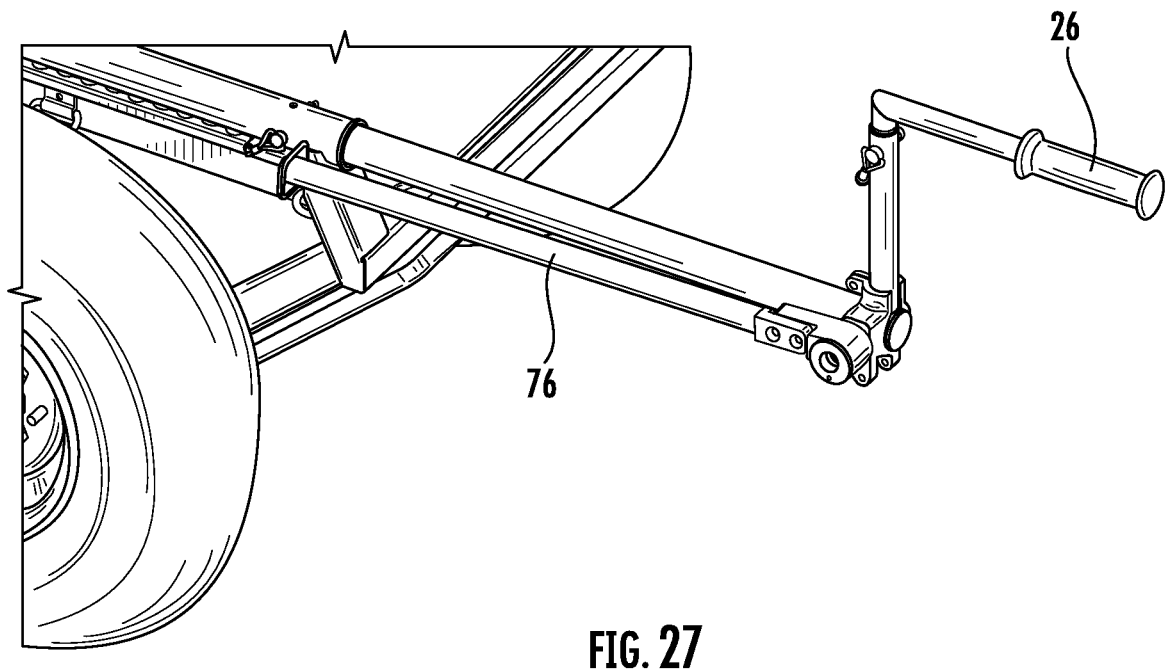
FIG. 27 is a view of tactical transport cart having a stabilizing prop or support leg according to the present invention.
Figure 28:
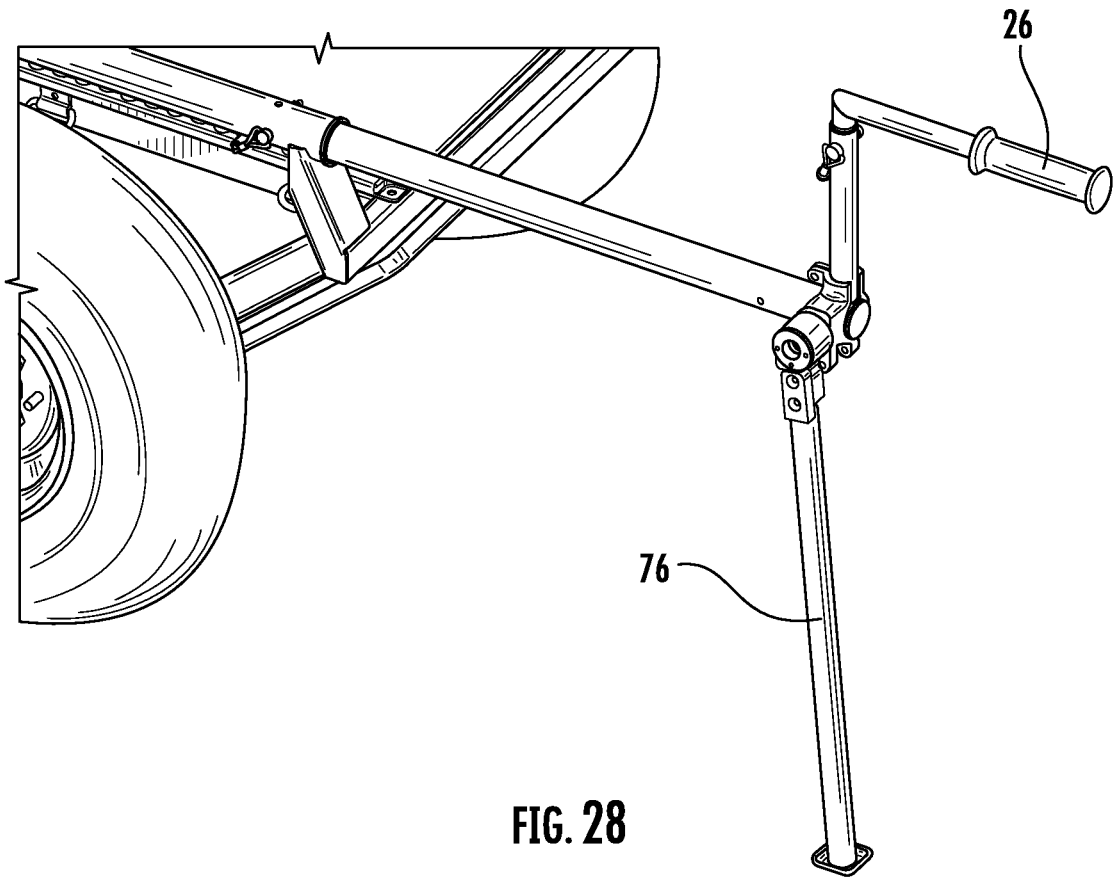
FIG. 28 is another view of tactical transport cart having a stabilizing prop or support leg according to the present invention.
Figure 29:
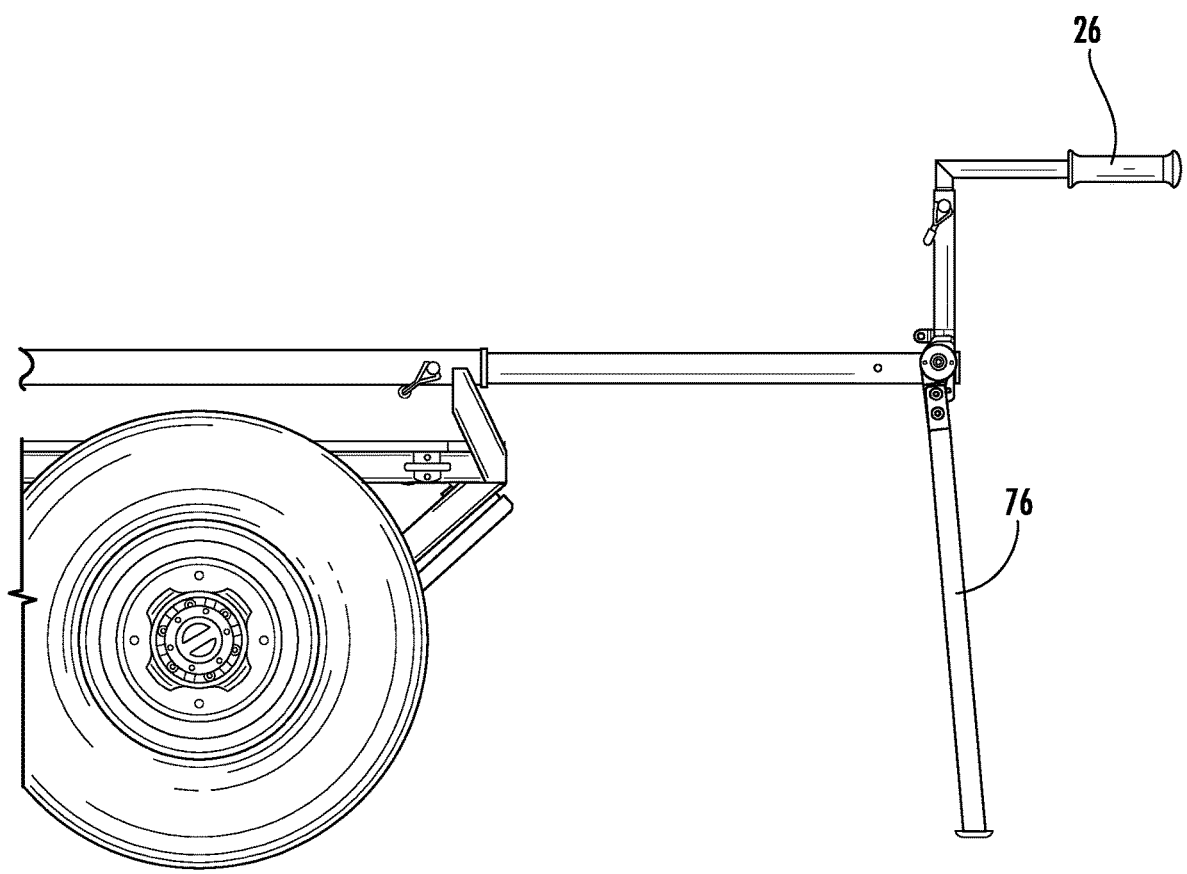
FIG. 29 is a side view of tactical transport cart having a stabilizing prop or support leg according to the present invention.

FIGS. 27 to 29 illustrate that the cart optionally comprises a stabilizing prop or support leg 76 attached or affixed to a handle at opposing ends of the cart. Stabilizing prop or support leg 76 primarily serves, for example, to stabilize the cart when loading, unloading, storing, staying static for employment of other cart features or repair. The stabilizing prop or support leg 76 can be utilized, for example, when loading or unloading persons. However, stabilizing prop or support leg 76 can also be used for other purposes such as a patient intravenous (IV) pole or as a light mount. To maximize stability or other desired performance characteristics, the cart may preferably accommodate up to four stabilizing prop or support legs 76 of the same or varying lengths, degrees of motion, shapes, orientations, and modularity. FIG. 27 illustrates stabilizing prop or support leg 76 in a first upward position. FIG. 28 illustrates stabilizing prop or support leg 76 in a second downward position. FIG. 29 is a side view of stabilizing prop or support leg 76 of FIG. 28. The stabilizing prop or support leg 76 can be affixed or attached to one or more sides of the cart, and the shape and configuration are preferably modular.

Figure 30:
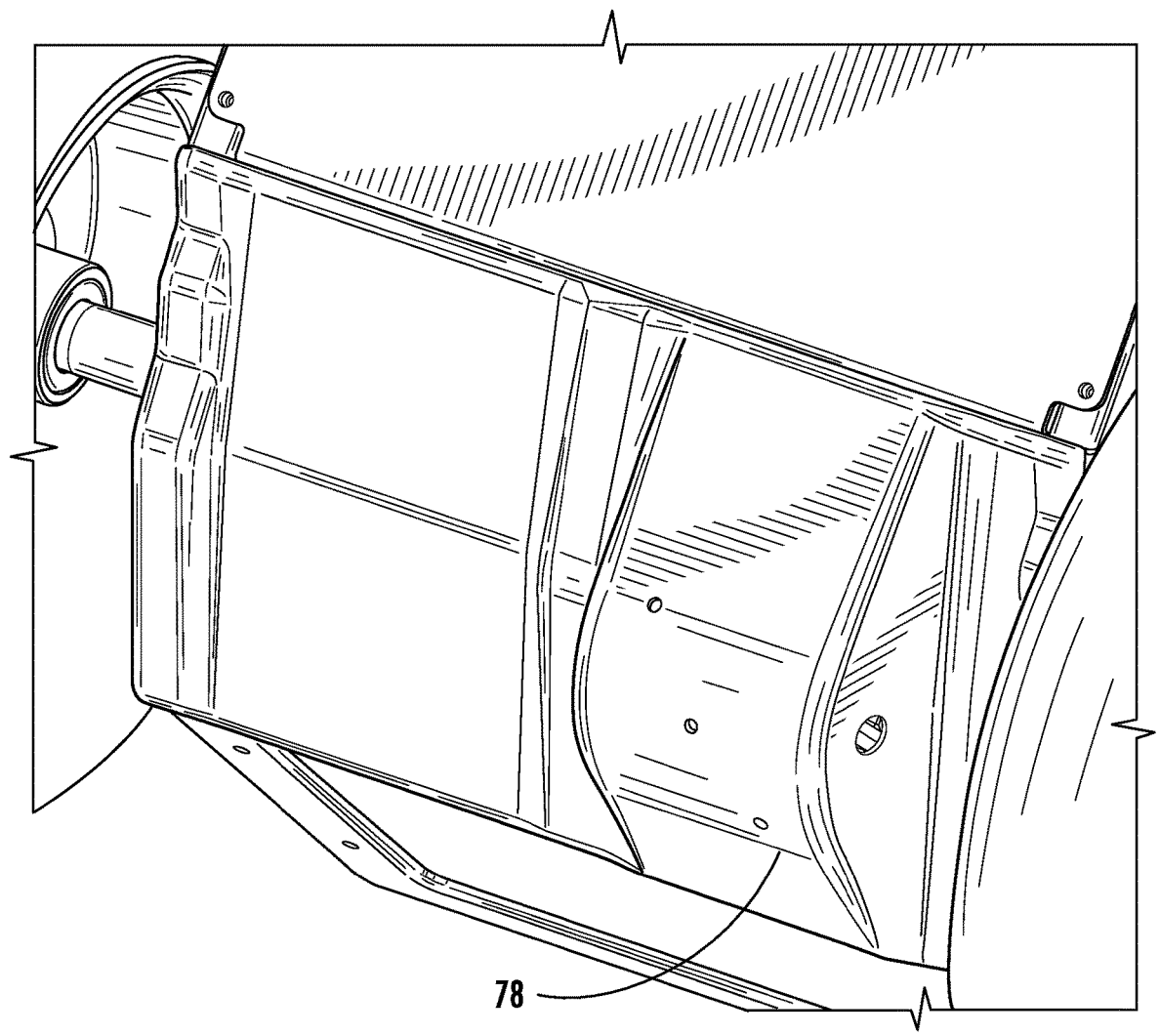
FIG. 30 is a partial view of tactical transport cart having underneath protection provided to the cart according to the present invention.
Figure 31:
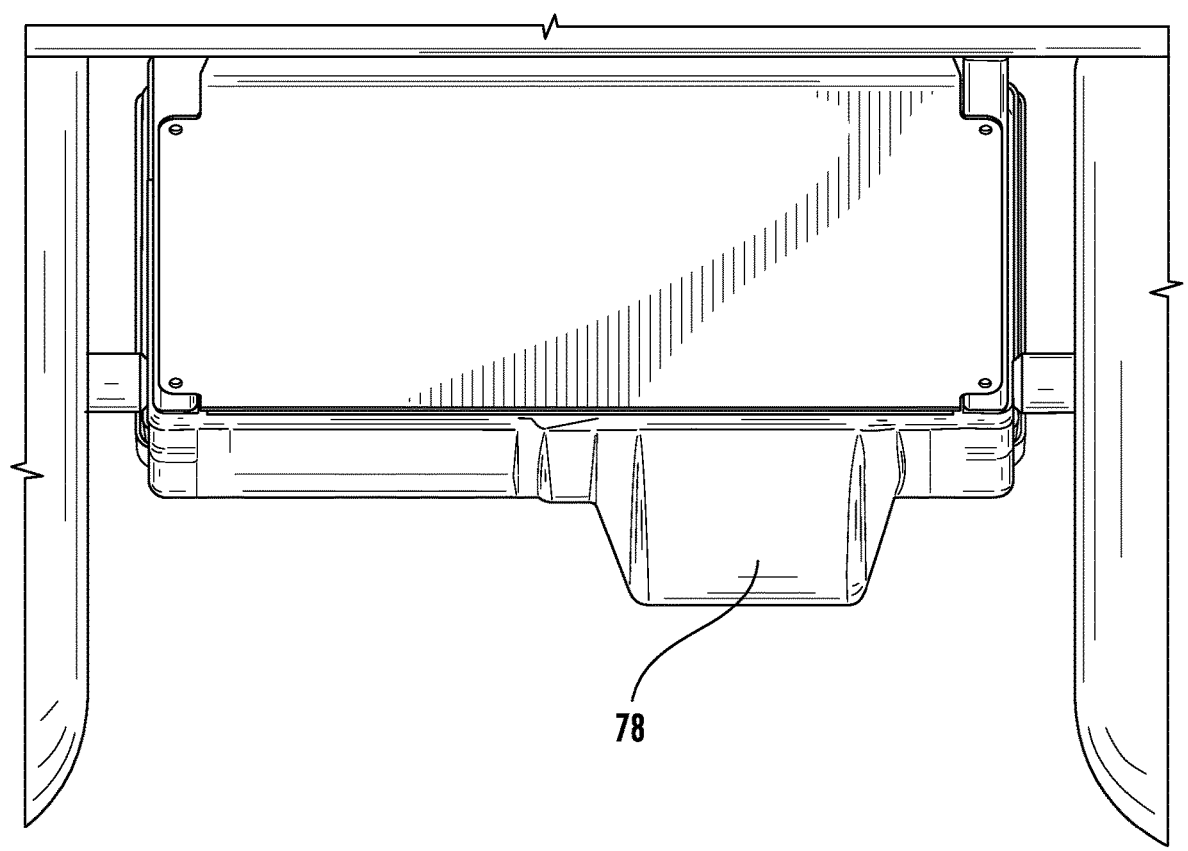
FIG. 31 is another partial view of tactical transport cart having underneath protection provided to the cart according to the present invention.
Figure 32:
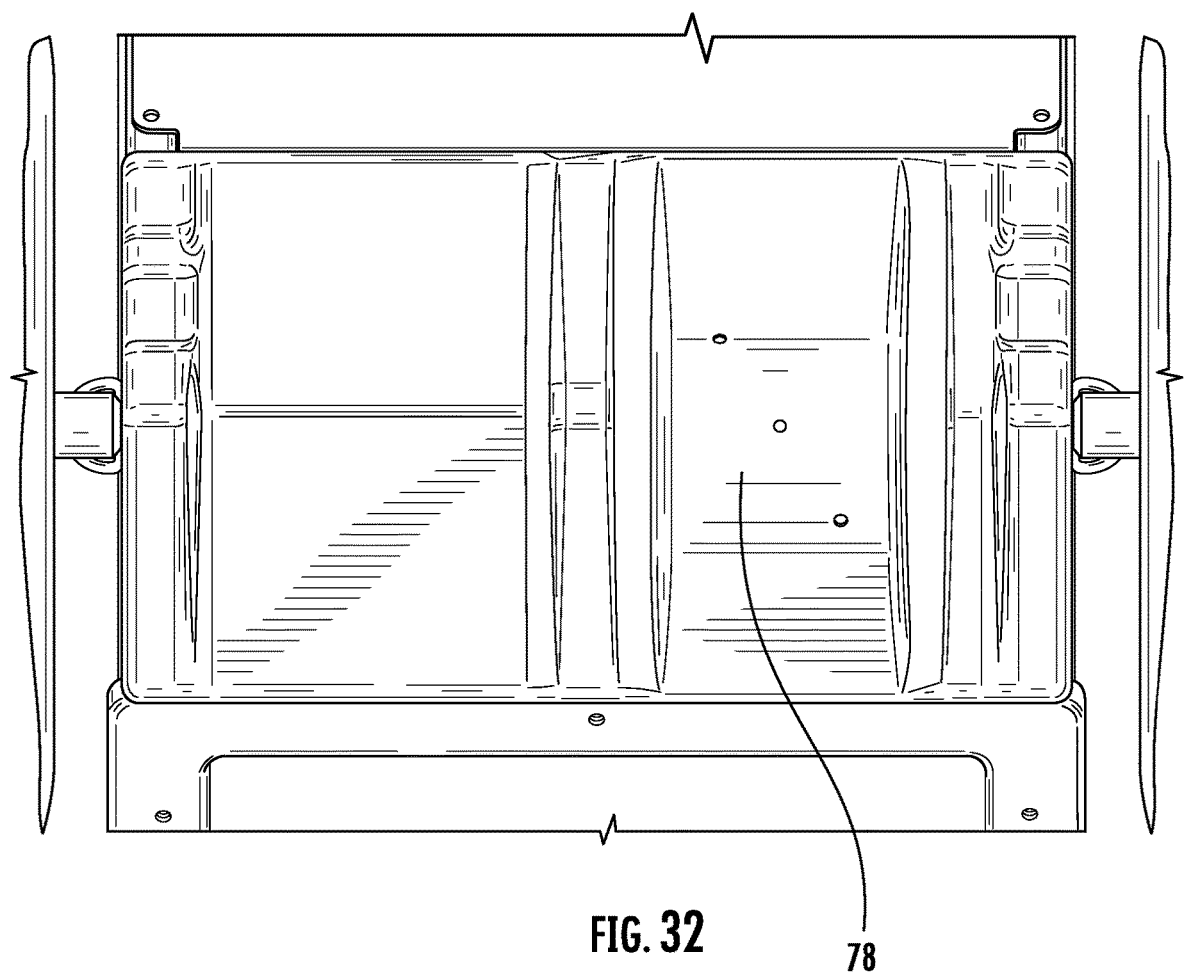
FIG. 32 is a partial bottom view of tactical transport cart having underneath protection provided to the cart according to the present invention.

The angular design of the frame and complementary cart components contribute to the overall protection of the internal components of the cart. FIG. 30 illustrates underneath protection provided to the cart, more particularly a lower skid plate 78 having a three-dimensional shape to augment protection of the lower cavity of the cart. FIG. 31 is another view of lower skid plate 78. FIG. 32 is a partial bottom view of lower skid plate 78.

Figure 33:
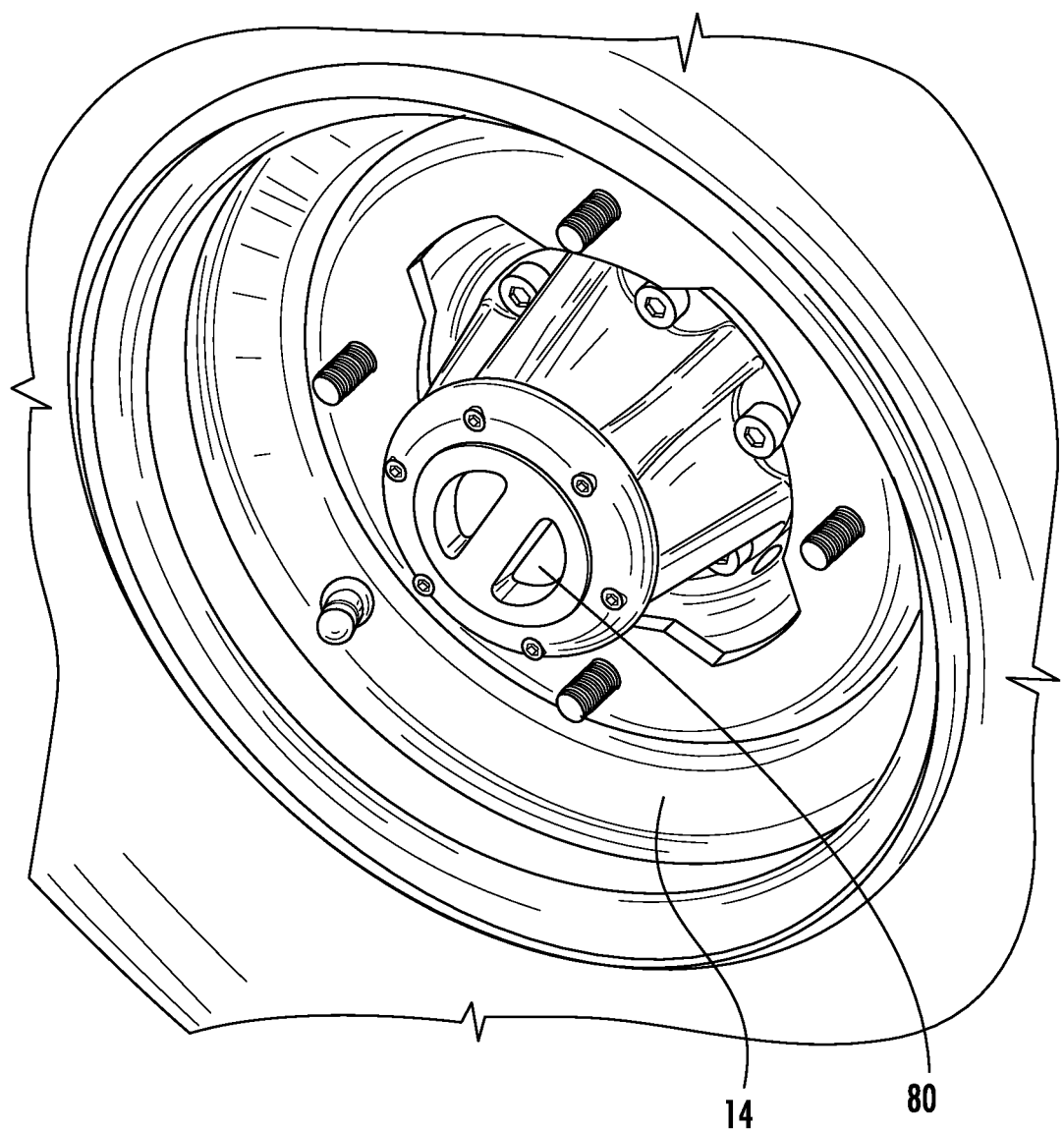
FIG. 33 is a view of a manually selectable hub as a component of a wheel of the tactical transport cart according to the present invention.
Figure 34:
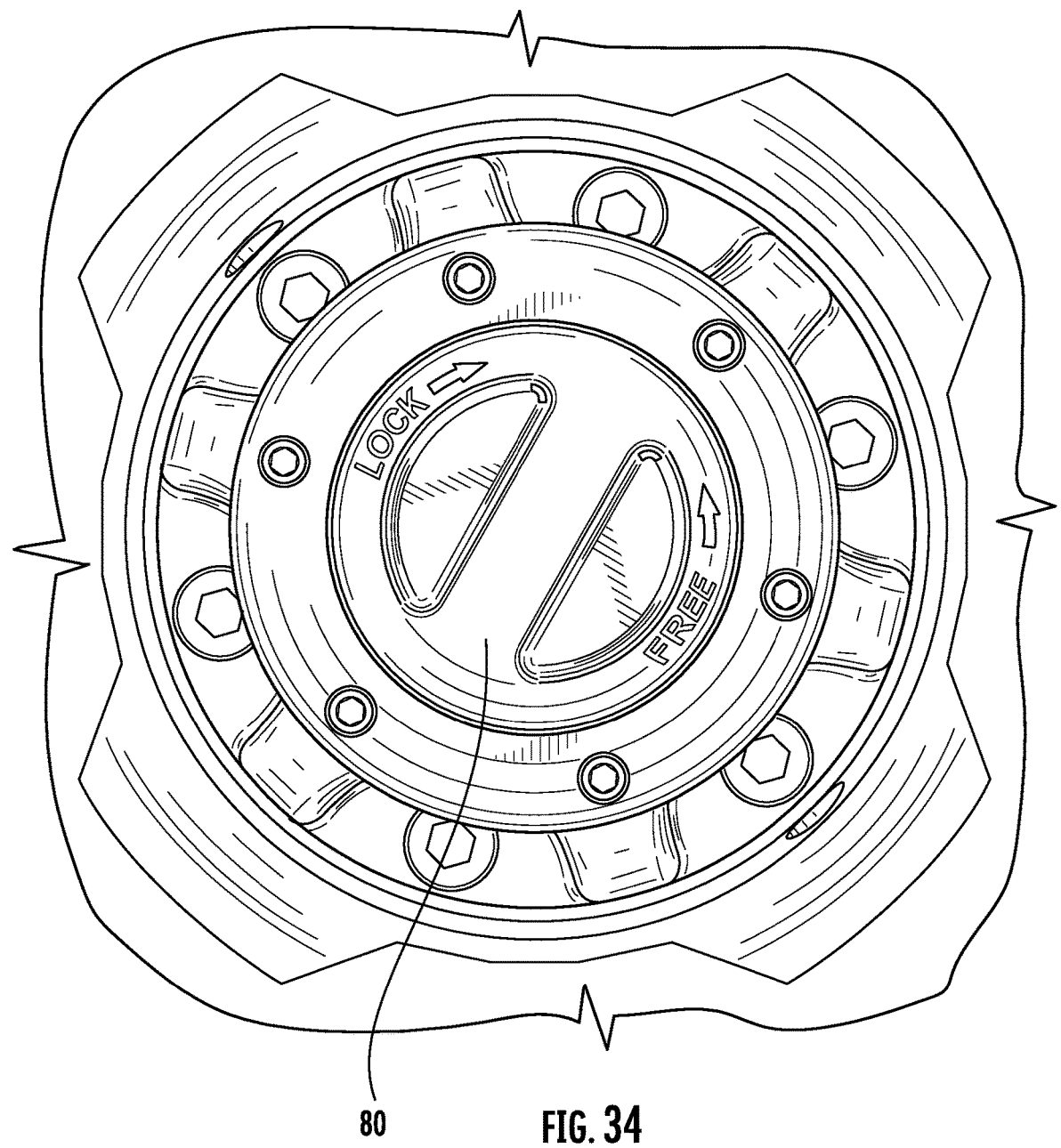
FIG. 34 is another view of a manually selectable hub as a component of a wheel of the tactical transport cart according to the present invention.

FIG. 33 illustrates a manually selectable hub 80 as a component of wheel 14 of the cart. Manually selectable hub 80 is selected to a locked position or a free position. The locked position is for powered movement whereas the free position enables the cart to be rolled, pushed, towed, for example, under circumstances where powered movement is not desired or available. Important to powered operation of the cart, motor braking mechanism (not shown) is available when utilizing the locked position. FIG. 33 shows that manually selectable hub 80 is manually turned to lock or to unlock allowing the cart to turn under power or manually be pushed or towed. An alternate view is shown in FIG. 34 in which arrows indicate a direction of rotation in which the hub is turned. Examples of manually selectable locking hubs suitable for use on the cart of the present invention are commercially available from G2 Axle & Gear company.

Figure 35:
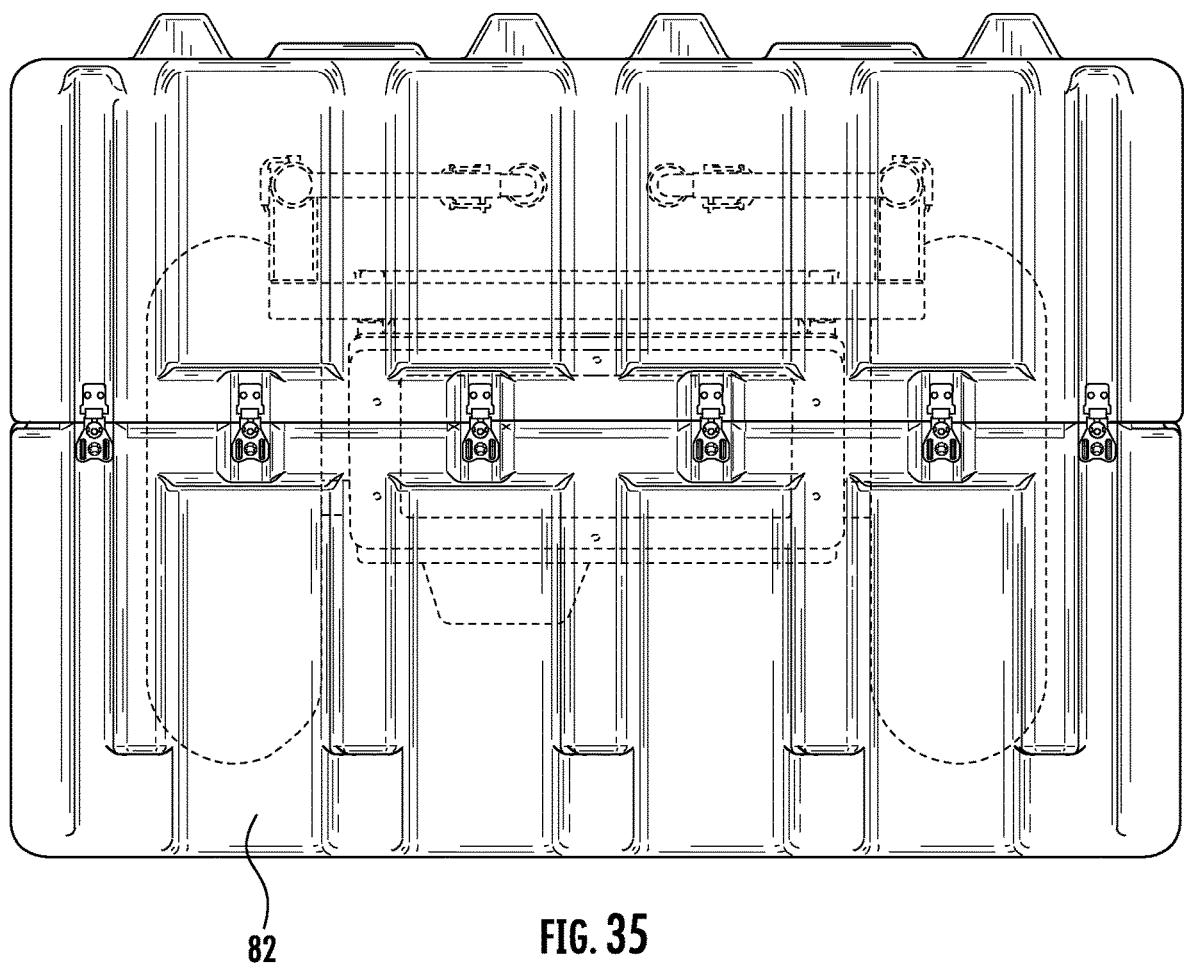
FIG. 35 is a rear view of a storage case having the tactical transport cart collapsed and packed inside of the storage case according to the present invention.
Figure 36:
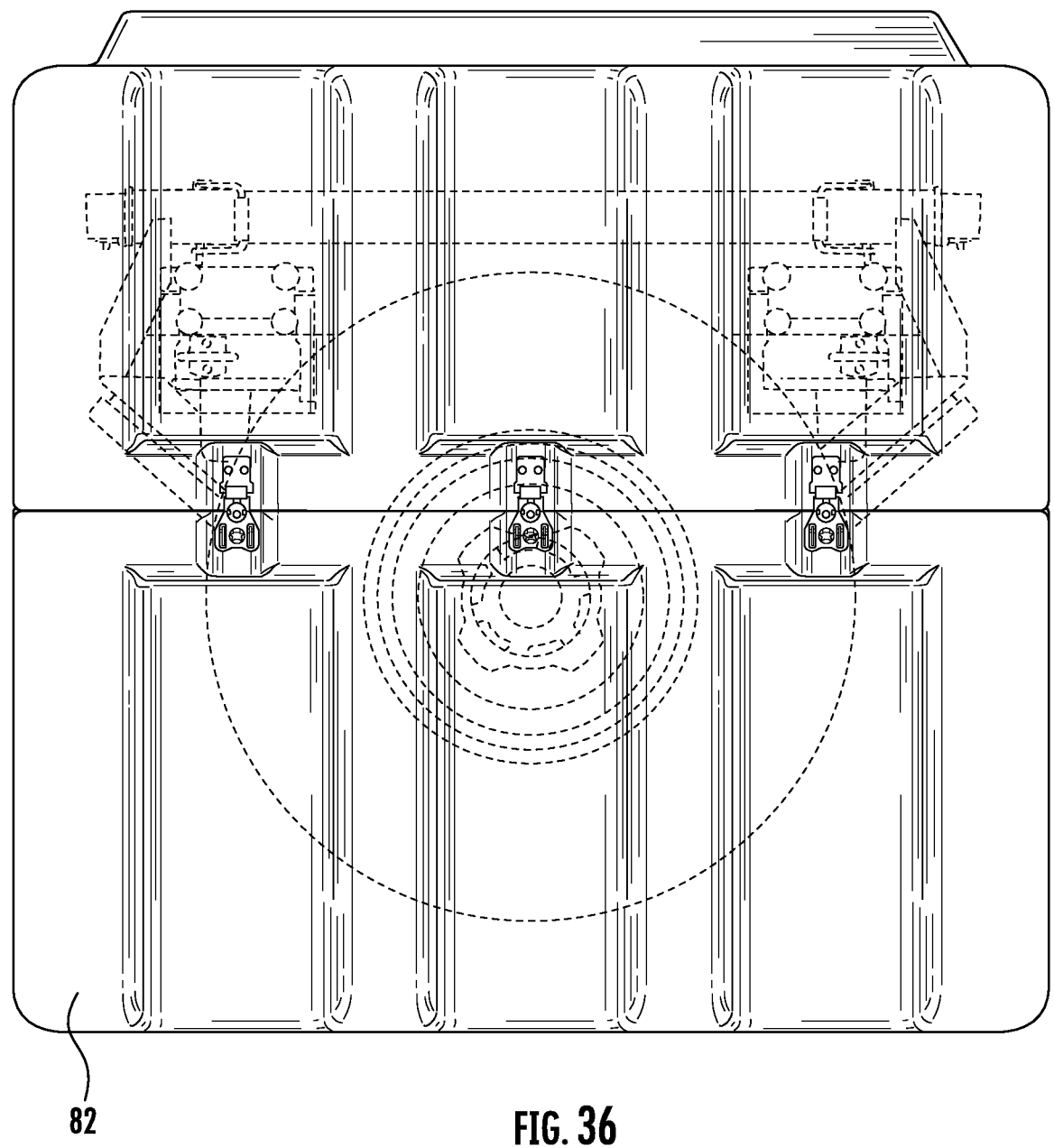
FIG. 36 is a side view of a storage case having the tactical transport cart collapsed and packed inside of the storage case according to the present invention.

FIG. 35 to FIG. 39 illustrate that the cart is collapsible for purposes of transport in a specialized container or case 82 such as a rotomolded air drop case. The cart of the present invention is foldable and configurable such that the cart is easily stored or transported when not in use. Case 82 allows for rigging and delivery via aircraft drop, among other modes of transportation. FIG. 35 is a rear view of case 82 having the cart collapsed and packed inside of case 82. FIG. 36 is a side view of case 82 having the cart collapsed and packed inside of case 82.

Figure 37:
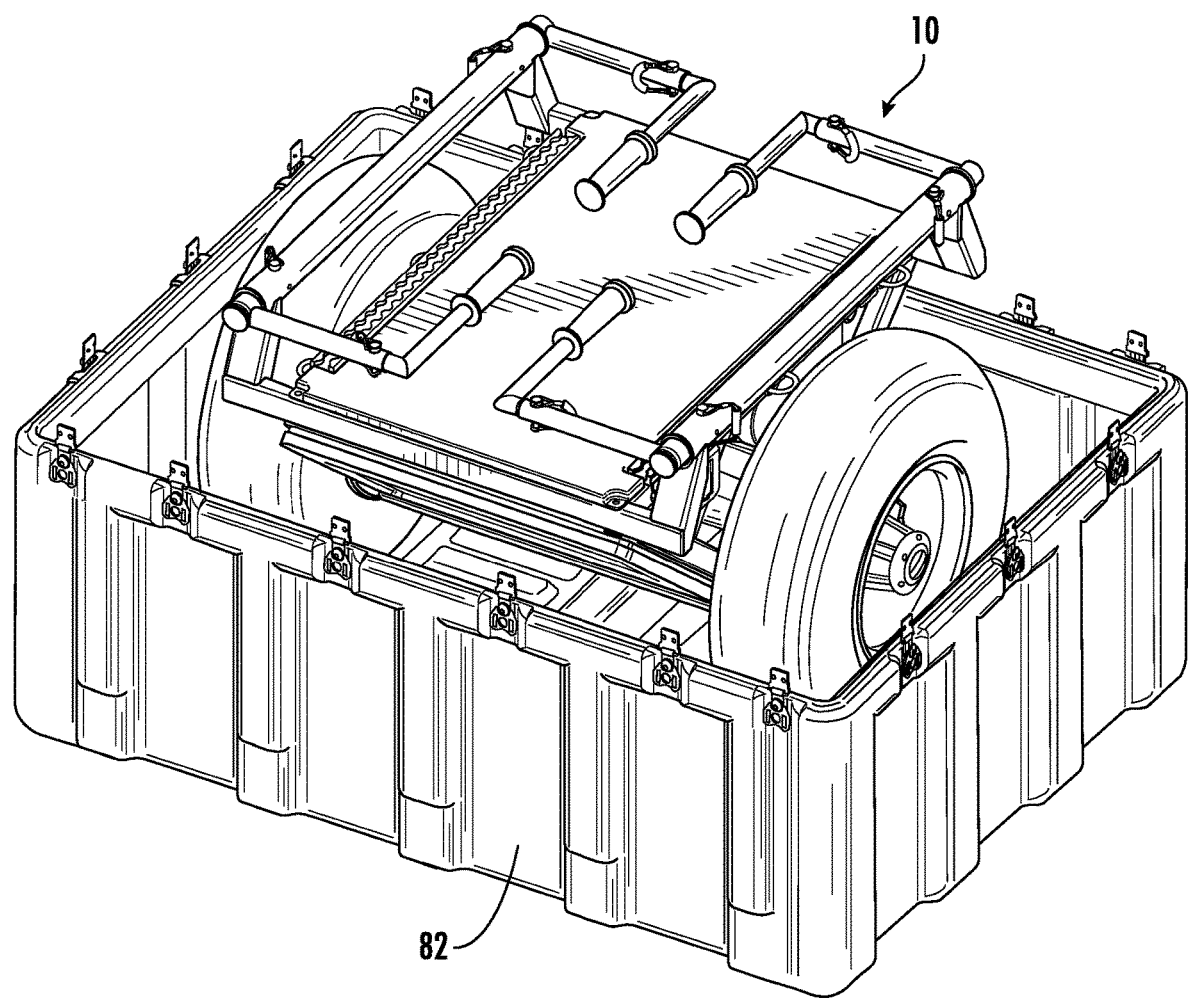
FIG. 37 is a perspective view of an open storage case having the tactical transport cart collapsed and packed inside of the storage case according to the present invention.
Figure 38:
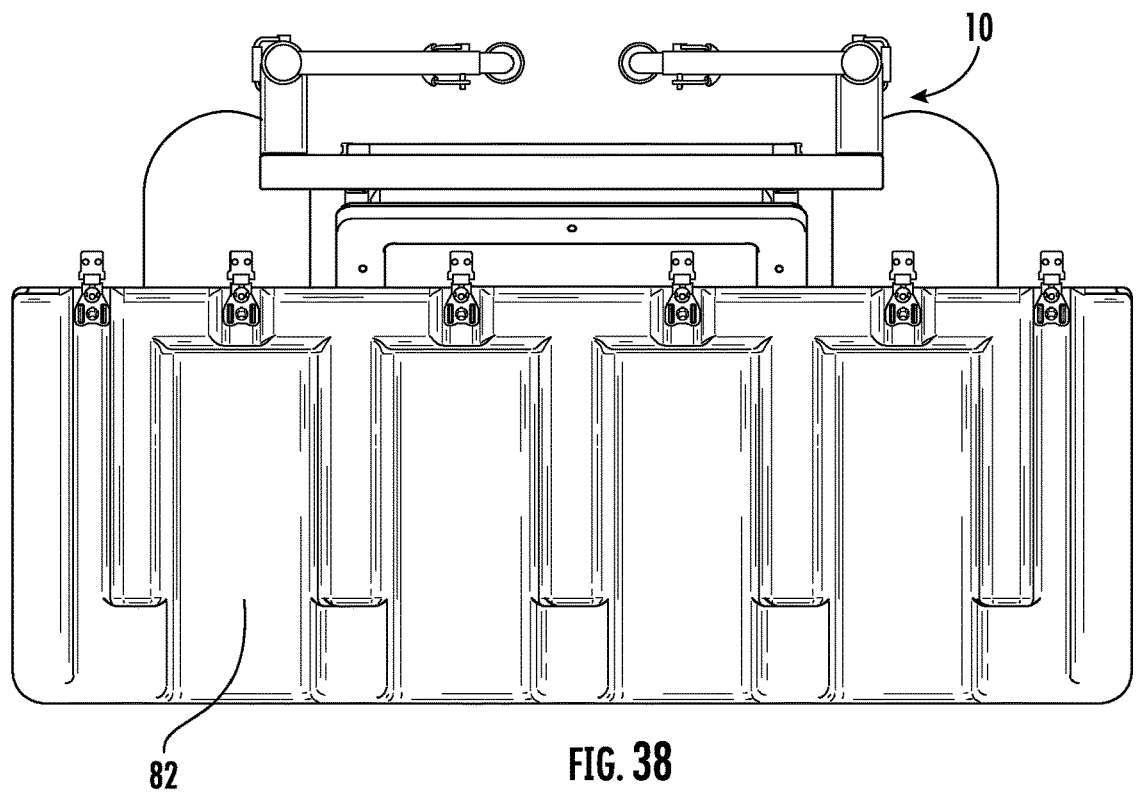
FIG. 38 is a rear view of the open storage case having the tactical transport cart collapsed and packed inside of the storage case of FIG. 37.
Figure 39:
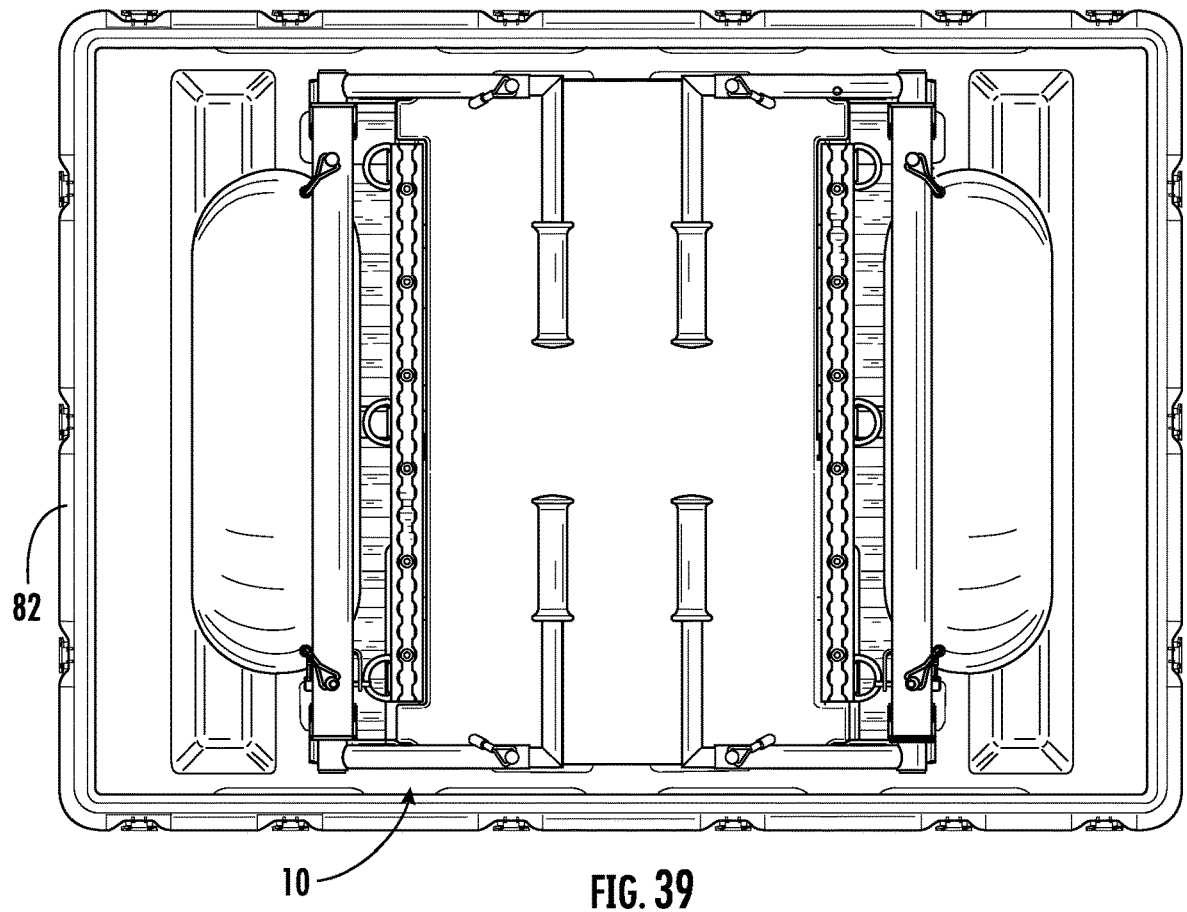
FIG. 39 is a top view of the open storage case having the tactical transport cart collapsed and packed inside of the storage case of FIG. 37.

FIG. 37 is a perspective view illustrating cart 10 collapsed and packed inside open case 82. FIG. 38 is a rear view of cart 10 collapsed and packed inside open case 82. FIG. 39 is a top view of cart 10 collapsed and packed inside open case 82.

Figure 40:
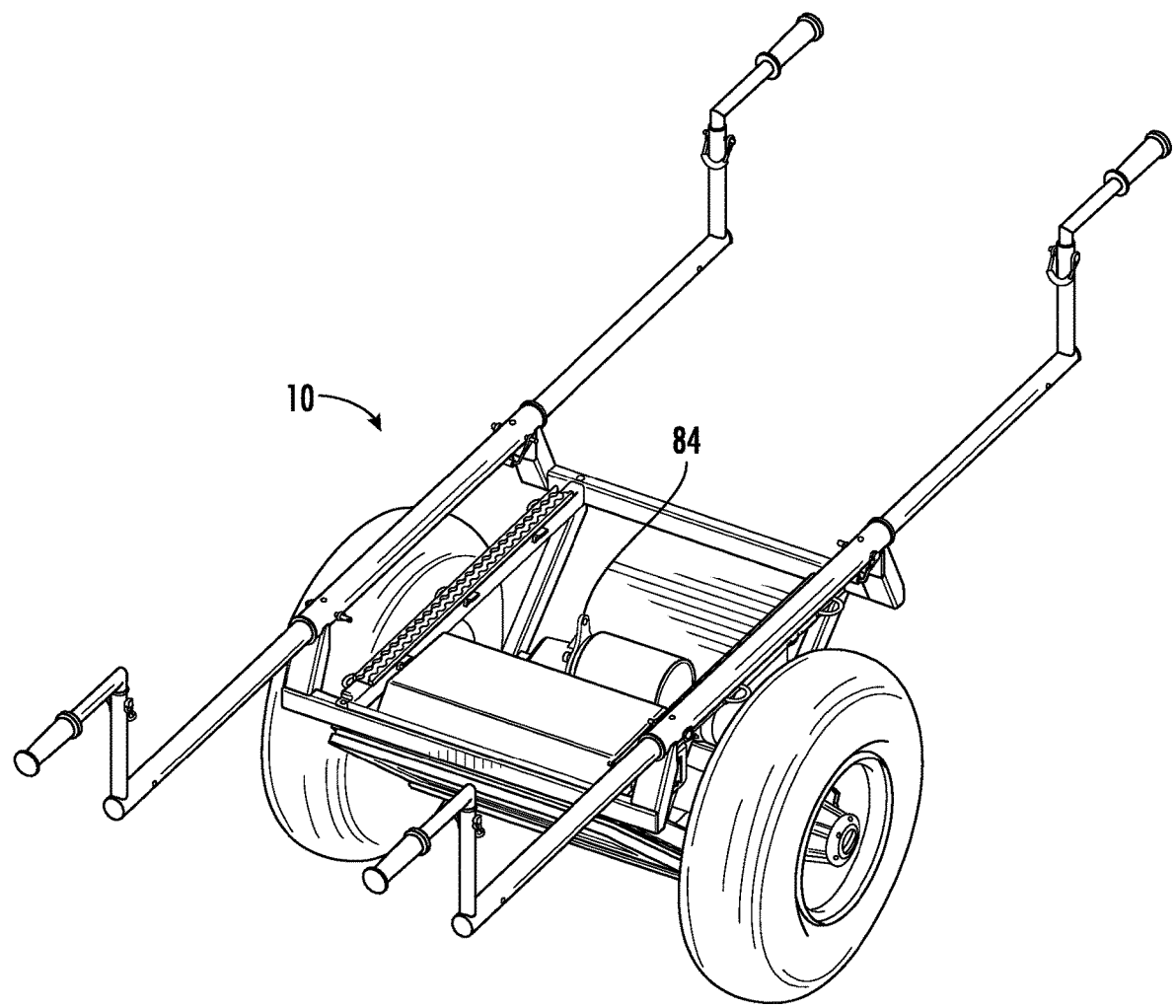
FIG. 40 is a view of a cavity of the tactical transport cart according to the present invention.

FIG. 40 is a view of a cavity of the tactical transport cart according to the present invention. FIG. 40 illustrates that a cavity 84, or other features of components, within cart 10 can be modified for tool storage or multipurpose use. Cart 10 has capacity in which components or other cart features can be exploited or housed to further enhance operation. Unoccupied space within enclosures or the frame can be utilized for multi-tool or other critical item storage. The payload platform when detached could function as a spare wheel or disc that can be applied to replace a damaged or worn tire. FIG. 40 illustrates gross modularity of major cart components such that components could be located in many different configurations within the space.

Figure 41:
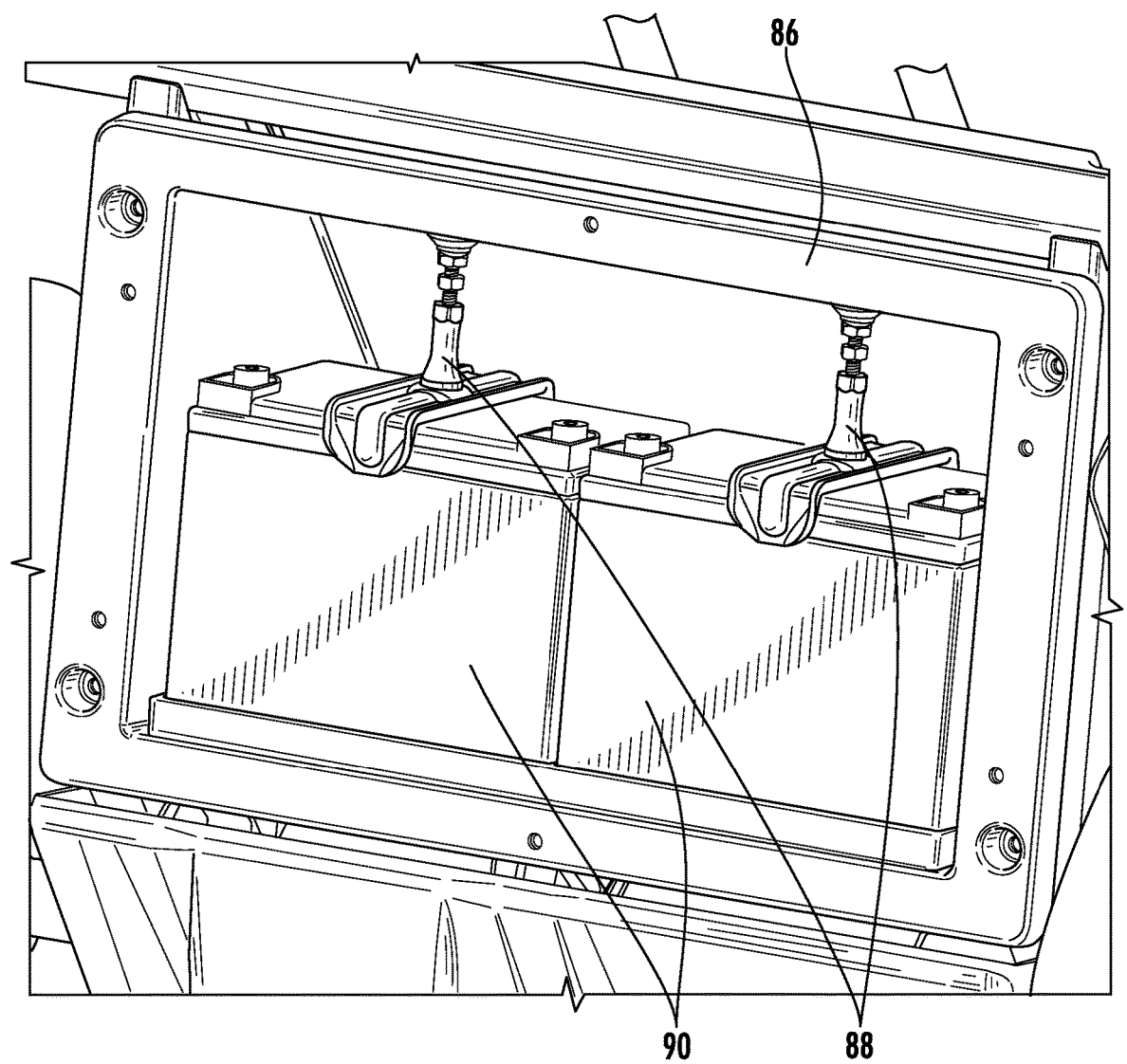
FIG. 41 is a view of an electrical enclosure of the tactical transport cart according to the present invention.
Figure 42:
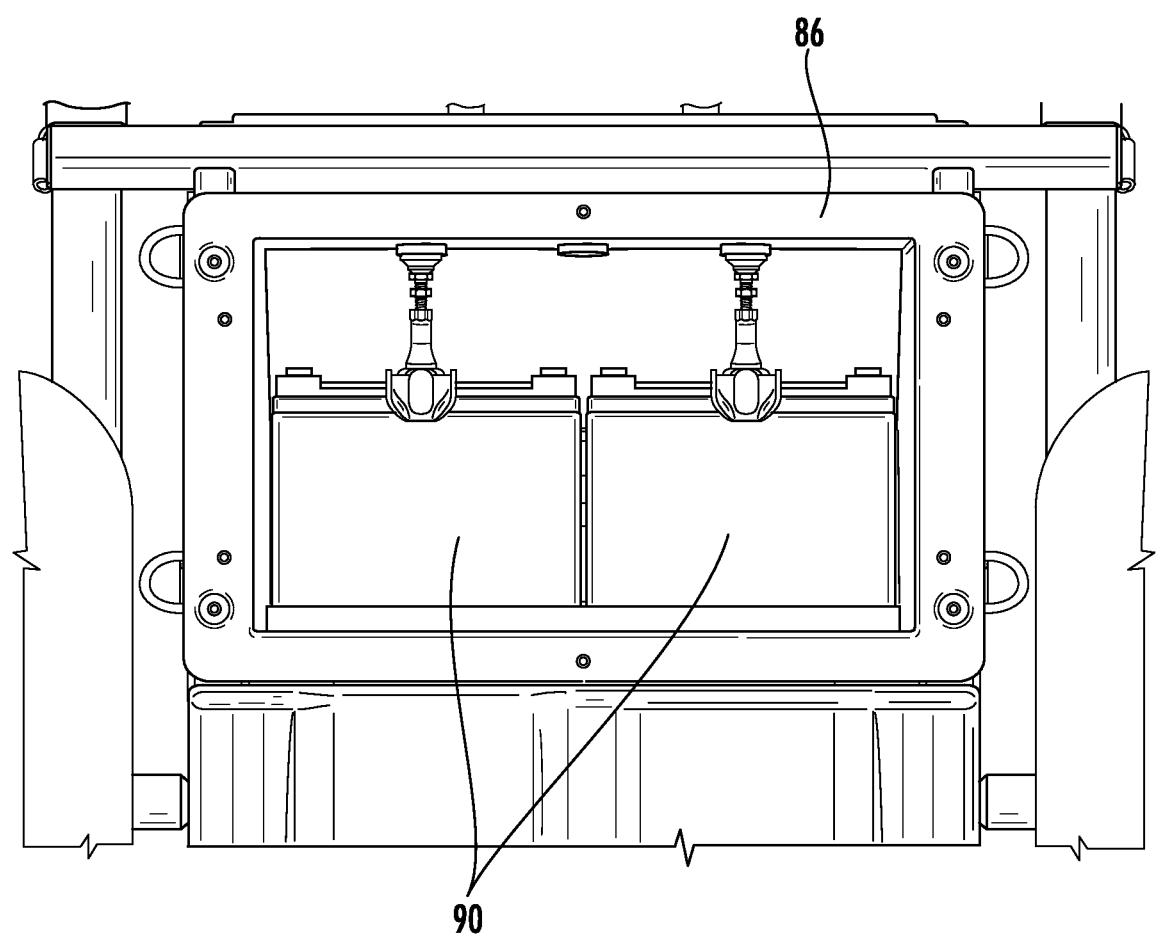
FIG. 42 is another view of the electrical enclosure of the tactical transport cart of FIG. 41 according to the present invention.

FIG. 41 is a view of an electrical enclosure of the tactical transport cart according to the present invention. As shown in FIG. 41, cart 10 comprises an electrical enclosure 86. Electrical enclosure 86 houses major electrical components such as batteries 90 and routings of the electrical system and has a variety of features. Electrical enclosure 86 is configurable to varying battery types, shapes, sizes, orientations, and configurations. Electrical enclosure 86 secures batteries 90 into place via hardware 88 to better stabilize and protect the batteries during cart use. Electrical enclosure 86 is sealed in a manner that prevents water and other debris intrusion thus offering protection to internal components and augmenting the operation of the cart over water-covered terrains. Independent and external of the sealed electrical enclosure there are components or points at components that are reinforced by varying enhancements to further augment the purpose of protecting against water or other debris intrusion. FIG. 41 shows one configuration and style of batteries 90 and how the batteries are secured. An alternate view of the batteries of FIG. 41 is shown in FIG. 42.

Figure 43:
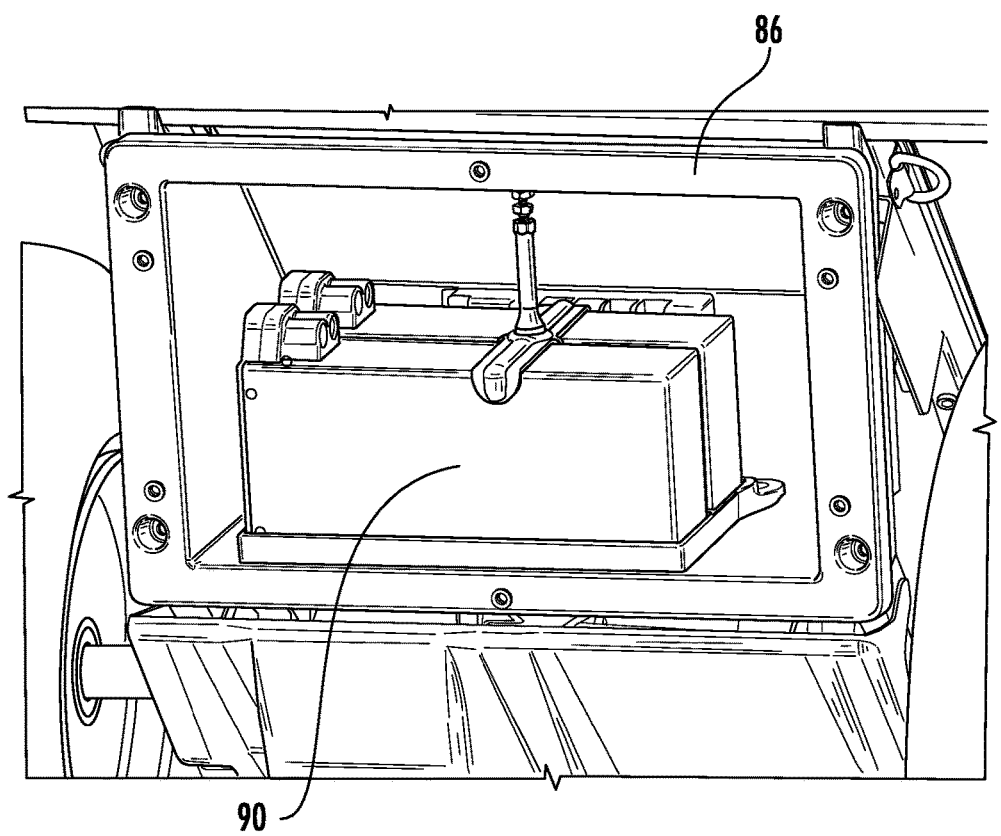
FIG. 43 is a view of an electrical enclosure of the tactical transport cart according to the present invention.
Figure 44:
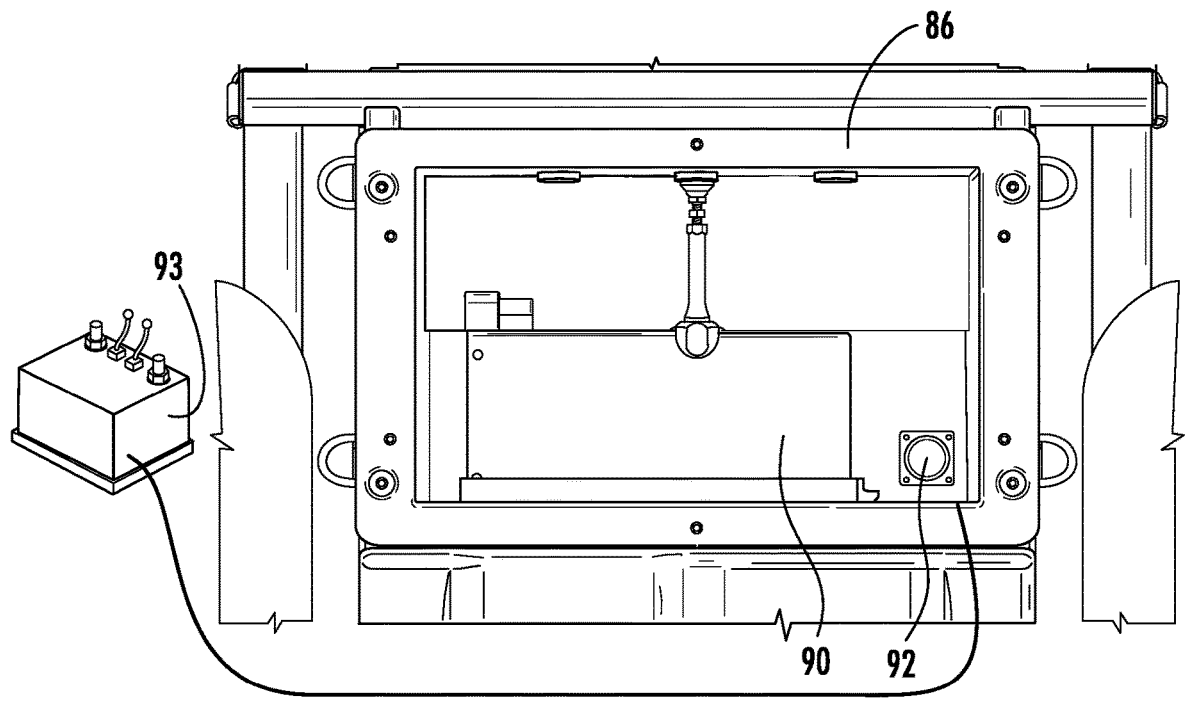
FIG. 44 is another view of the electrical enclosure of FIG. 43.
Figure 45:
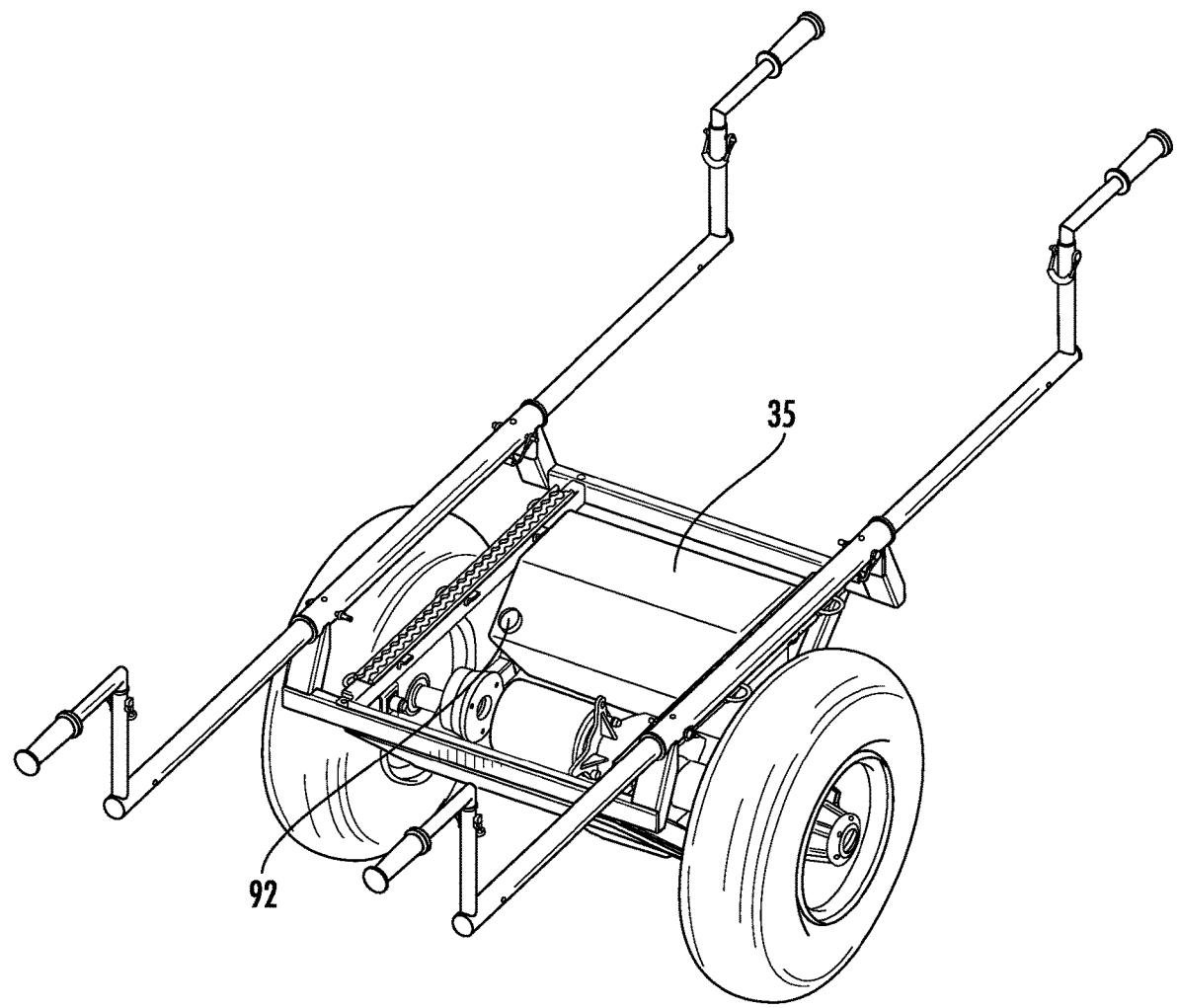
FIG. 45 is a perspective view of another contemplated embodiment of tactical transport cart with port according to the present invention.

FIG. 43 is a view of an electrical enclosure of the tactical transport cart according to the present invention. FIG. 43 illustrates a different style of battery than shown in FIG. 41. FIG. 43 shows battery 90, along with other electrical components. FIG. 44 is another view of the electrical enclosure of FIG. 41 and also illustrates a port 92 serving as a connection and mainline into the electrical system of the cart and all other electrical features. Port 92 is where external chargers, external devices, and auxiliary power are connected. Non-limiting examples of external devices are other carts, computers, filtration devices, communication equipment, weapons systems, and optics systems. FIG. 45 is a perspective view of the cart with the port on common housing 35 of the cart. The port is operatively connected to powertrain 16.

Figure 46:
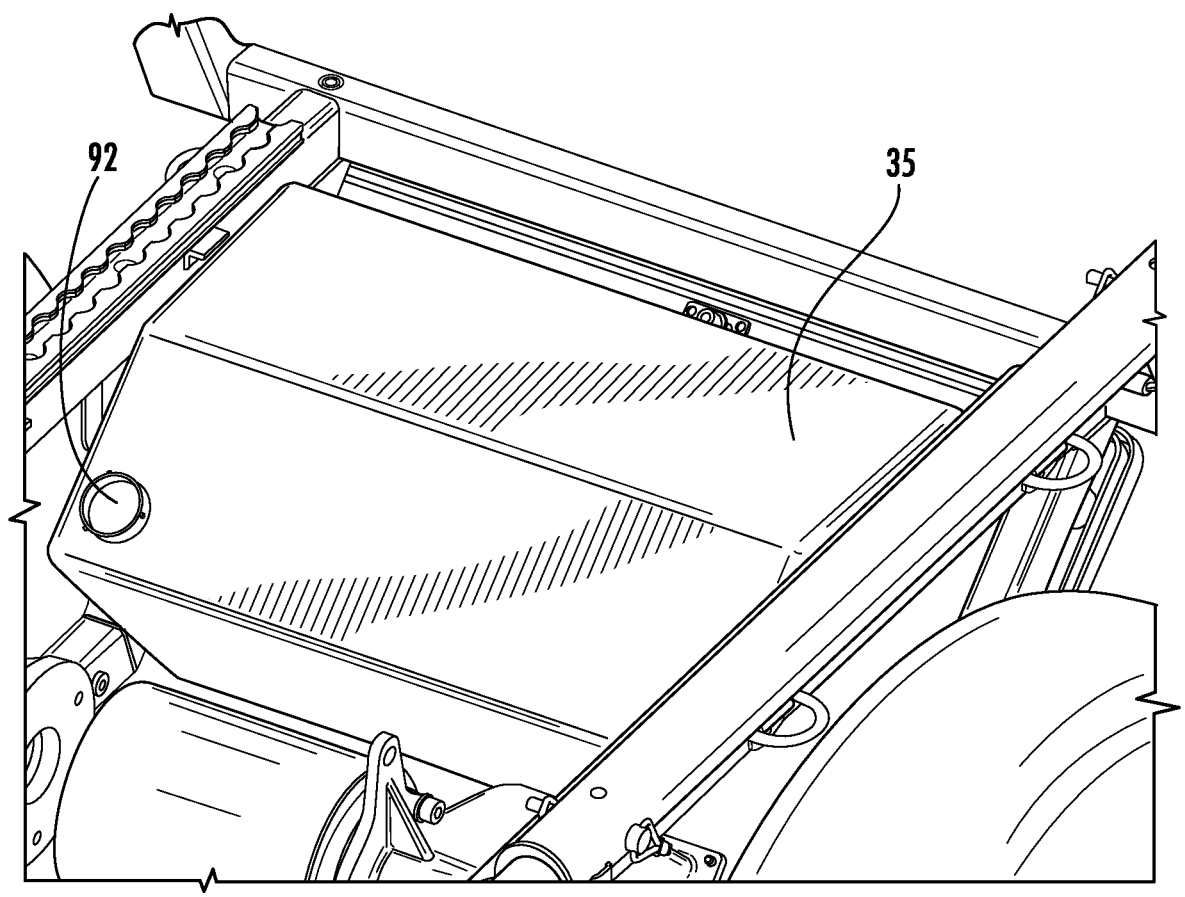
FIG. 46 is a close-up view of the port of FIG. 45.

FIG. 46 is a close-up view of port 92. Port 92 serves as a mainline into a power system of the cart in which power is imported through, exported through, systems are connected, remote, and robotic or wireless control applications are connected.

With the features of modularity, configuration options, and the employment of diverse electrical components and power systems, the cart can be modified in such a manner to accommodate robotic or autonomous systems. Thus, the cart of the present invention is operated with or without a person. This is accomplished by use of wireless or wired operation of the cart, cart teaming, or other methods of control in which conventional operation is not required. The port can be used to connect a receiving device that receives a wireless signal from a remote control or other control device. Thus, the port can be used for signals as well as for power.

Figure 47:
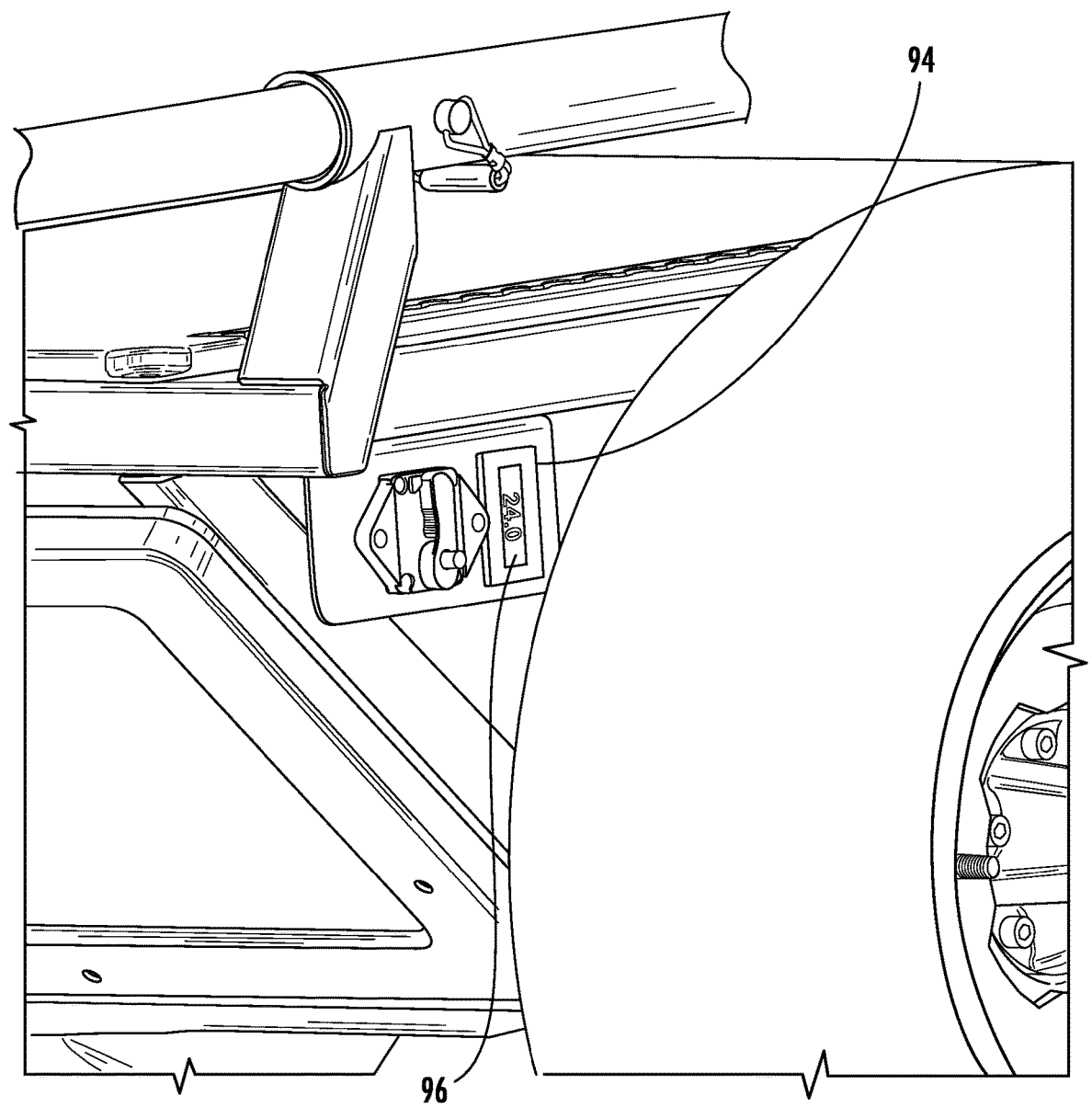
FIG. 47 is a close-up view of tactical transport cart having a gauge with a digital display visual indicator according to the present invention.
Figure 48:
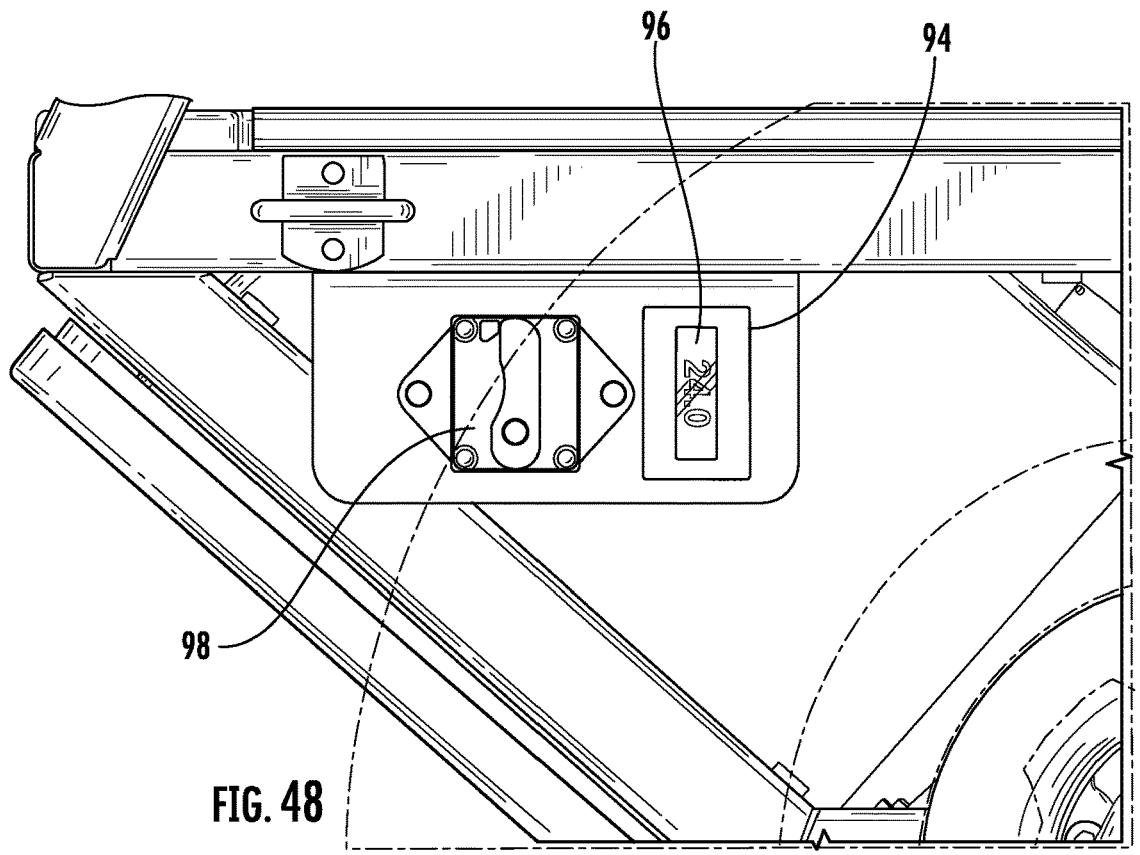
FIG. 48 is a close-up view of tactical transport cart having a gauge with a digital display visual indicator according to the present invention.
Figure 49:
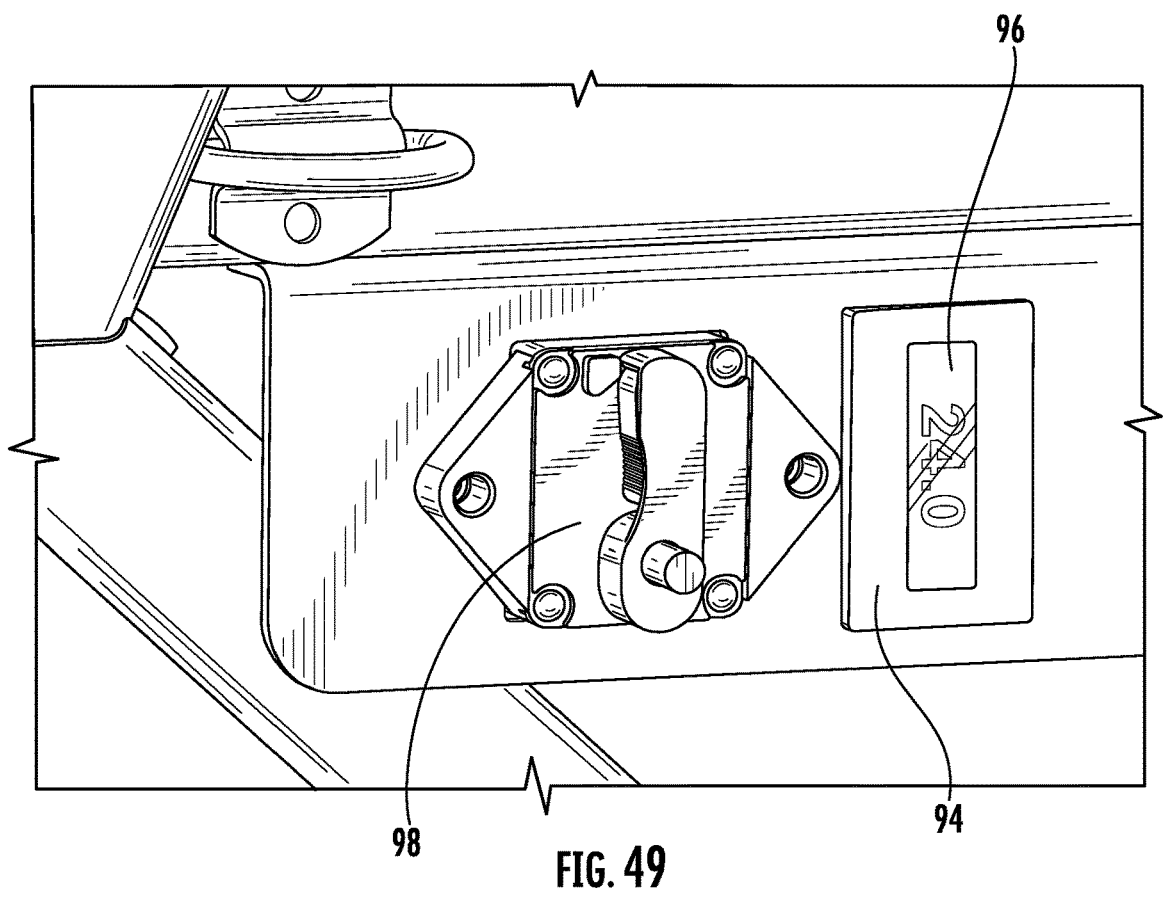
FIG. 49 is another close-up view of tactical transport cart having a gauge with a digital display visual indicator according to the present invention.
Figure 50:
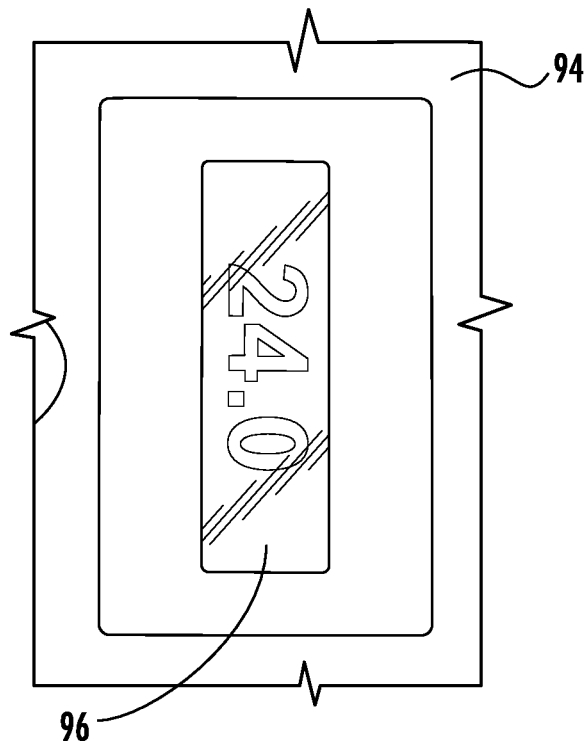
FIG. 50 is another close-up view of tactical transport cart having a gauge with a digital display visual indicator according to the present invention.

FIG. 47 illustrates the tactical transport cart having a gauge 94 in which is provided a digital display visual indicator 96 on the cart body such as for indication of a state of power or a state of charge as it pertains to the primary power supply of the cart. Gauge 94 acts to signify the user as to when to charge or to replace the primary power supply and/or power the cart via an auxiliary power pack or supply. An operator of the cart is able to view visual indicator 96 as needed. FIGS. 48 to 50 illustrate additional views of the gauge and the visual indicator.

Figure 51:
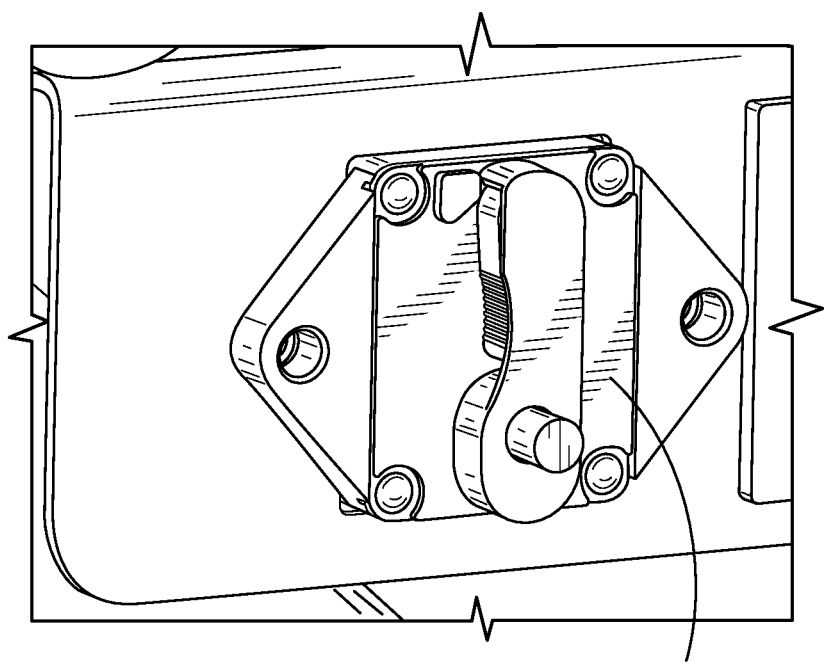
FIG. 51 is a view of tactical transport cart having an on and off power failsafe according to the present invention.

FIG. 51 illustrates the tactical transport cart having an on and off power failsafe 98. On and off power failsafe 98 is a circuit breaker also serving the function of an on and off switch for the cart. On and off power failsafe 98 is integral to the powered operation of the cart and accompanying electrical systems. On and off power failsafe 98 dually serves to limit thermal disruption at the power source due to improper use, abnormal electrical load, among other reasons.

An auxiliary power pack 93 can be used to serve as a supplemental power pack and alternative power supply for the cart. Located external of the primary power pack or supply, the auxiliary power pack or supply when utilized can serve the purposes of extending operating range of the cart due to increased energy availability, serving as backup power supply in the event of power failure or depletion of the primary power supply, and charging the primary power supply. The auxiliary power pack can be rapidly inserted into the electrical enclosure that houses the primary power supply, referred to as a swap. The auxiliary power pack can be connected to and power the cart even when there exists no primary power supply within the electrical enclosure. The auxiliary power pack can be used independent of primary function to charge or power other items requiring power not on the cart or payload on the cart that has a power requirement.

Figure 53:
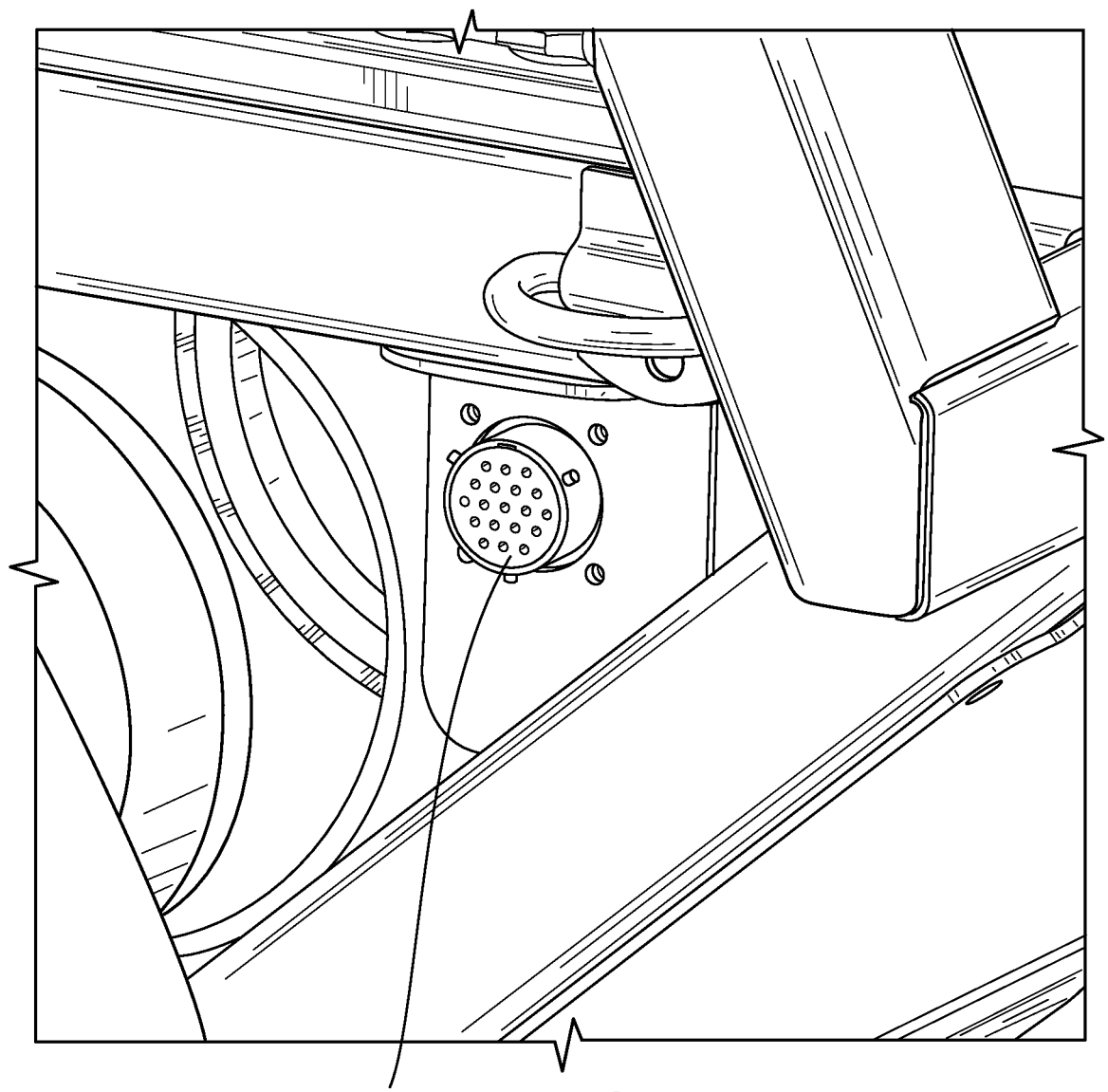
FIG. 53 is an enlarged view of a port of FIG. 52.
Figure 54:
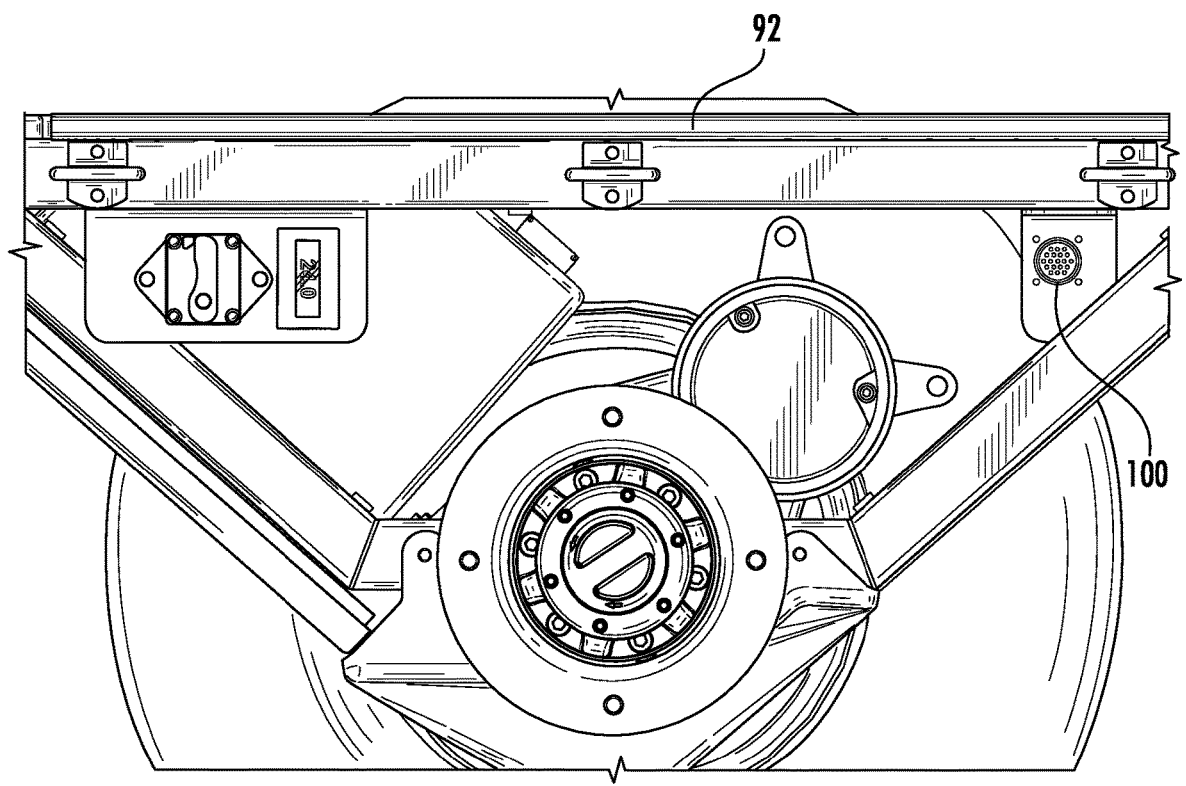
FIG. 54 is a side view of ports of FIG. 52.

FIGS. 52 to 54 illustrate alternate views of where the power export, auxiliary power, charging (wireless, remotely, or robotically controlled), and various machine connectivity can all occur. The cart may have one or more ports where such power export, auxiliary power, charging (wireless, remotely, or robotically controlled), and various machine connectivity can all occur. FIG. 52 illustrates locations for port 92 and port 100 in which numerous power applications occur. As shown in FIG. 52, port 92 is located on common housing 35 and port 100 is affixed to cart body 22. Although two potential port locations are shown in FIG. 52, other port locations on the cart body are possible and contemplated within the scope of the present invention. FIG. 53 is an enlarged view illustrating port 100. FIG. 54 is a side view illustrating ports 92 and 100. The cart and its respective power source whether primary or auxiliary can be utilized for powering or charging of external devices ranging from medical diagnostic equipment, communication tools and other machines or vehicles. This enhancement can be used whether the cart is dynamic or stationary.

By virtue of being towed, downhill motion without motive power, pushed, or similar movement, regenerative braking energizes the battery or other connected devices.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A tactical transport cart configured to be navigable over both ground surfaces of topographic terrains and water-covered surfaces of hydrographic terrains, the transport cart comprising:
  a frame having an open structure formed by a pair of laterally spaced-apart longitudinally-extending frame members,
  a cart body centrally affixed and extending downwardly from the frame members defining a lower enclosure within the cart body,
  a payload support affixed to the frame at an upper side of the cart body defining a payload-supporting area on the frame,
  a port configured for power export,
  a pair of terrain-engaging transport propulsion members attached to the frame in laterally spaced relation for supporting the frame at an elevation above surrounding terrain,
  a handle structure attached to the frame and extending therefrom in orthogonal relation to the transport propulsion members,
  at least one motor connected in driving relation to the transport propulsion members,
  a battery for providing motive power to the motor,
  a control device operatively connected between the battery and the motor for controlling supply of motive power to the motor,
  the handle structure being configured for steering movement of the frame over surrounding terrain while enabling simultaneous selective access to and operation of the control device,
  the frame, transport propulsion members and handle structure being cooperatively dimensioned and configured for movement of the cart over ground surfaces of topographic terrains and for partially and fully submerged movement over water-covered surfaces of hydrographic terrains, the motor, the battery, the control device and connections therebetween being sealed against water intrusion during submerged operation, and wherein the at least one motor is mounted within a lowermost region of the lower enclosure.

2. The tactical transport cart according to claim 1, wherein the transport device comprises a ballistic shield or ballistic protection device.

3. The tactical transport cart according to claim 1, wherein the payload support is elevatable.

4. The tactical transport cart according to claim 1, wherein the payload support is a platform or a cloth.

5. The tactical transport cart according to claim 1, wherein the handle structure is rotatable.

6. The tactical transport cart according to claim 1, wherein the handle structure telescopes, swings, or extends.

7. The tactical transport cart according to claim 1, wherein the tactical transport cart further comprises a stabilizing prop or support leg attached to the frame.

8. The tactical transport cart according to claim 1, wherein the tactical transport cart further comprises a manually selectable hub on a wheel of the tactical transport cart.

9. The tactical transport cart according to claim 1, wherein the tactical transport cart is collapsible into a case.

10. The tactical transport cart according to claim 1, wherein the tactical transport cart further comprises a sealed electrical enclosure.

11. The tactical transport cart according to claim 1, wherein the port is operatively connected to a powertrain in the tactical transport cart.

12. The tactical transport cart according to claim 1, further comprising a hard point of attachment or connection to the frame or payload support.

13. The tactical transport cart according to claim 12, wherein the hard point of attachment or connection is a logistics track.

14. The tactical transport cart according to claim 1, wherein the port is configured for transmission or receipt of a signal.

15. The tactical transport cart according to claim 1, wherein the tactical transport car comprises an on and off power failsafe.

* * * * *